United States Patent
Sekiyama

(10) Patent No.: US 6,924,944 B2
(45) Date of Patent: Aug. 2, 2005

(54) OPTICAL SYSTEM, AND OPTICAL APPARATUS

(75) Inventor: Kentaro Sekiyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 1 day.

(21) Appl. No.: 10/356,473

(22) Filed: Feb. 3, 2003

(65) Prior Publication Data

US 2003/0169516 A1 Sep. 11, 2003

(30) Foreign Application Priority Data

Feb. 4, 2002 (JP) .................................. 2002-026989

(51) Int. Cl.[7] .......................... G02F 26/00; G02F 1/13; G02B 27/00; G02B 13/00
(52) U.S. Cl. ...................... 359/724; 359/290; 359/578; 349/1
(58) Field of Search ............................... 359/724, 290, 359/291, 238, 578, 579; 349/1

(56) References Cited

U.S. PATENT DOCUMENTS 6,147,789 A * 11/2000 Gelbart ........................ 359/231
6,166,784 A * 12/2000 Murata et al. ................. 349/1
2002/0118464 A1 * 8/2002 Nishioka et al. ............. 359/642
2003/0035605 A1 * 2/2003 Bouevitch et al. ............. 385/1
2003/0147146 A1 * 8/2003 Mikami ....................... 359/694

FOREIGN PATENT DOCUMENTS

EP          0 961 149 A2 *    5/1999
JP          2000-0281570      3/2000

* cited by examiner

Primary Examiner—Timothy Thompson
(74) Attorney, Agent, or Firm—Pillsbury Winthrop Shaw Pittman LLP

(57) ABSTRACT

The invention relates to an optical system that can be operated with low power consumptions, reduced noises and fast responses, is simplified in mechanical structure and of reduced outer diameter and compact size, and is capable of focusing and zooming. This optical system comprises a rotationally symmetric lens group and an optical element having variable optical properties, whereby focusing or zooming can be performed. Focusing or zooming can be performed by use of a plurality of optical elements having variable optical properties, wherein at least one of the optical elements is configured to a free-form surface shape.

27 Claims, 33 Drawing Sheets

Trans

Cis

OPTICAL SYSTEM, AND OPTICAL APPARATUS

This application claims benefit of Japanese Application No. 2002-26989 filed in Japan on Feb. 4, 2002, the contents of which are incorporated by this reference.

BACKGROUND OF THE INVENTION

The present invention relates to optical elements having variable optical properties such as variable-focus lenses, variable-focus diffraction optical elements, variable deflection angle prisms and variable-focus mirrors, and an optical system including such optical elements. The present invention is also concerned with the application of that optical system to optical finders of cameras, digital cameras and TV cameras; viewing optical systems such as telescopes, microscopes and binoculars; spectacles; video projectors; cameras; digital cameras; TV cameras; and endoscopes.

Referring to conventional lenses formed of polished glass materials or molded lenses, their focal lengths cannot be varied because they cannot transform by themselves. For this reason, mechanical structures become complicated, which are used to move the lenses or lens groups comprising the same along the axial direction for focusing and zooming purposes.

Since motors, etc. are used to mechanically move some of the lens groups, they offer problems such as increased power consumptions, noisy sounds, slow responses, and time-consuming movement of lens groups.

SUMMARY OF THE INVENTION

The present invention provides a viewing optical system comprising an optical element having variable optical properties and a lens group, characterized in that zooming is carried out only by use of transformation of the optical element having variable optical properties rather than by movement of the lens group and pursuant to the following condition (103):

$$0.05 < |F_{TELE}/F_{WIDE}| < 20 \quad (103)$$

Here $F_{WIDE}$ is the focal length of the optical element having variable optical properties upon zooming to the wide-angle side of the viewing optical system and $F_{TELE}$ is the focal length of the optical element having variable optical properties upon zooming to the telephoto side of the viewing optical system.

The present invention also provides a viewing optical system, characterized in that upon zooming, focusing or diopter control, at least one optical element having variable optical properties turns to a free-form surface shape in a certain state.

Further, the present invention provides a viewing optical system, characterized in that a plurality of optical elements having variable optical properties are used for zooming or focusing.

So long as the aforesaid condition is satisfied, it is acceptable to use a variable mirror of fixed shape or a variable-focus lens in place of the optical element having variable optical properties.

Still other objects and advantages of the invention will in part be obvious and will in part be apparent from the specification.

The invention accordingly comprises the features of constructions, combinations of elements, and arrangement of parts, which will be exemplified in the construction hereinafter set forth, and the scope of the invention will be indicated in the claims.

BRIEF DESCRIPTION OF THE DRAWINGS

FIG. 29 is illustrative of what state the variable-focus lens of FIG. 28 is transformed in.

DESCRIPTION OF THE PREFERRED EMBODIMENTS

The variable-shape mirror is one of optical elements having variable optical properties, in which the surface shape can freely turn to a convex shape, a planar shape or a concave shape to freely change optical power or aberrations, so that even when there is a change in the distance from the image pickup system to the object, only the transformation of the mirror is needed for focusing. In this case, the mirror may take the form of a rotationally symmetric curved surface; to make better correction for aberrations, however, it is desired that the mirror take the form of a rotationally asymmetric free-form surface.

The detailed reasons are given below. First, an account is given of the coordinate system and rotationally asymmetric surface used. Here let the Z-axis be given by an optical axis defined by a straight line indicative of an axial chief ray arriving at the first surface of the optical system. Then let the Y-axis be defined by an axis that is orthogonal with respect to the Z-axis and lies within the decentered surface of each of the surfaces forming a decentration optical system. Then let the X-axis be defined by an axis that is orthogonal with respect to the Y-axis. Light rays are traced forwardly from the object toward the image plane. It is noted that the term "decentration" means one or both of displacement (shift) and tilt.

Commonly, a spherical lens system composed only of spherical lenses is designed such that aberrations produced at spherical surfaces, for instance, spherical aberrations, coma and field curvature are mutually corrected at some surfaces to reduce the aberrations as a whole.

To make satisfactory correction for aberrations with a reduced number of surfaces, on the other hand, rotationally symmetric aspheric surfaces are used. This is to reduce various aberrations produced at spherical surfaces.

In decentered optical systems, however, it is impossible to correct rotationally asymmetric aberrations due to decentration with a rotationally symmetric optical system. Among the rotationally asymmetric aberrations produced by decentration there are distortion and field curvature as well as astigmatism and coma that are produced even on the optical axis.

Figure 41:
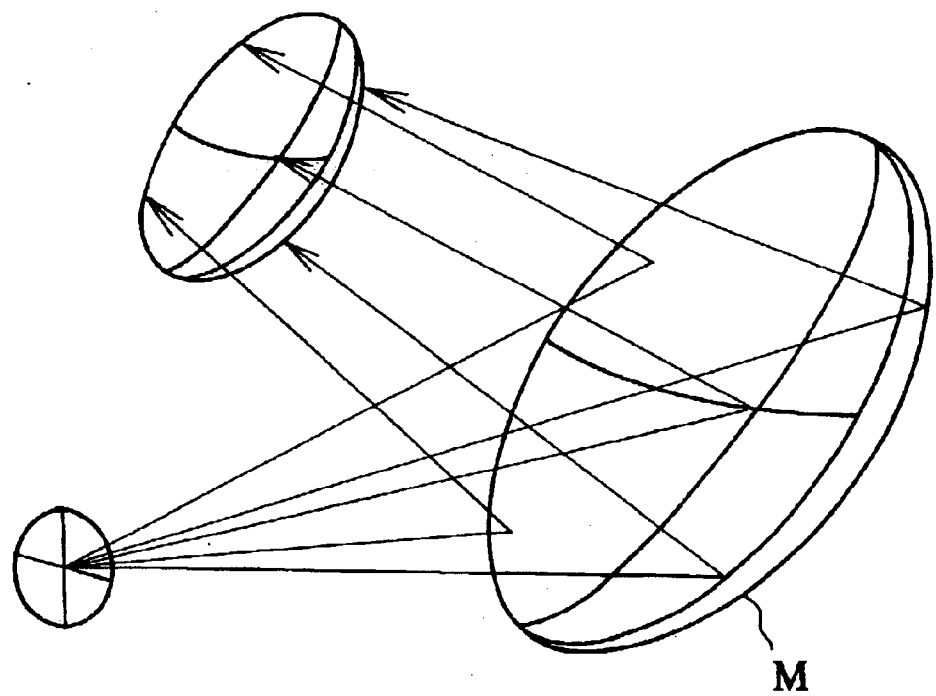
FIG. 41 is a conceptual illustration for explaining field curvature produced at a decentered reflecting surface.

First, the rotationally asymmetric field curvature is explained. For instance, consider light rays incident from an object point at infinity on a decentered concave mirror. The light rays are reflected at the concave mirror to form an image. When the image plane side is air, however, the rear focal length of a part from the concave surface to the image plane becomes half the radius of curvature of the concave mirror portion the light rays strike, whereupon the image plane is tilted with respect to an axial chief ray, as shown in FIG. 41. It is thus impossible to make correction for rotationally asymmetric field curvature with a rotationally symmetric optical system.

To correct the tilting field curvature with the concave mirror M itself, which is the source of producing that field curvature, the concave mirror M must be made up of a rotationally asymmetric surface in such a way as to have a strong curvature (strong refracting power) in the Y-axis positive direction and a weak curvature (weak refracting power) in the Y-axis negative direction. By locating another rotationally asymmetric surface having the same effect as the aforesaid arrangement in the optical system, it is also possible to achieve a flat image plane with a reduced number of surfaces.

In view of correction of aberrations, the rotationally asymmetric surface should preferably be defined by a surface of rotationally asymmetric shape having no axis of rotational symmetry both within and without that surface, because the degree of freedom is increased.

Figure 42:
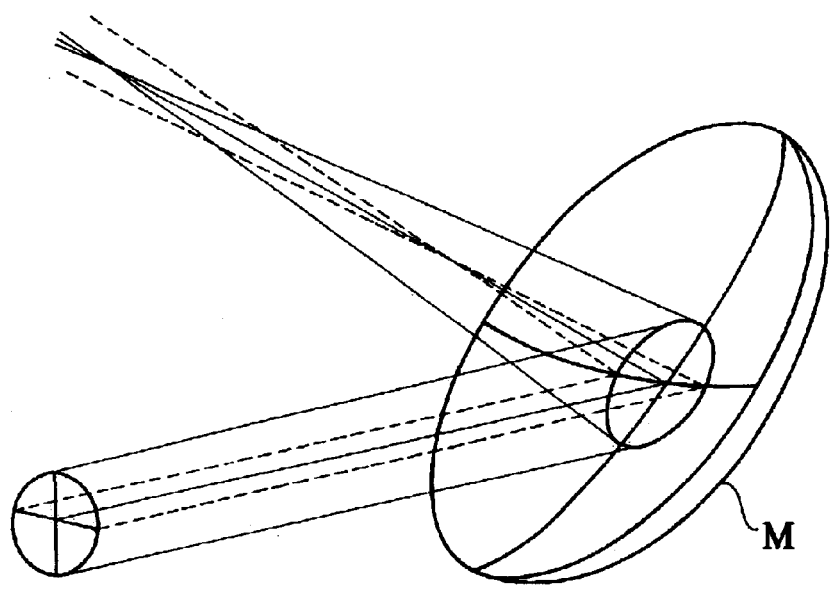
FIG. 42 is a conceptual illustration for explaining astigmatism produced at a decentered reflecting surface.

Next, the rotationally asymmetric astigmatism is explained. As in the foregoing explanation, such astigmatism as shown in FIG. 42 is produced at a decentered concave mirror M even with respect to an axial chief ray. This astigmatism can be corrected by making the curvatures of a rotationally asymmetric surface in the X- and Y-axis directions properly different from each other, as in the foregoing case.

Figure 43:
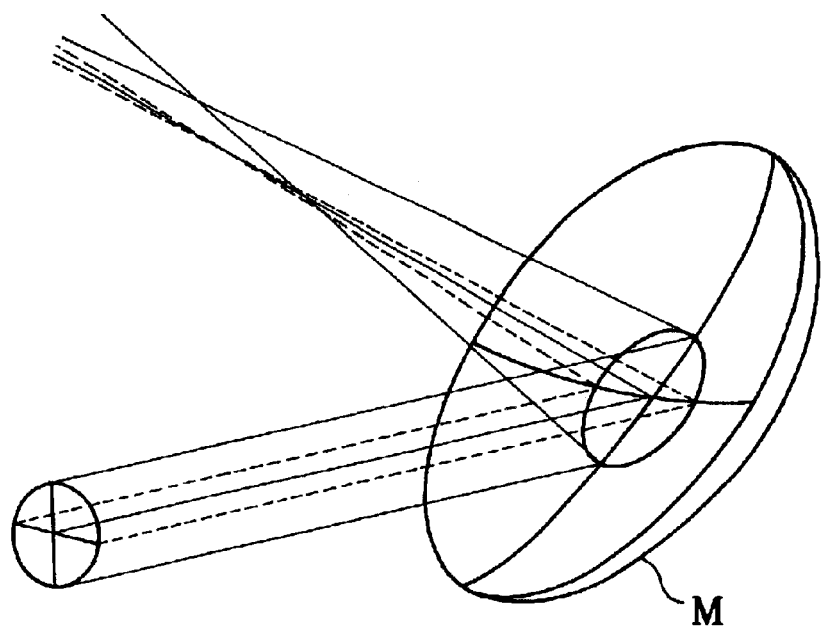
FIG. 43 is a conceptual illustration for explaining coma produced at a decentered reflecting surface.

Next, the rotationally asymmetric coma is explained. As in the foregoing explanation, such coma as shown in FIG. 43 is produced at a decentered concave mirror M even with respect to an axial chief ray. This coma can be corrected by varying the tilt of a rotationally asymmetric surface off and off the origin of the X-axis thereof and properly varying the tilt of the surface depending on the positive or negative of the Y-axis.

The decentration optical system of the invention may also be constructed using at least one surface having the aforesaid reflecting action while decentered with respect to an axial chief ray so that the reflecting surface is allowed to have a rotationally asymmetric surface shape and power. With such an arrangement, decentration aberrations produced due to the power imparted to the reflecting surface can be corrected at that surface itself, and the occurrence of chromatic aberration itself can be reduced by relaxing the power of the refracting surfaces of a prism.

It is then desired for correction of decentration aberrations that the variable-shape mirror that is one of the reflecting surfaces forming the decentration optical system of the invention be composed of a rotationally asymmetric surface.

It is here noted that the aforesaid rotationally asymmetric surface used herein should preferably be composed of a free-form surface symmetric with respect to plane, which has only one plane of symmetry. Here the free-form surface used herein is defined by the following formula. The Z-axis of this defining formula provides the axis of the free-form surface.

$$Z = cr^2 / \left[1 + \sqrt{\{1 - (1+k)c^2 r^2\}}\right] + \sum_{j=2}^{N} C_j X^m Y^n \quad (a)$$

Here the first term of formula (a) is a spherical term and the second term is a free-form surface term.

In the spherical term;
c is the curvature of the apex,
k is the conical coefficient,
$r = \sqrt{(X^2 + Y^2)}$, and
N is a natural number of 2 or greater.
The free-form surface term is $$\sum_{j=2}^{N} C_j X^m Y^n = C_2 X + C_3 Y + C_4 X^2 + C_5 XY + C_6 Y^2 + \quad (a)$$

$$C_7 X^3 + C_8 X^2 Y + C_9 XY^2 + C_{10} Y^3 +$$

$$C_{11} X^4 + C_{12} X^3 Y + C_{13} X^2 Y^2 + C_{14} XY^3 +$$

$$C_{15} Y^4 + C_{16} X^5 + C_{17} X^4 Y + C_{18} X^3 Y^2 +$$

$$C_{19} X^2 Y^3 + C_{20} XY^4 + C_{21} Y^5 + C_{22} X^6 +$$

$$C_{23} X^5 Y + C_{24} X^4 Y^2 + C_{25} X^3 Y^3 + C_{26} X^2 Y^4 +$$

$$C_{27} XY^5 + C_{28} Y^6 + C_{29} X^7 + C_{30} X^6 Y +$$

$$C_{31} X^5 Y^2 + C_{32} X^4 Y^3 + C_{33} X^3 Y^4 + C_{34} X^2 Y^5 +$$

$$C_{35} XY^6 + C_{36} Y^7$$

Here $C_j$ (j is an integer of 2 or greater) is a coefficient.

In general, the aforesaid free-form surface has no symmetric surface at both the X-Z plane and the Y-Z plane. However, by reducing all the odd-numbered terms for Y to zero, that free-form surface can have only one symmetric surface parallel with the X-Z plane. Likewise, by reducing all the odd-numbered terms for Y to zero, the free-form surface can have only one symmetric surface parallel with the X-Z plane.

Among other free-form surface defining formulae, there is Zernike polynomial given by the following formula (b). The shape of this surface is defined by the following formula. The axis for Zernike polynomial is given by the Z-axis of the defining formula. The rotationally asymmetric surface is defined by polar coordinates for the height of the Z-axis with respect to the X-Y plane provided that R is the distance from the Z-axis within the X-Y plane and A is the azimuth angle around the Z axis, as expressed by the angle of rotation measured from the X-axis.

$$x = R \times \cos(A) \quad (b)$$
$$y = R \times \sin(A)$$

$$Z = D_2 + D_3 R \cos(A) + D_4 R \sin(A) + D_5 R^2 \cos(2A) + D_6 (R^2 - 1) +$$
$$D_7 R^2 \sin(2A) + D_8 R^3 \cos(3A) + D_9 (3R^3 - 2R) \cos(A) +$$
$$D_{10} (3R^3 - 2R) \sin(A) + D_{11} R^3 \sin(3A) + D_{12} R^4 \cos(4A) +$$
$$D_{13} (4R^4 - 3R^2) \cos(2A) + D_{14} (6R^4 - 6R^2 + 1) +$$
$$D_{15} (4R^4 - 3R^2) \sin(2A) + D_{16} R^4 \sin(4A) +$$
$$D_{17} R^5 \cos(5A) + D_{18} (5R^5 - 4R^3) \cos(3A) +$$
$$D_{19} (10R^5 - 12R^3 + 3R) \cos(A) +$$
$$D_{20} (10R^5 - 12R^3 + 3R) \sin(A) + D_{21} (5R^5 - 4R^3) \sin(3A) +$$
$$D_{22} R^5 \sin(5A) + D_{23} R^6 \cos(6A) + D_{24} (6R^6 - 5R^4) \cos(4A) +$$
$$D_{25} (15R^6 - 20R^4 + 6R^2) \cos(2A) +$$
$$D_{26} (20R^6 - 30R^4 + 12R^2 - 1) +$$
$$D_{27} (15R^6 - 20R^4 + 6R^2) \sin(2A) +$$
$$D_{28} (6R^6 - 5R^4) \sin(4A) + D_{29} R^6 \sin(6A)$$

Here $D_m$ (m is an integer of 2 or greater) is a coefficient. It is noted that when this free-form surface is designed in the form of an optical system symmetric in the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . are used.

Among other defining formula for the free-form surface, there is the following one (c):

$$Z = \Sigma\Sigma C_{nm} XY$$

When expanded with respect to k=7 (the seventh term) as an example, this may be expressed by the following formula:

$$Z = C_2 + C_3 Y + C_4 |X| + C_5 Y^2 + C_6 Y|X| + C_7 X^2 + \quad (c)$$
$$C_8 Y^3 + C_9 Y^2 |X| + C_{10} YX^2 + C_{11} |X^3| +$$
$$C_{12} Y^4 + C_{13} Y^3 |X| + C_{14} Y^2 X^2 + C_{15} Y|X^3| + C_{16} X^4 +$$
$$C_{17} Y^5 + C_{18} Y^4 |X| + C_{19} Y^3 X^2 + C_{20} Y^2 |X^3| +$$
$$C_{21} YX^4 + C_{22} |X^5| + C_{23} Y^6 + C_{24} Y^5 |X| + C_{25} Y^4 X^2 +$$
$$C_{26} Y^3 |X^3| + C_{27} Y^2 X^4 + C_{28} Y|X^5| + C_{29} X^6 +$$
$$C_{30} Y^7 + C_{31} Y^6 |X| + C_{32} Y^5 X^2 C_{33} Y^4 |X^3| +$$
$$C_{34} Y^3 X^4 + C_{35} Y^2 |X^5| + C_{36} YX^6 + C_{37} |X^7|$$

While the shapes of the surfaces used in the examples of the invention are expressed by the free-form surfaces using the formula (a), it is understood that similar actions and effects are obtainable even by use of the aforesaid formulas (b) and (c).

In the present invention, by reducing all the odd-number terms for X in formula (a) to zero, there is obtained a free-form surface having a symmetric surface parallel with the Y-Z plane.

The aforesaid defining formulas are given for the purpose of illustrating surfaces of rotationally asymmetric curved shape, and so it is understood that the same effects are obtainable even with any other defining formula. So long as mathematically equivalent values are obtained, the free-form surface may be expressed by other definitions.

Specific embodiments of the invention are now explained with reference to the accompanying drawings.

Prior to giving explanations of the embodiments of the invention, given are examples of the optical element having variable optical properties, which is applicable to the optical system or optical apparatus of the invention.

An account is now given of exemplary constructions of the mirror having variable optical properties and variable-focus lens, which are usable as the optical elements having variable optical properties in the invention.

EXAMPLE 1 OF THE VARIABLE-SHAPE MIRROR

Figure 1:
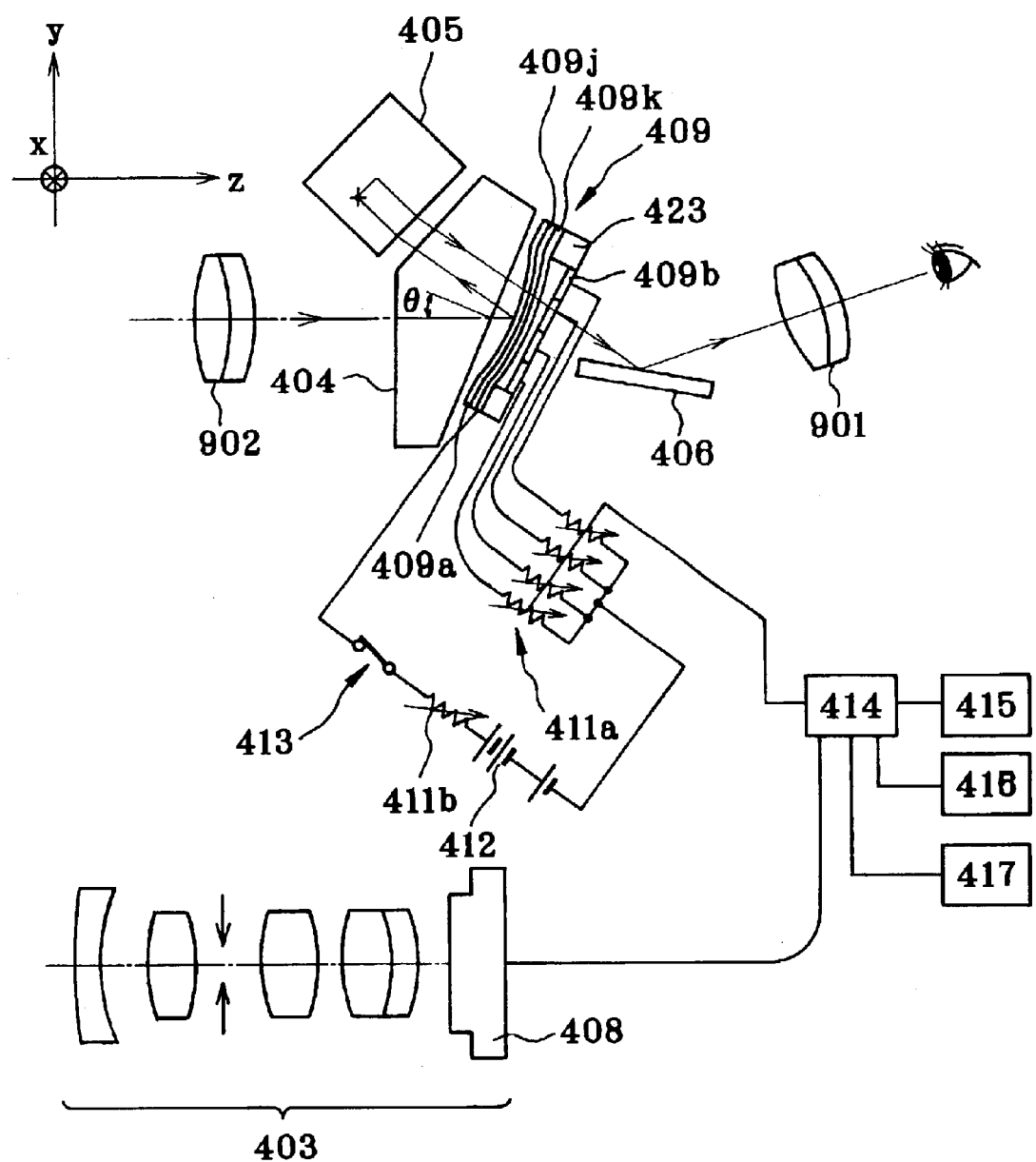
FIG. 1 is illustrative in schematic of one embodiment wherein the optical element having variable optical properties is used in a viewing optical system used with the Keplerian finder of a digital camera, which is used as the optical device of the invention.

FIG. 1 is illustrative in schematic of one example of the optical system of the invention, and an optical apparatus comprising that optical system, specifically, the Keplerian finder of a digital camera, which uses a variable-shape mirror having variable optical properties. This variable-shape mirror may also be used as a part of the viewing optical system of a silver-halide camera. First, the variable-shape mirror having variable optical properties, shown at 409, is explained.

The variable-shape mirror 409 having variable optical properties (hereinafter often called simply the variable-shape mirror) comprises a transforming layer of the triple-layer structure consisting of an electrode 409k, a transformable substrate 409j and a thin film (reflecting surface) 409a formed by coating aluminum on the substrate 409j and functioning as a reflecting surface. The transforming layer is supported on a supporting member 423, and on the lower side of the supporting member 423 there are provided a plurality of electrodes 409b spaced away from the electrode 409k. Reference numeral 411a represents a plurality of variable resistors connected to the respective electrodes 409b; 412 is a power source connected between the electrode 409k and the electrodes 409b via the variable resistors 411a and a power source switch 413; 414 is a computing unit for controlling the resistance values of a plurality of variable resistors 411a; and 415, 416 and 417 are a temperature sensor, a humidity sensor and a distance sensor connected to the computing unit 414, respectively. These components are located as shown to construct a single optical apparatus.

It is here noted that the respective surfaces of the objective lens 902, eyepiece lens 901, prism 404, isosceles right-angle prism 405, mirror 406 and variable-shape mirror 409 may be configured not only as planar surfaces but also as surfaces of many other shapes, e.g., spherical shape; rotationally symmetric aspheric shape; spherical shape, planar shape, and rotationally symmetric aspheric shape decentered with respect to the optical axis of the optical apparatus; aspheric shape having a symmetric surface; aspheric shape having only one symmetric surface; aspheric shape having no symmetric surface; free-form surface shape; and surface shape having an undifferentiable point or line. Moreover, these surfaces may be configured as reflecting or refracting surfaces. Moreover, any desired reflecting or refracting surface capable of producing some influences on light may be used in the invention. In what follows, these surfaces are generally called a "extended surface".

As is the case with such a membrane mirror as set forth typically in P. Rai-choudhury, Handbook of Microlithography, Micromachining and Microfabrication, Volume 2: Micromachining and Mircofabrication, page 495, FIG. 8.58, SPIE PRESS, and Optics Communication, Volume 140 (1997) pp. 187–190, when voltages are applied between the electrodes 409b and the electrode 409k, the thin film 409a is transformed by electrostatic force so that its surface shape changes. This does not only enable focusing to be performed depending on the diopter of a viewer, but also can prevent transformation or refractive index changes due to temperature and humidity changes of lenses 901, 902 and/or prism 404, isosceles right-angle prism 405 and mirror 406 or deterioration in image-formation capabilities due to contraction and expansion and transformation of lens barrels and errors on assembling of parts such as optical elements and frames. It is thus possible to perform constantly proper focusing and make correction for aberrations resulting from focusing.

Figure 3:
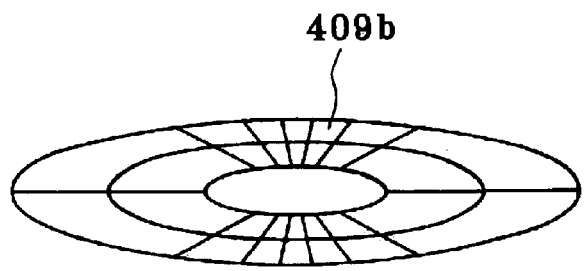
FIG. 3 is illustrative of one form of the electrode used with the variable-shape mirror of FIG. 2.
Figure 4:
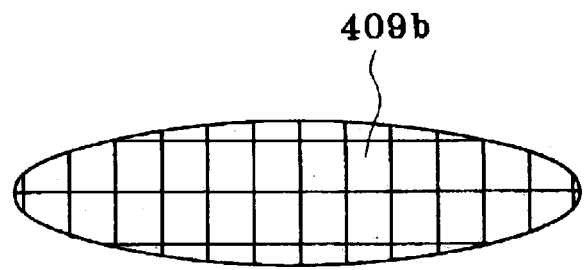
FIG. 4 is illustrative of another form of the electrode used with the variable-shape mirror of FIG. 2.

It is noted that the electrode array 409b may be concentrically or rectangularly divided as shown typically in FIGS. 3 and 4 depending on how to transform the thin film 409a.

When the aforesaid variable-shape mirror 409 is used, light from an object is refracted at the respective entrance and exit surfaces of objective lens 902 and prism 404, reflected at the variable-shape mirror 409 and further reflected at the isosceles right-angle prism 405 upon transmission through the prism 404 (In FIG. 1, the + mark in the optical path indicates that light rays propagate beyond the back side of the paper). Then, the light is reflected at the mirror 406, arriving at the eyes via the eyepiece lens 901. Thus, the viewing optical system of the optical apparatus is constructed of the lenses 901, 902, prisms 404, 405 and variable-shape mirror 409, so that aberrations at the object surface are minimized by optimization of the surface configuration and thickness of each optical element.

To be specific, the shape of the thin film 409a functioning as the reflecting surface is controlled by varying the resistance value of each variable resistor 411a in response to the signal from the computing unit 414 in such a way as to optimize the image-formation capabilities. Namely, signals of the magnitude commensurate with ambient temperature and humidity and a distance to the object are entered om the computing unit 414 from the temperature sensor 415, humidity sensor 416 and distance sensor 417 and in response to these input signals, the computing unit 414 produces signals for determining the resistance values of the variable resistors 411a in such a way as to apply on the electrode array 409b the voltage that determines the shape of the thin-film 409a, so that deterioration in the image-formation performance due to ambient temperature and humidity and the distance to the object can be compensated for. Thus, since the thin-film 409a is transformed by the voltage applied on the electrode array 409b, i.e., by electrostatic force, the thin-film 409a can take aspheric shape or many other shapes depending on the situations encountered. It is understood that the distance sensor 417 may be dispensed with; in this case, the image pickup lens 403 as a part of the viewing optical system of the digital camera should be moved to a position at which the high-frequency component of image signals from a solid-state image pickup device 408 is substantially maximized, so that the object distance is calculated from that position to transform the variable-shape mirror in such a way as to come into focus on the eyes of the viewer.

It is preferable to fabricate the transformable substrate 409*j* using a synthetic resin such as polyimide because it is well transformable even at low voltage. It is noted that the prism 404 and variable-shape mirror 409 may be integrated into a unit.

In the example of FIG. 1, the transforming substrate 409*j*, thin-film 409*a* functioning as the reflecting surface and transforming electrode 409 are combined into a one-piece with the substrate 409*j* sandwiched between the thin-film 409*a* and the electrode 409, and so there is a merit that several fabrication processes may be selectively used. It is also acceptable to configure the thin-film 409*a* functioning as the reflecting surface as a combined thin-film and electrode 409*k*; in this case, there is a merit of simplified structure where both are combined into a one-piece.

Although not shown, it is understood that the solid-state image pickup device 408 may be integrally formed on the substrate of the variable-shape mirror 409 by means of a lithographic process.

If the lenses 901, 902, prisms 404, 405 and mirror 406 are fabricated by means of plastic molding, then any desired shape can then be imparted thereto so that they can be easily fabricated. While the lenses 901 and 902 have been described as being spaced away from the prism 404, it is understood that if the prisms 404, 405, mirror 406 and variable-shape mirror 409 are designed in such a way as to remove aberrations with no provision of the lenses 901 and 902, then the prisms 404, 405 and variable-shape mirror 409 can take the form of one optical block that is easy to assemble. It is also acceptable to fabricate a part or the whole of the lenses 901, 902, prisms 404, 405 and mirror 406 using a glass material. By doing so, it is possible to obtain a viewing optical system further improved in terms of precision. It is further preferable to control the shape of the reflecting surface of the variable-shape mirror in such a way as to have the form of a free-form surface because aberrations can be favorably corrected with ease.

Referring to the example of FIG. 1, it is not always necessary to provide the computing unit 414, temperature sensor 415, humidity sensor 416 and distance sensor 417 so that temperature changes, humidity changes, object distance changes, etc. can be compensated for by the variable-shape mirror 409. That is, while the computing unit 414, temperature sensor 415, humidity sensor 416 and distance sensor 471 are removed, it is possible to make correction for only a change in the diopter of the viewer by means of the variable-shape mirror 409.

EXAMPLE 2 OF THE VARIABLE-SHAPE MIRROR

Figure 2:
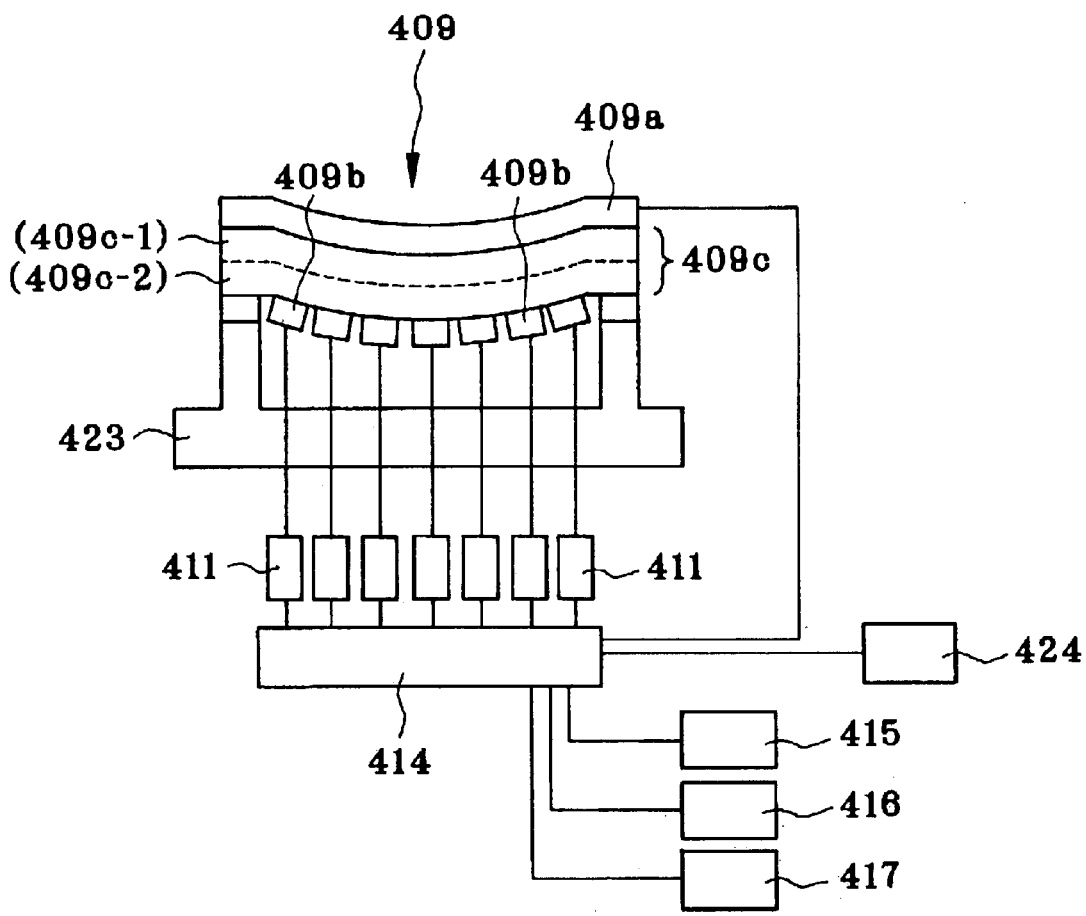
FIG. 2 is illustrative in schematic of another embodiment of the variable-shape mirror 409.

FIG. 2 is illustrative in schematic of another example of the variable-shape mirror 409.

In this variable-shape mirror, a piezoelectric element 409*c* is interposed between a thin film 409*a* and a plurality of electrodes 409*b* and the assembly is provided on a supporting member 423. By varying the voltage applied on the piezoelectric element 409*c* for each electrode 409*b*, the piezoelectric element 409*c* is elongated and contracted in partially different manners, thereby transforming the thin film 409*a*. The electrode array 409*b* may be concentrically divided as shown in FIG. 3 or rectangularly divided as shown in FIG. 4, or alternatively it may have other shape depending on the intended purpose. In FIG. 2, reference numeral 424 is a shake sensor connected to a computing unit 424. For instance, when a digital camera shakes on phototaking, the sensor 424 actuates to sense that shake, thereby varying the voltage applied on the electrode array 409*b* via the computing unit 414 and variable resistors 411, so that the thin film (reflecting surface) 409 can be transformed for compensation for image blurring due to camera shake. At the same time, consideration is given to signals from the temperature sensor 415, humidity sensor 416 and distance sensor 417 for focusing, and compensation for temperature and humidity changes. Preferably in this case, some thickness and so some strength should be added to the thin film 409*a* because stresses in association with the transformation of the piezoelectric element 409*c* are applied on the thin film 409*a*. It is noted that although depending on the material used, the piezoelectric element 409*c* may have such double-layer structure 409*c*-1, 409*c*-2 as explained later.

EXAMPLE 3 OF THE VARIABLE-SHAPE MIRROR

Figure 5:
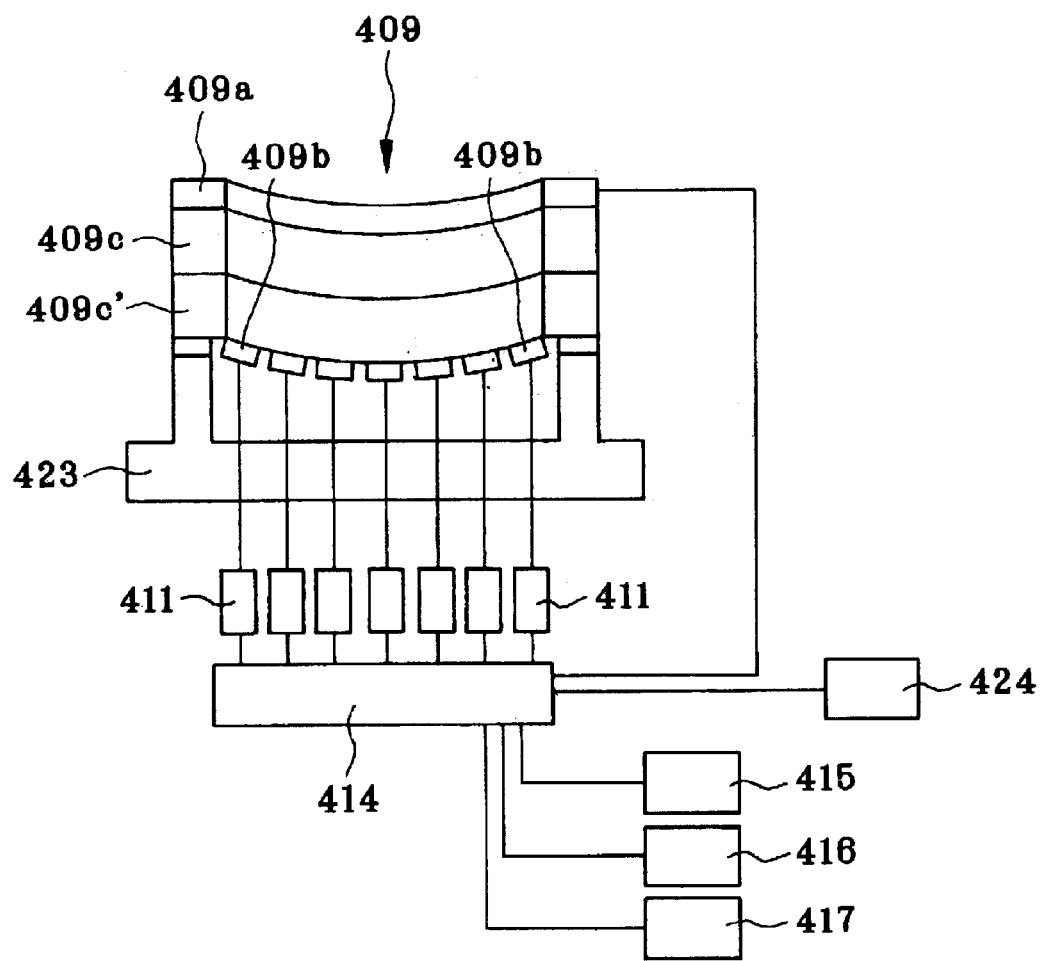
FIG. 5 is illustrative in schematic of yet another embodiment of the variable-shape mirror 409.

FIG. 5 is illustrative in schematic of yet another example of the variable-shape mirror 409.

This variable-shape mirror is different from the variable-shape mirror shown in FIG. 2 in that the piezoelectric element interposed between the thin film 409*a* and a plurality of electrodes 409*b* is made up of two piezoelectric elements 409*c* and 409*c'* formed of materials having piezoelectric properties in opposite directions. That is, when the piezoelectric elements 409*c* and 409*c'* are formed of ferroelectric crystals, they are located with the orientations of crystallographic axes being in opposite directions. In this case, since the piezoelectric elements 409*c* and 409*c'* are elongated and contracted in opposite directions upon receipt of voltages, the force that transforms the thin film 409*a* (reflecting surface) becomes stronger than that of the example of FIG. 2, resulting in large transformation of the mirror surface. Other reference numerals in FIG. 5 are the same as in FIG. 2.

The piezoelectric element 409*c*, 409*c'*, for instance, may be formed of piezoelectric materials such as barium titanate, Rochelle salt, quartz, tourmaline, potassium dihydrogenphosphate (KDP), ammonium dihydrogenphosphate (ADP) and lithium niobate, polycrystals and crystals thereof, solid-solution piezoelectric ceramics of $PbZrO_3$ and $PbTiO_3$, organic dielectric materials such as poly(vinyl difluoride) (PVDF), and ferroelectric materials other than the aforesaid materials, among which the organic piezoelectric materials are particularly preferred because of their low Young's modulus and because they can undergo large transformation even at low voltage. It is noted that if these piezoelectric elements are used at an uneven thickness, it is also possible to properly transform the thin film 409*a* in each of the aforesaid examples.

The piezoelectric element 409*c*, 409' may also be formed of polymer piezoelectric materials such as polyurethane, silicone rubber, acryl elastomer, PZT, PLZT, poly(vinylidene fluoride)(PVDF), copolymers such as vinylidene cyanide copolymers and copolymers of vinylidene fluoride and trifluoroethylene.

It is preferable to use organic materials having piezoelectricity, synthetic resins having piezoelectricity, elastomers having piezoelectricity, etc., because it is possible to largely transform the surface of a variable-shape mirror.

Figure 6:
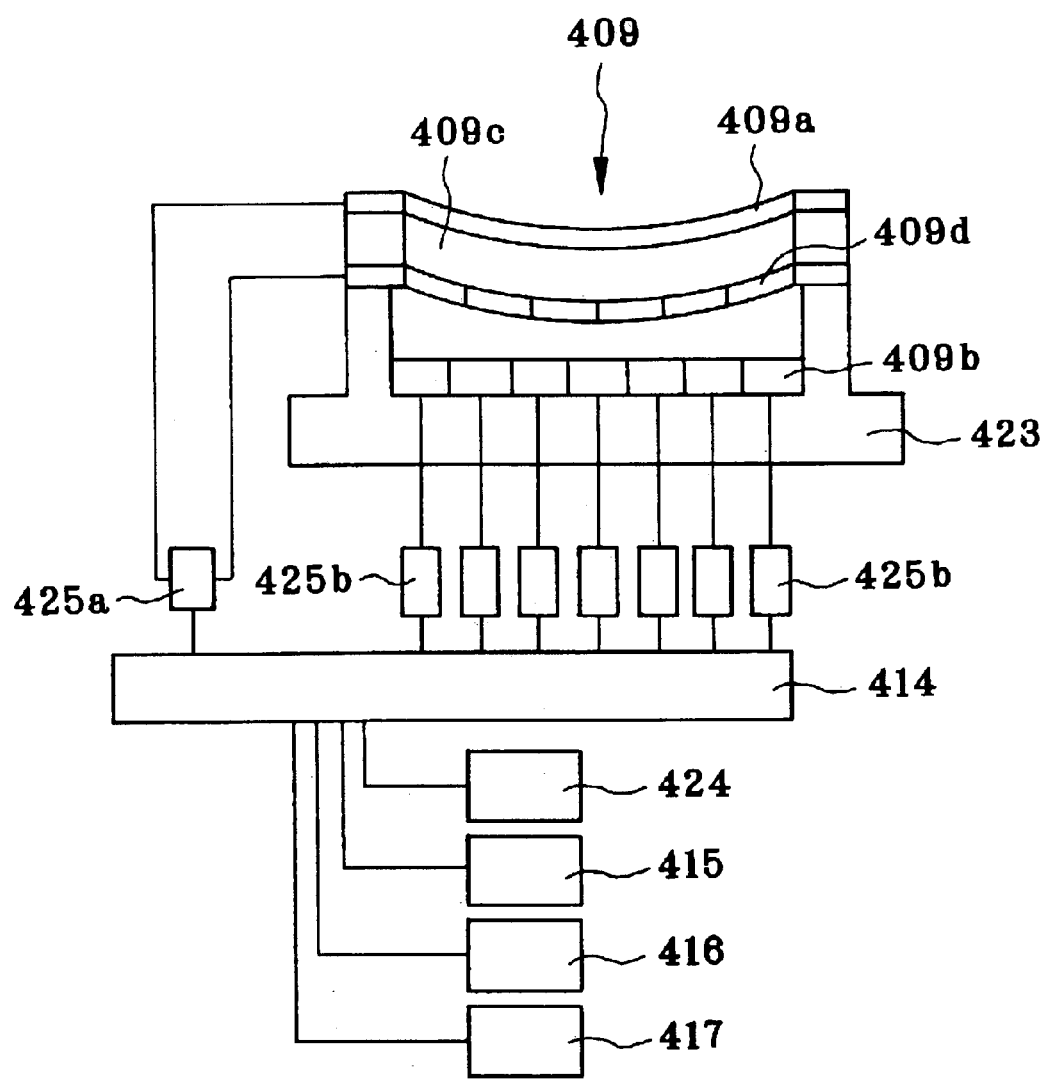
FIG. 6 is illustrative in schematic of a further embodiment of the variable-shape mirror 409.

It is noted that when the piezoelectric element 409*c* of FIG. 2 or FIG. 6 is formed of an electrostrictive material such as an acryl elastomer or silicone rubber, it may be provided in the form of a double-layer structure wherein a layer of the piezoelectric element 409c is laminated on a combined substrate 409c and electrostrictive material 409c-2.

EXAMPLE 4 OF THE VARIABLE-SHAPE MIRROR

FIG. 6 is illustrative in schematic of a further example of the variable-shape mirror 409.

In this variable-shape mirror, the piezoelectric element 409c is sandwiched between the thin film 409a and a plurality of electrodes 409d, and the assembly is provided on the supporting member 423. Then, voltage is applied on the piezoelectric element 409c between the thin film 409a and the electrodes 409d via the driving circuit 425 controlled by the computing unit 414. Besides, voltage is applied on a plurality of electrodes 409b provided on the internal bottom of the supporting member 423 via the driving circuit 425b controlled by the computing unit 414. Accordingly, the thin film 409a can be subjected to double transformation by the voltage applied between the thin film 409a and the electrodes 409d and electrostatic force resulting from the voltage applied on the electrodes 409b, so that much more transformation patterns than could be achieved in any of the aforesaid emobdiments can be obtained with faster responsibility. Other reference numerals in FIG. 6 are the same as in FIG. 2.

By varying the sign of the voltage between the thin film 409a and the electrodes 409d, it is possible to transform the thin film 409a of the variable-shape mirror into either convex shape or concave shape. In this case, it is acceptable to achieve large transformation using the piezoelectric effect and minute transformation using electrostatic force. It is also acceptable to use mainly the piezoelectric effect for convex transformation and mainly electrostatic force for concave transformation. It is noted that the electrode 409d may be constructed as a single electrode or using a plurality of electrodes as is the case with the electrodes 409b. How the electrode 409d is constructed using a plurality of electrodes is illustrated in FIG. 6. It is understood that the term "piezoelectric effect" used herein includes not only the piezoelectric effect but the electrostrictive effect as well, and the piezoelectric material is understood to include the electrostrictive material, too.

EXAMPLE 5 OF THE VARIABLE-SHAPE MIRROR

Figure 7:
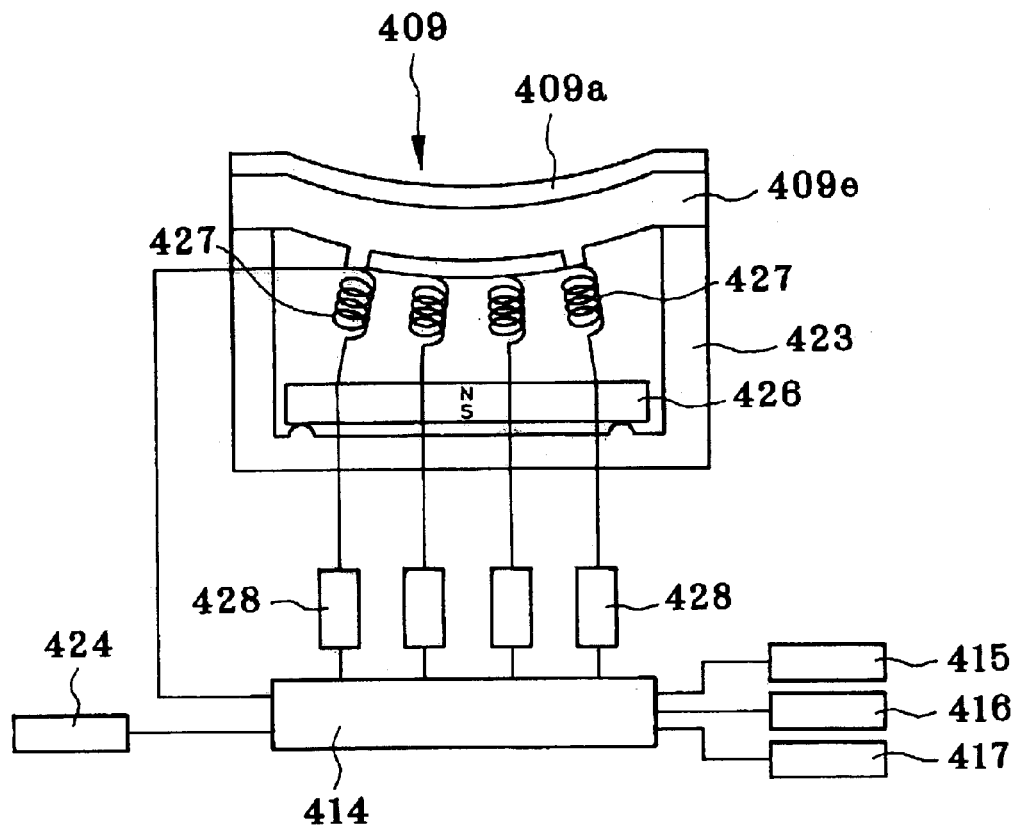
FIG. 7 is illustrative in schematic of a further embodiment of the variable-shape mirror 409.

FIG. 7 is illustrative in schematic of yet another example of the variable-shape mirror 409.

This variable-shape mirror is designed such that the reflecting surface can be transformed by making use of electromagnetic force. The permanent magnet 426 is fixed on the inside bottom of the support frame 423, and the peripheral portion of the substrate 409e formed of silicon nitride, polyimide or the like is fixedly placed on top of that frame. In addition, the thin film 409a formed of an aluminum or other metal coat is provided on the surface of the substrate 409e, so that the variable-shape mirror 409 is set up. The substrate 409e is fixedly provided on its lower surface with a plurality of coils 427 that are then connected to the computing unit 414 via the respective driving circuits 428. Other reference numerals in FIG. 7 are the same as in FIG. 2. In response to output signals from the computing unit 414, which correspond to changes in the optical system which changes are determined in the computing unit 414 by signals from the respective sensors 415, 416, 417 and 424, suitable currents are fed to the respective coils 427 through the respective driving circuits 428, whereupon the respective coils 427 are repulsed or adsorbed by electromagnetic force exerted between them and the permanent magnet 426, so that the substrate 409e and thin film 409a can be transformed.

In this case, it is acceptable to pass varying amounts of currents through the respective coils 427, or use a single coil 427. Alternatively, the permanent magnet 426 may be provided on the lower surface of the substrate 409e while the coils 427 may be provided on the inside bottom of the support frame 423. Preferably, the coils 427 should be designed as thin-film coils as by lithography. The coils 427 may also have therein cores formed of ferromagnetic materials.

Figure 8:
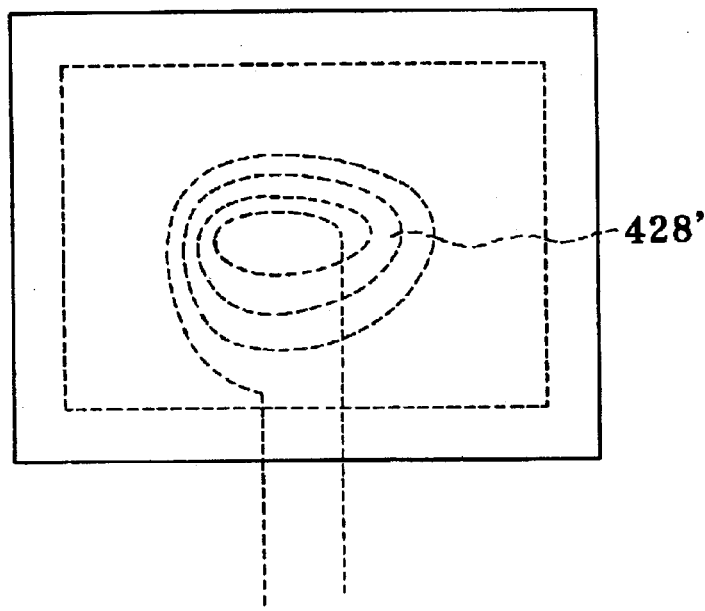
FIG. 8 is illustrative of the turn density of the thin-film coil 427 in the embodiment of FIG. 7.

The thin-film coil 427 may also be designed in such a way as to have a turn density that varies depending on the site of the lower surface of the substrate 409e, as is the case of such a coil 428' as shown in FIG. 8, thereby imparting the desired transformation to the substrate 409e and thin-film 409a. The coil 472 may be used in the form of a single coil or may have therein a core of ferromagnetic material.

EXAMPLE 6 OF THE VARIABLE-SHAPE MIRROR

Figure 9:
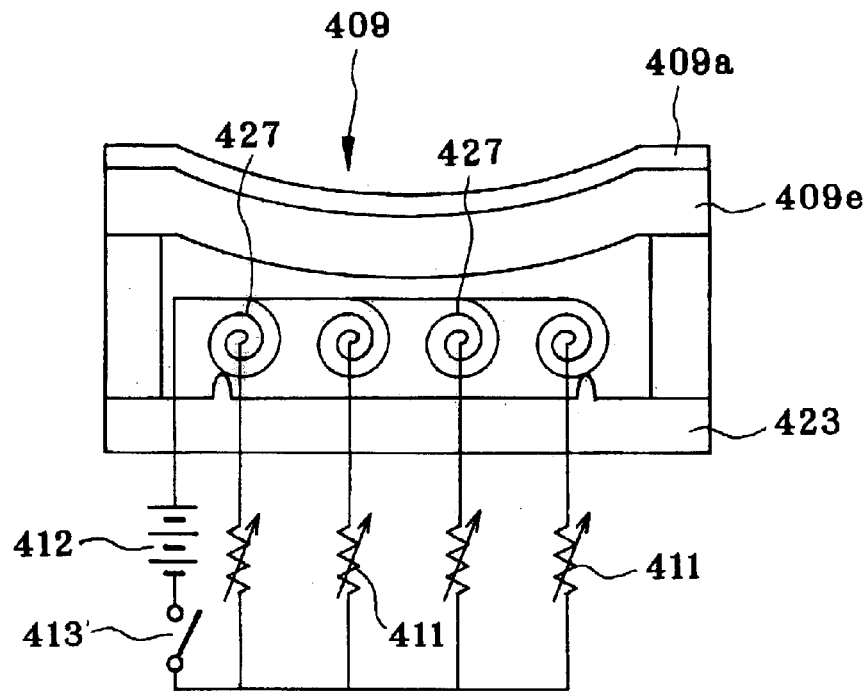
FIG. 9 is illustrative in schematic of a further embodiment of the variable-shape mirror 409.

FIG. 9 is illustrative in schematic of a further example of the variable-shape mirror 409. Other reference numerals in FIG. 9 are the same as in FIG. 2.

Figure 10:
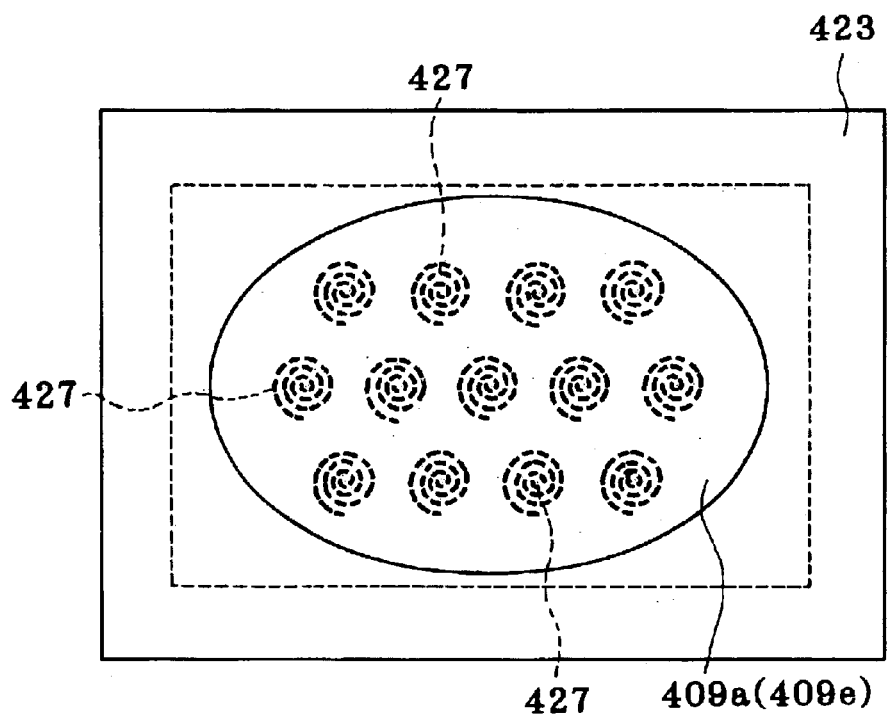
FIG. 10 is illustrative of one example of how the coils 427 are located in the embodiment of FIG. 9.
Figure 11:
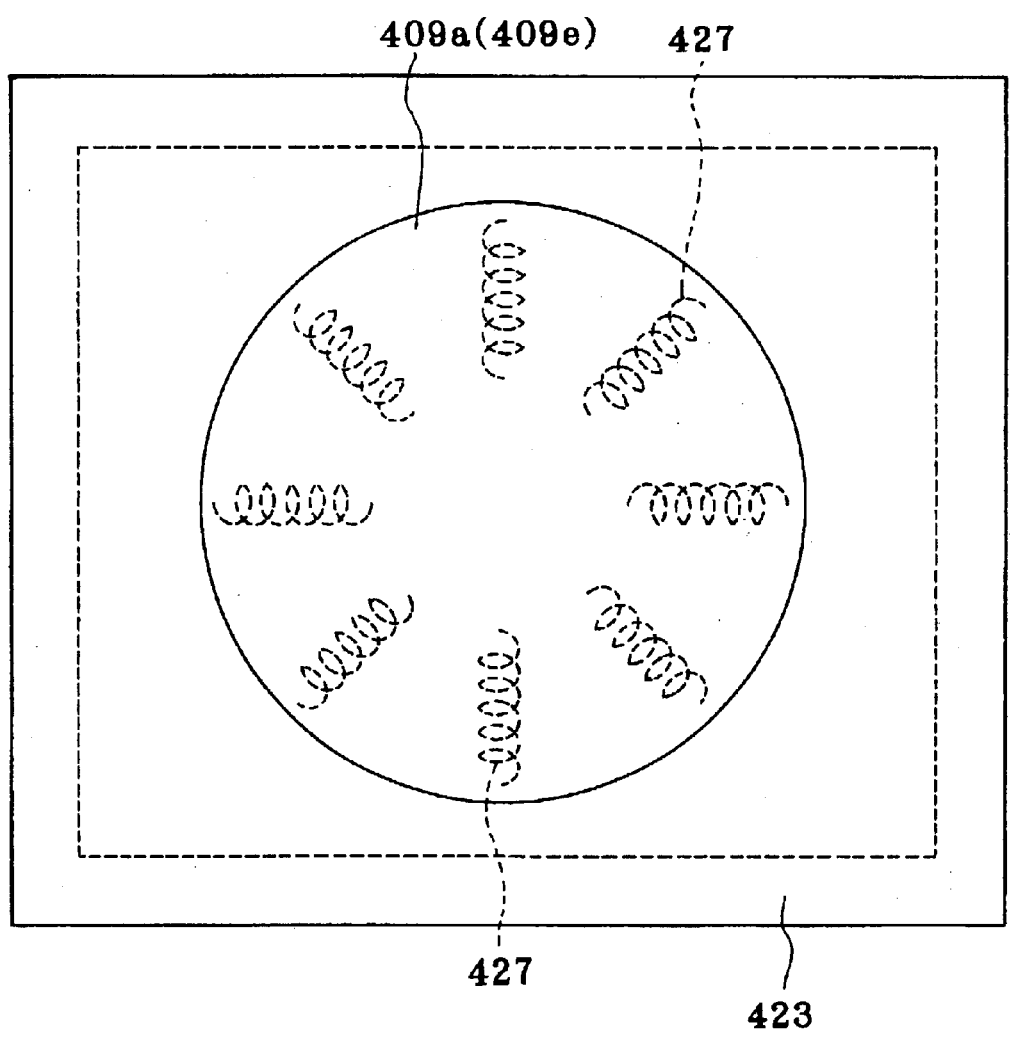
FIG. 11 is illustrative of another example of how the coils 427 are located in the embodiment of FIG. 9.
Figure 12:
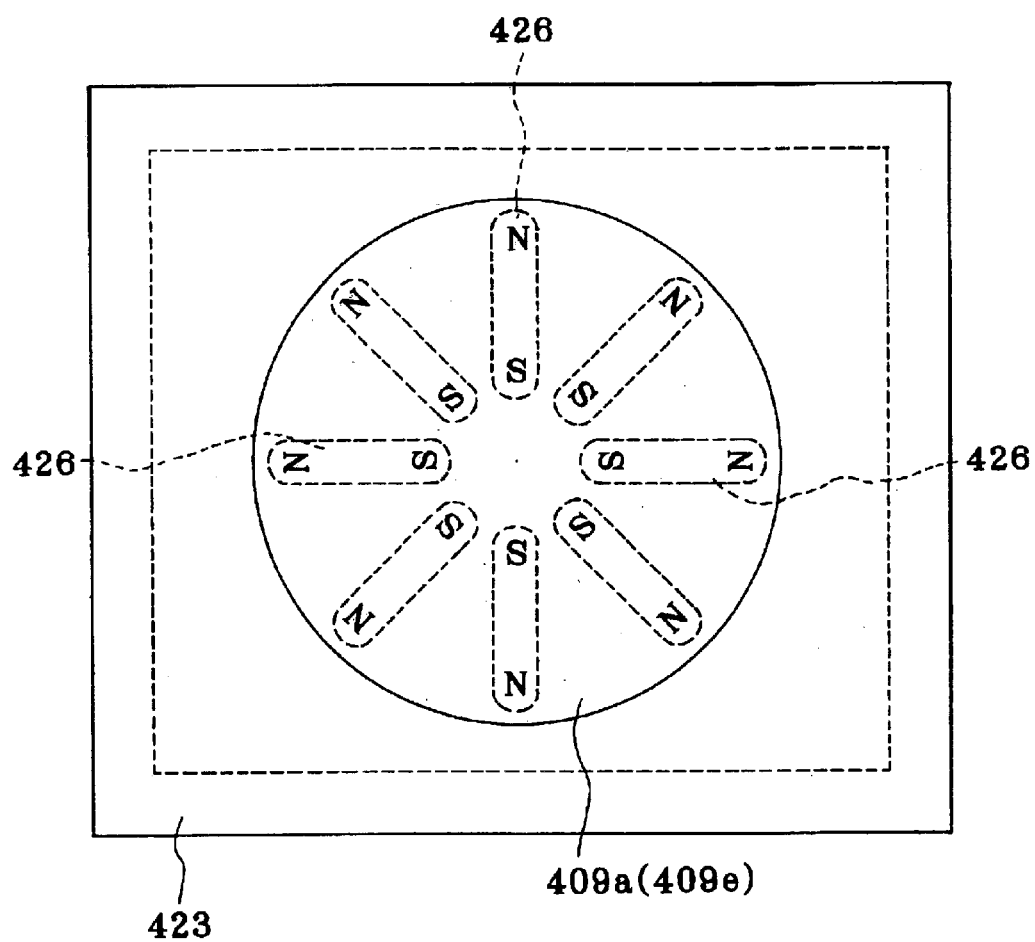
FIG. 12 is illustrative of the locations of the permanent magnets 426 suitable for the case where the coils 427 are located as in FIG. 11 in the embodiment shown in FIG. 7.

In this variable-shape mirror, the substrate 409e is formed of iron or other ferromagnetic material, and the thin film 409a functioning as a reflecting film is formed of aluminum or the like. The peripheral portion of the substrate 409e is fixedly placed on top of the support frame 423, and the coils 427 are fixed on the inside bottom of the support frame 423. In this case, since it is unnecessary to provide the thin-film coils on the lower surface of the substrate 409e, the variable-shape mirror can be simplified in construction and so can be fabricated at low costs. If the power source switch 413 is replaced by a combined changeover and open/close switch, the directions of currents passing through the coils 427 can be so changed that the shape of the substrate 409e and thin film 409a can be changed without restraint. FIG. 10 shows one example of locating the coils 427 with respect to the substrate 409e and thin film 409a, and FIG. 11 shows another example of locating the coils 427. These locations may also be applied to the example of FIG. 7. FIG. 12 illustrates the locations of the permanent magnets 426 well fit for the case where the coils 427 are radially located as shown in FIG. 11. That is, if the permanent magnets 426 each in a rod form are radially located, more delicate transformation than could be achieved in the example of FIG. 7 can then be imparted to the substrate 409e and thin film 409a. Such transformation of the substrate 409e and thin film 409a by electromagnetic force (the examples of FIGS. 7 and 9) has a merit over transformation by electrostatic force in that the driving voltage can be much more reduced.

The optical element having variable optical properties has been described with reference to some examples of the variable-shape mirror. For transformation of the mirror formed of a thin film, however, it is acceptable to make use of two or more forces, as exemplified in FIG. 6. In short, it is acceptable to transform the variable-shape mirror by simultaneous use of at least two of electrostatic force, electromagnetic force, piezoelectric effect, electro-striction, fluid pressure, magnetic field, temperature change, electromagnetic waves, etc. That is, if an optical element having variable optical properties is fabricated with two or more different driving methods, large transformation and fine transformation are then achievable at the same time and, hence, a mirror surface with satisfactory precision is achievable.

EXAMPLE 7 OF THE VARIABLE-SHAPE MIRROR

Figure 13:
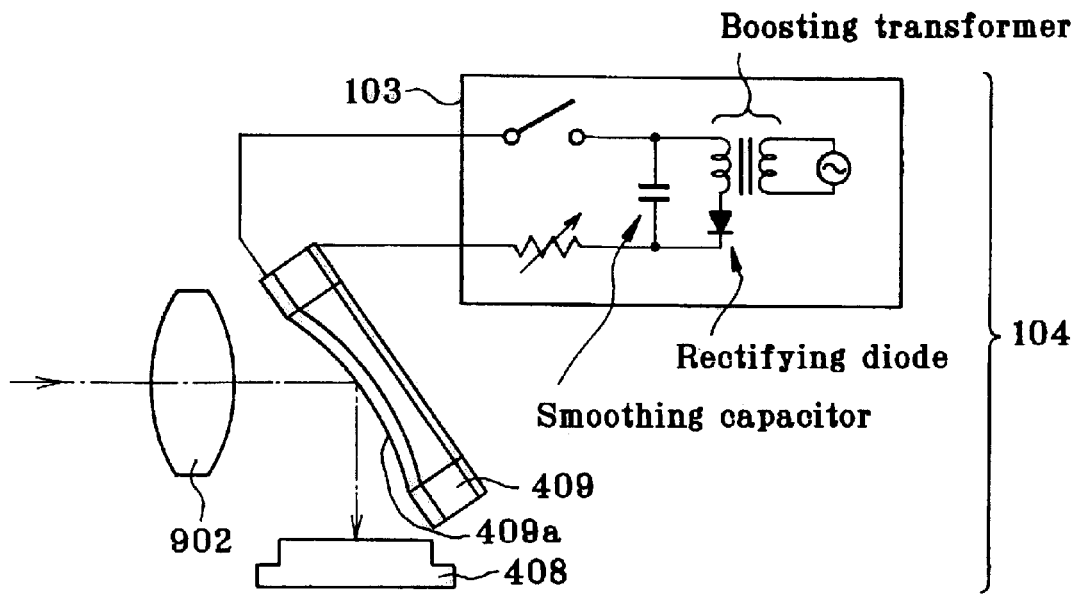
FIG. 13 is illustrative in schematic of the image pickup optical system using the variable-shape mirror 409 applicable to another optical device of the invention, specifically image pickup optical systems such as digital cameras for cellular phones, capsule endoscopes, electronic endoscopes, digital cameras for personal computers and digital cameras for PDAs.

FIG. 13 is illustrative in schematic of an arrangement wherein the variable-shape mirror 409 is used for an image pickup optical system of optical apparatus, for instance, an arrangement wherein the variable-shape mirror is used for an image pickup optical system of a digital camera for cellular phones, a capsule endoscope, an electronic endoscope, a digital camera for personal computers and a digital camera for PDAs.

This image pickup optical system comprises a single image pickup unit 104 or a single optical apparatus composed of the variable-shape mirror 409, lens 902, solid-state image pickup device 408 and control system 103. In this image pickup unit 104, object light passes through the lens 902, and arrives at the variable-shape mirror 409 where the light is condensed upon reflection at the thin film (reflecting surface) 409a, so that an image is formed on the solid-state image pickup device 408. The variable-shape mirror 409 is a sort of optical element having variable optical properties, and is sometimes called a variable-focus mirror.

According to this example, even at a varying distance, focusing is achievable by transformation of the reflecting surface 409a of the variable-shape mirror 409. Since it is not necessary to drive the lens 902 by means of a motor or the like, this example is favorable in view of size reductions, weight reductions, and power savings. The image pickup unit 104 can be used as the image pickup optical system of the invention throughout the examples. If a plurality of variable-shape mirrors 409 are used, it is then possible to set up various optical systems for zooming or other purposes.

It is noted that FIG. 13 shows one exemplary construction of the control system 103 including a booster circuit for the transformer using coils. In consideration of size reductions, it is particularly preferable to use a multilayer piezoelectric transformer. The booster circuit may be used for all the inventive variable-shape mirrors and variable-focus lenses that harness electricity; however, this booster circuit is particularly useful for variable-shape mirrors and variable-focus lenses that make use of electrostatic force and piezoelectric effect. It is here noted that what is necessary for focusing with the variable-shape mirror 409 is to form an object image on, for instance, the solid-state image pickup system 408 and detect the state where the high-frequency component of the object image reaches a maximum while varying the focal length of the variable-shape mirror 409.

EXAMPLE 8 OF THE VARIABLE-SHAPE MIRROR

Figure 14:
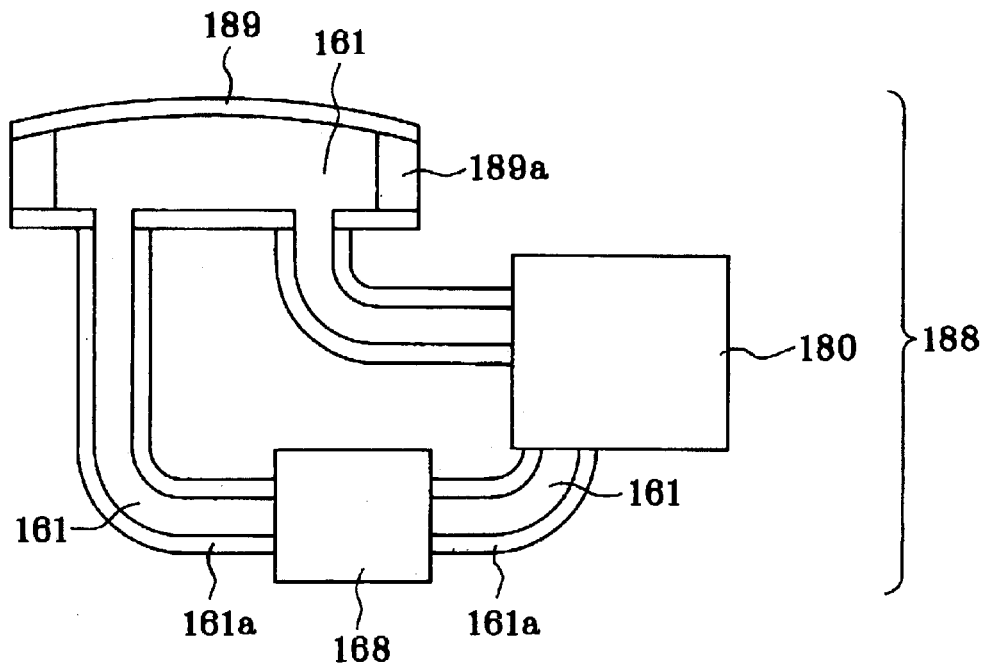
FIG. 14 is illustrative in schematic of yet another embodiment of the variable-shape mirror, that is, the variable-shape mirror 188 to and from which the fluid 161 is fed or removed by means of the micropump 180 for transformation of a lens surface.

FIG. 14 is illustrative in schematic of a further example of the variable-shape mirror. This example is directed to a variable-shape mirror shown generally at 188, wherein the fluid 161 is fed by the micropump 180 from the line 161a to the mirror surface or fed back to the line 161a to transform the mirror surface, wherein the mirror surface is defined by the surface of the reflecting surface 189 provided across the upper surface of the support frame 189a. This example has a merit of achieving large transformation of the mirror surface. It is here noted that in the line that makes a connection between the support frame 189a and the micropump 180 there is provided a reservoir 168 that can feed a given amount of fluid 161 into the support frame 189a.

The micropump 180, for instance, is a power-driven, miniature pump fabricated by micromachining.

Exemplary pumps fabricated by micromachining include those making use of thermal transformation, piezoelectric materials, and electrostatic force.

Figure 15:
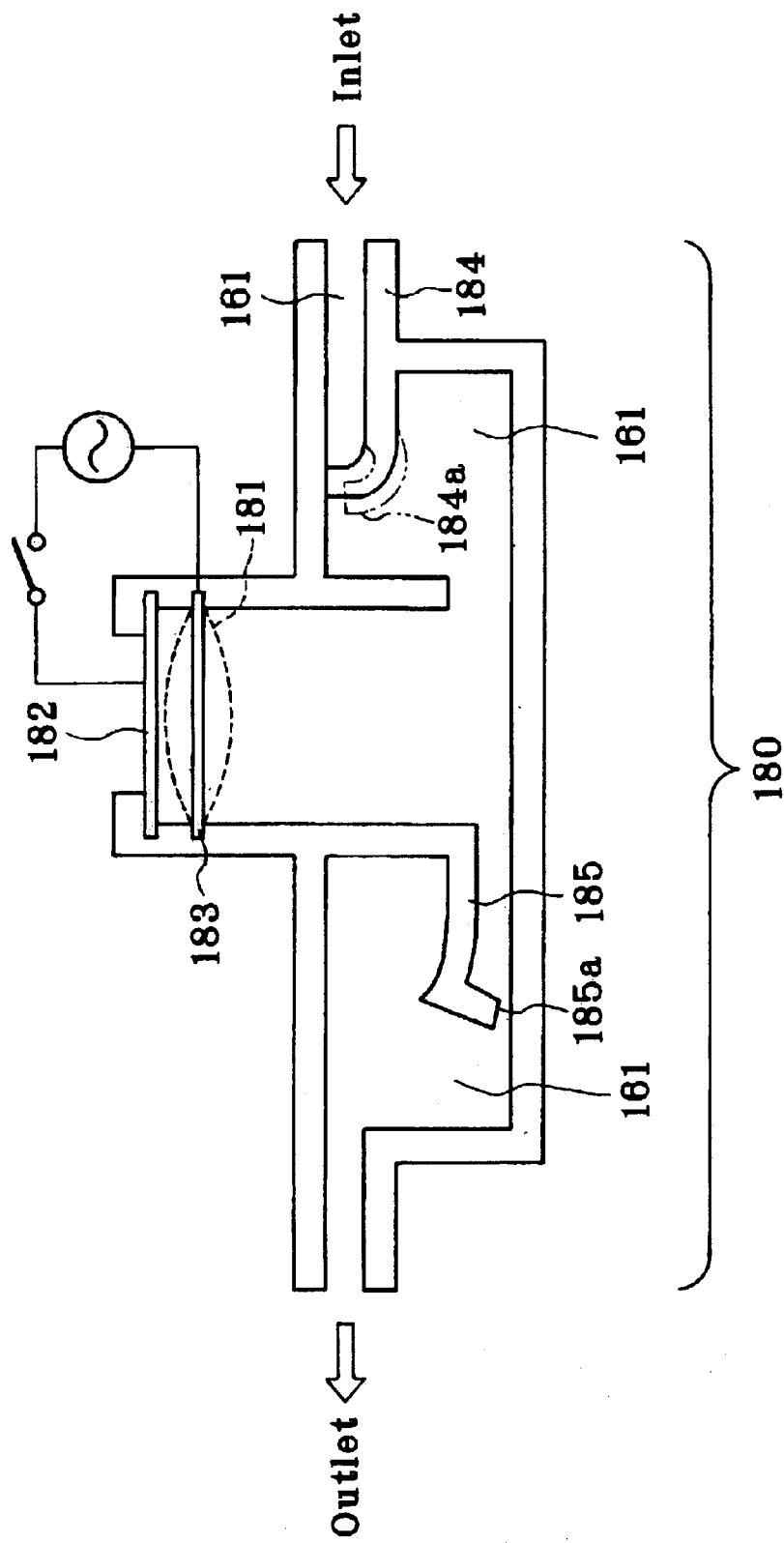
FIG. 15 is illustrative in schematic of one embodiment of the micro-pump applicable to the variable-shape mirror.

FIG. 15 is illustrative in schematic of the aforesaid micropump 180. In the micropump 180, the diaphragm 181, to and from which the fluid 161 is fed and removed, vibrates by electric force such as electrostatic force and piezoelectric effect. FIG. 15 shows an example of vibrating the diaphragm 181 by electrostatic force. In FIG. 15, reference numerals 182 and 183 are electrodes. The diaphragm 181 is transformed as indicated by dotted lines. As the diaphragm 181 vibrates, the leading ends 184a and 185a of two valves 184 and 185 open and close to feed the fluid 161 from right to left.

In the variable-shape mirror 188 shown in FIG. 14, the reflecting film 189 is transformed into concave and convex shapes depending on the amount of the fluid 161, so that the surface of the reflecting film 189 can function as a variable-shape mirror. The variable-shape mirror 188 is driven by the fluid 161, for which organic and inorganic materials such as silicone oil, air, water and jelly may be used.

It is noted that for variable-shape mirrors, variable-focus lenses or the like that harness electrostatic force, and piezoelectric effect, high driving voltages are often needed. In this case, it is preferable to set up a control system using a boosting transformer, a piezoelectric transformer or the like, as shown in FIG. 13.

It is convenient to design portions of the reflecting thin film 409a and reflecting film 189 fixed on the support frame 423 or 189a as untransformable portions, because they can be used as reference surfaces when the shape of the variable-shape mirror is measured by means of interferometers or the like.

EXAMPLE 1 OF THE VARIABLE-FOCUS LENS

Figure 16:
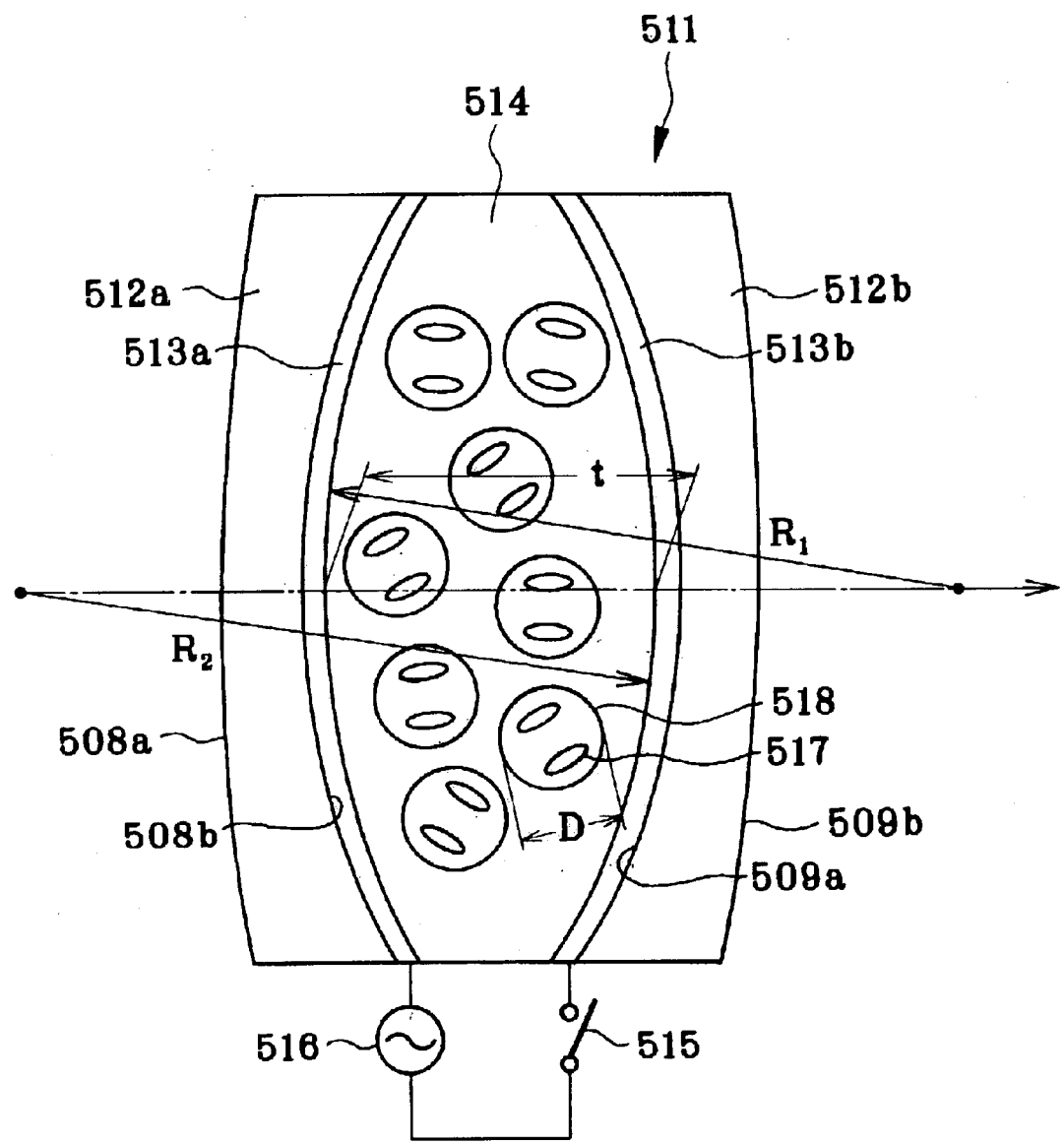
FIG. 16 is illustrative in schematic of the fundamental construction of a variable-focus lens.
Figure 18:
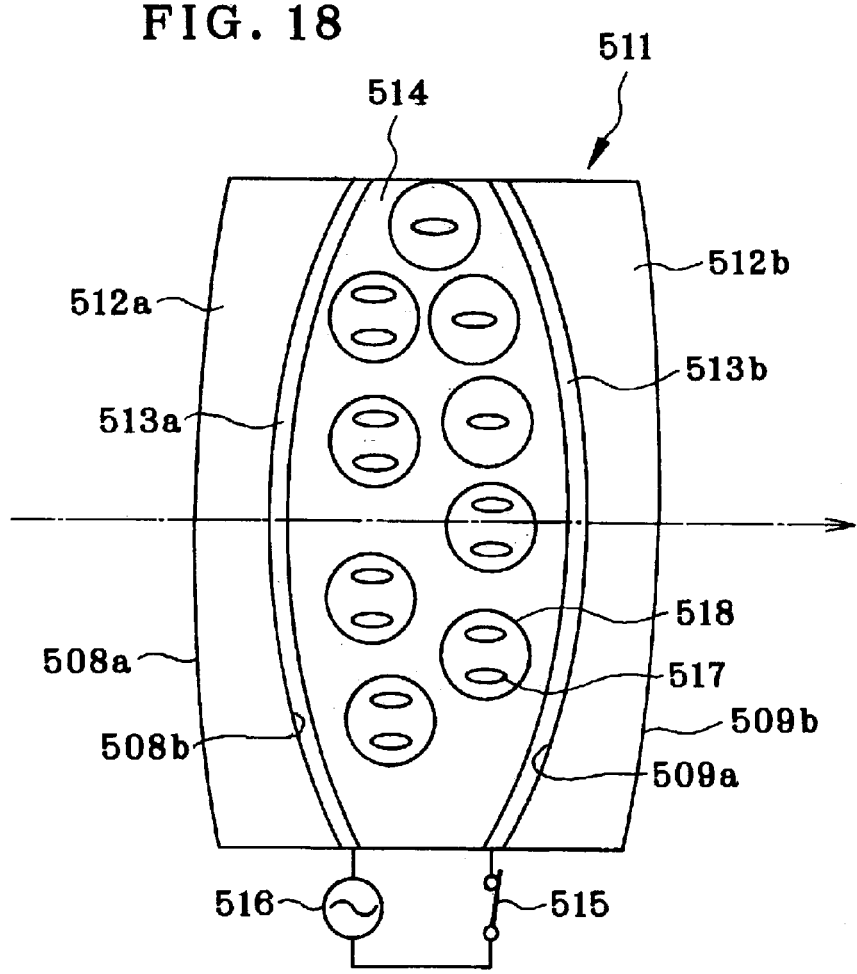
FIG. 18 is illustrative of the state of an electric filed applied on the polymer dispersed liquid crystal layer shown in FIG. 16.

FIG. 16 and FIG. 18 are illustrative of the fundamental construction of the variable-focus lens that is applicable to the optical system and optical apparatus of the invention. This variable-focus lens 511 comprises a first lens 512a having lens surfaces 508a and 508b as the first and second surfaces, a second lens 512b having lens surfaces 509a and 509b as the third and fourth surfaces, and a polymer dispersed liquid crystal layer 514 interposed between these lenses while transparent electrodes 513a and 513b are located, so that incident light is converged through the first and second lenses 512a and 512b. The transparent electrodes 513a and 513b are connected to an AC source 516 via a switch 515 for selective application of an AC electric field on the polymer dispersed liquid crystal layer 514. It is noted that the polymer dispersed liquid crystal layer 514 is constructed of a multiplicity of minute polymer cells 518 each containing a liquid crystal molecule 517, wherein the polymer cells may each be in any desired form including a spherical or polygonal shape, and that the volume of the liquid crystal layer 514 should account for the sum of the volume occupied by the polymer forming the polymer cells 518 and the volume occupied by the liquid crystal molecules 517.

Referring here to the size of a typical polymer cell 518 in a spherical form, for instance, that size is given by $$2 \text{ nm} \leq D \leq \lambda/5 \quad (1)$$

Here D is the average diameter of the cell, and λ is the wavelength of light used. That is, since the size of the liquid crystal molecule 517 is about 2 nm or greater, the lower limit value of the average diameter D should be 2 nm or greater. The upper limit value of D should preferably be λ/5 or less although depending on the thickness, t, of the polymer dispersed liquid crystal layer 514 in the axial direction of the variable-focus lens 511. This is because when D is greater than λ, light is scattered at the boundary surface of the polymer cell 518 due to a difference in the index of refraction between the polymer and the liquid crystal molecule 517 and, hence, the polymer dispersed liquid crystal layer 514 becomes opaque. In some applications, high precision is not required although depending on optical products for which variable-focus lenses are used. In this case, D may be λ or less. It is noted that the transparency of the polymer dispersed liquid crystal layer 514 becomes worse with increasing thickness t.

Figure 17:
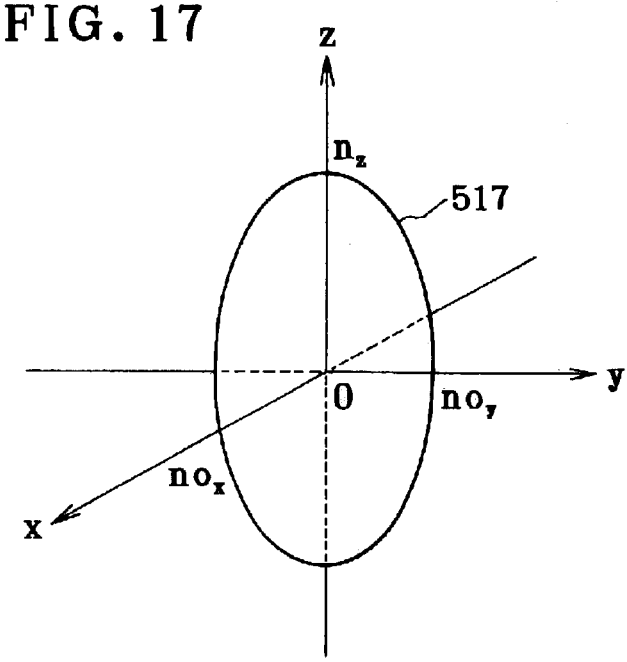
FIG. 17 is illustrative of an indicatrix for a uniaxial nematic liquid crystal molecule.

For the liquid crystal molecule 517, for instance, a uniaxial nematic liquid crystal molecule is used. The index ellipsoid of this liquid crystal molecule 517 takes such a form as shown in FIG. 17, i.e., $$n_{ox} = n_{oy} = n_o \quad (2)$$

Here $n_o$ is the refractive index of an ordinary ray, and $n_{ox}$ and $n_{oy}$ are the indices of refraction in mutually orthogonal directions within a plane including an ordinary ray.

In the state where, as shown in FIG. 16, the switch 515 is held off, that is, no electric field is applied on the polymer dispersed liquid crystal layer 514, the liquid crystal molecules 517 line up in various directions, so that the polymer dispersed liquid crystal layer 514 has a high refractive index with respect to incident light, providing a lens having strong refracting power. As shown in FIG. 18, on the other hand, as the switch 515 is put on to apply an AC electric field on the polymer dispersed liquid crystal layer 514, the liquid crystal molecules line up in such a way that the major axis direction of the index ellipsoid becomes parallel with the optical axis of the variable-focus lens 511, so that the polymer dispersed liquid crystal layer decreases in the index of refraction, providing a lens having weak refracting power.

Figure 19:
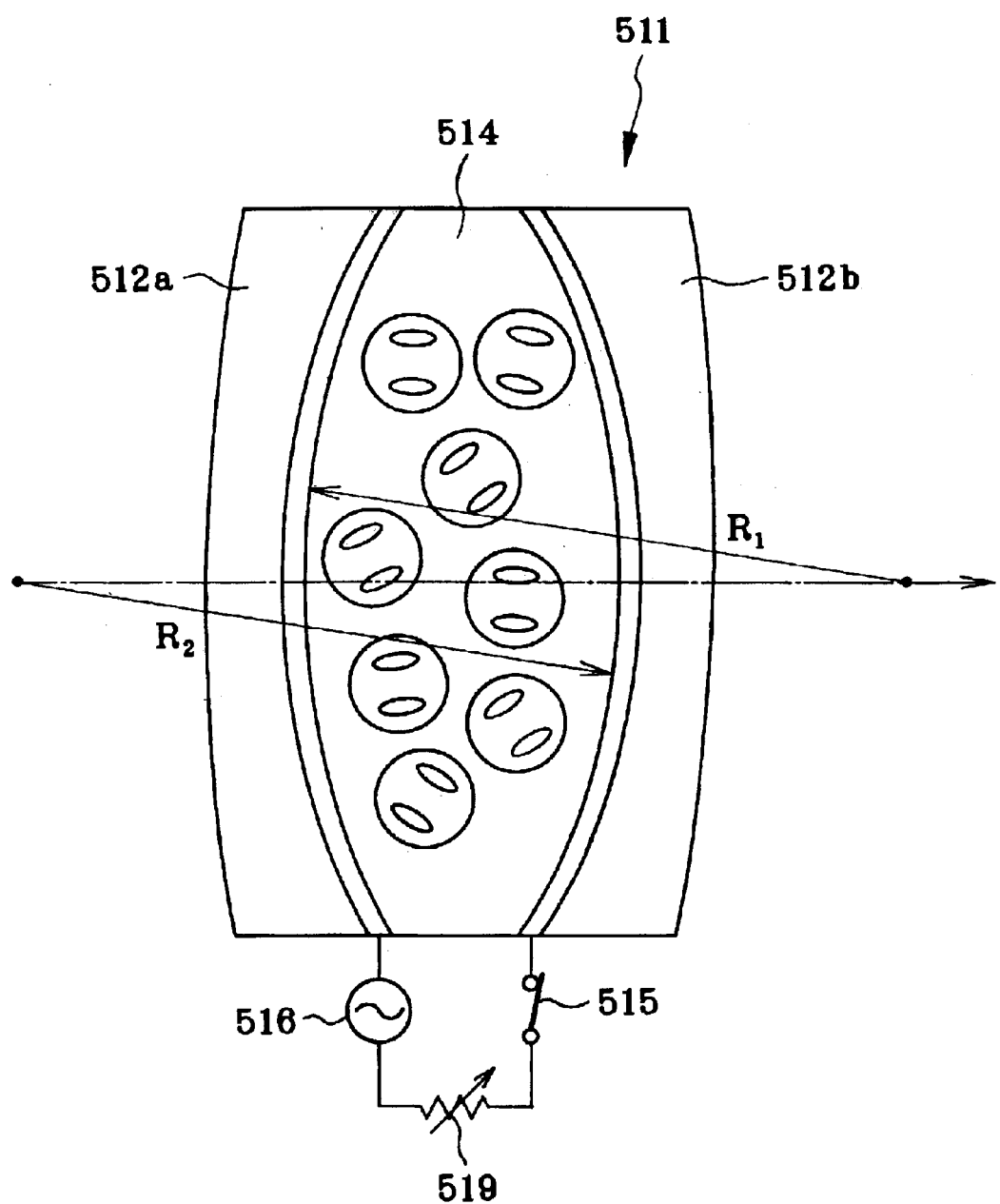
FIG. 19 is illustrative of one example of how the voltage applied on the polymer dispersed liquid crystal layer of FIG. 16 is made variable.

It is understood that it is acceptable to change the voltage applied on the polymer dispersed liquid crystal layer 514 by a variable resistor 519 as shown typically in FIG. 19 in a stepwise or continuous fashion. In this case, as the applied voltage increases, the liquid crystal molecules 517 line up in such a way that the major axis of the index ellipsoid becomes gradually parallel with the optical axis of the variable-focus lens 511, so that the refracting power can be changed in a stepwise or continuous fashion.

Referring back to the state of FIG. 16 where no electric field is applied on the polymer dispersed liquid crystal layer 514, the average refractive index of the liquid crystal molecule 517 is roughly given by $$(n_{ox}+n_{oy}+n_z)/3 = n_{LC}' \quad (3)$$

Here $n_z$ is the refractive index of the index ellipsoid in the major axis direction as shown in FIG. 17. When the aforesaid formula (2) holds, the average refractive index, $n_{LC}$, of the liquid crystal molecule 517 is given by $$(2n_o+n_e)/3 = n_{LC} \quad (4)$$

Here $n_z$ is expressed as the refractive index, $n_e$, of an extraordinary ray. Let $n_A$ be the refractive index of the polymer dispersed liquid crystal layer 514, $n_P$ be the refractive index of the polymer that forms the polymer cell 518, and ff be the ratio of the volume of the liquid crystal molecules 517 with respect to the volume of the polymer dispersed liquid crystal layer 514. Then, Maxwell-Garnet law gives $$n_A = ff \cdot n_{LC}' + (1-ff)n_P \quad (5)$$

Hence, the focal length $f_1$ of the lens formed of the polymer dispersed liquid crystal layer 514 is given by $$1/f_1 = (n_A-1)(1/R_1 - 1/R_2) \quad (6)$$

Here $R_1$ and $R_2$ are the radii of curvature of the inside surfaces of the lens elements 512a and 512b, respectively, which face the polymer dispersed liquid crystal layer 514, provided that when the center of curvature is on the image point side, $R_1$ and $R_2$ have each a positive value. It is noted that refraction by the outside surfaces of the lens elements 512a and 512b is not taken into consideration. Thus, the focal length of the lens formed only of the polymer dispersed liquid crystal layer 514 is given by equation (6).

Suppose here that the average refractive index of an ordinary ray is given by $$(n_{ox}+n_{oy})/2 = n_o' \quad (7)$$

Then, the refractive index $n_B$ of the polymer dispersed liquid crystal layer 514 in the state shown in FIG. 18, where an electric field is applied on the polymer dispersed liquid crystal layer 514, is given by $$n_B = ff \cdot n_o' + (1-ff)n_P \quad (8)$$

Thus, the focal length $f_2$ of the lens composed only of the polymer dispersed liquid crystal layer 514 in this case is given by $$1/f_2 = (n_B-1)(1/R_1 - 1/R_2) \quad (9)$$

It is noted that when a voltage lower than that in FIG. 18 is applied on the polymer dispersed liquid crystal layer 514, the focal length is given by a value between the focal length $f_1$ given by equation (6) and the focal length $f_2$ given by equation (9).

From equations (6) and (9), the rate of change in the focal length of the lens formed of the polymer dispersed liquid crystal layer 514 is given by $$|(f_2-f_1)/f_2| = |(n_B-n_A)/(n_B-1)| \quad (10)$$

Thus, that rate of change may be increased by increasing $|n_B-n_A|$. Here, $$n_B - n_A = ff(n_o' - n_{LC}') \quad (11)$$

Hence, if $|n_o'-n_{LC}'|$ is increased, it is then possible to increase the rate of change. In practical applications, the refractive index, $n_B$, of the polymer dispersed liquid crystal layer 514 is of the order of 1.3 to 2. Suppose here $$0.01 \leq |n_o'-n_{LC}'| \leq 10 \quad (12)$$

Then, when ff=0.5, an effective variable-focus lens can be obtained because the focal length of the lens formed of the polymer dispersed liquid crystal layer 514 can be varied at least 0.5%. It is noted that $|n_o'-n_{LC}'|$ cannot possibly exceed 10 due to current restraints on available liquid crystal materials.

An account is now given of the grounds for the upper limit value to the aforesaid equation (1). "Solar energy Materials and Solar Cells", Vol. 31, Wilson and Eck, 1993, Eleevier Science Publishers B. v., pp. 197–214, "Transmission variation using scattering/transparent switching film" shows changes the transmission $\tau$ upon variations in the size of polymer dispersed liquid crystals. The publication shows at page 406 and in FIG. 6 that when t=300 $\mu$m, ff=0.5, $n_P$=1.45, $n_{LC}$=1.585 and $\lambda$=500 nm, the theoretical value for transmittance $\tau$ is $\tau \approx 90\%$ on condition that r=5 nm where r is the radius of a polymer dispersed liquid crystal, D=$\lambda$/50 and D·t=$\lambda$·6 $\mu$m (the units of D and $\lambda$ are nm)), and $\tau \approx 50\%$ on condition that r=25 nm (D=$\lambda$/10).

For instance, suppose here the case where t=150 $\mu$m. If the transmittance $\tau$ changes with the exponential function for t, then the transmittance $\tau$ at t=150 $\mu$m is assumed to be $\tau \approx 70\%$ at r=25 nm (D=$\lambda$/10 and D·t=$\lambda$·15 $\mu$m). Where t=75 $\mu$m, likewise, $\tau \approx 80\%$ at r=25 nm (D=$\lambda$/10 and D·t=$\lambda$·7.5 $\mu$m).

From these results, if $$D \cdot t \leq \lambda \cdot 15 \ \mu m \tag{13}$$

the transmittance $\tau$ is then between 70% and 80% or greater, ensuring a practically satisfactory lens. For instance, this means that where t=75 $\mu$m, a sufficient transmittance is obtainable at D$\leq$1/5.

The closer the value of $n_P$ to the value of $n_{LC}'$, the better the transmittance of the polymer dispersed liquid crystal layer 514 becomes. When the value of $n_o'$ differs from the value of $n_P$, on the other hand, the transmittance of the polymer dispersed liquid crystal layer 514 becomes worse. When the following equation (14) is satisfied, the transmittance of the polymer dispersed liquid crystal layer 514 is improved on average in both the state of FIG. 16 and the state of FIG. 18.

$$n_P = (n_o' + n_{LC}')/2 \tag{14}$$

For the variable-focus lens 511 wherein the lens formed of the polymer dispersed liquid crystal layer 514 is interposed between the first lens 512a and the second lens 512b, the transmittance is substantially on the same level and, preferably, on a higher level whether in the state of FIG. 16 or in the state of FIG. 18. There are thus some restrictions on the polymer material available for the formation of the polymer cell 518 and the material available for the liquid crystal molecule 517. In practical applications, however, it is preferred that $$n_o' \leq n_P \leq n_{LC}' \tag{15}$$

If the aforesaid equation (14) is satisfied, the aforesaid equation (13) can then slack further to $$D \cdot t \leq \lambda \cdot 60 \ \mu m \tag{16}$$

This is because the reflectivity is in proportion to the square of a refractive index difference according to Fresnel reflection law; reflection of light at the boundary between the polymer forming the polymer cell 518 and the liquid crystal molecule 517, that is, the decrease in the transmittance of the polymer dispersed liquid crystal layer 514 is roughly proportional to the square of the difference in the index of refraction between the aforesaid polymer and the liquid crystal molecule 517.

The foregoing hold true for the case where $n_o' \approx 1.45$, and $n_{LC}' \approx 1.585$. More generally, however, this may be formulated as follows.

$$D \cdot t \leq 1 \cdot 15 \ \mu m \cdot (1.585 - 1.45)^2 / (n_u - n_P)^2 \tag{17}$$

Here $(n_u - n_P)^2$ should be the larger of $(n_{LC}' - n_P)^2$ and $(n_o' - n_P)^2$.

To increase the change in the focal length of the lens formed of the polymer dispersed liquid crystal layer 514, it is preferable for ff to have a larger value. At ff=1, however, the volume of the polymer reduces to zero; no polymer cell 518 can be formed. Hence, $$0.1 \leq ff \leq 0.999 \tag{18}$$

The smaller the value of ff, the more improved the transmittance $\tau$ is. Preferably, the aforesaid formula (17) should thus be replaced by $$4 \times 10^{-6} \ [\mu m]^2 \leq D \cdot t \leq \lambda \cdot 45 \ \mu m \cdot (1.585 - 1.45)^2 / (n_u - n_P)^2 \tag{19}$$

It is here noted that as can be seen from FIG. 16, the lower limit value of t is t=D, and the lower limit value of D·t is $(2 \times 10^{-3} \ \mu m)^2$, that is, $4 \times 10^{-6} \ [\mu m]^2$ because the value of D is 2 nm or greater as already mentioned.

It is understood that where D is greater than the range of 10 nm to 5 nm, the optical properties of a substance can be approximated by the index of refraction, as stated in Tadashi Mukai, "Iwanami's Science Library Volume 8—There Planetoids Coming", page 58, Iwanami Shoten, 1994. As D exceeds 500$\lambda$, scattering of light becomes geometric, and so scattering of light at the interface between the polymer forming the polymer cell 518 and the liquid crystal molecule 517 increases pursuant to Fresnel reflection formula. In practical application, therefore, D should be $$7 \ nm \leq D \leq 500 \lambda \tag{20}$$

Figure 20:
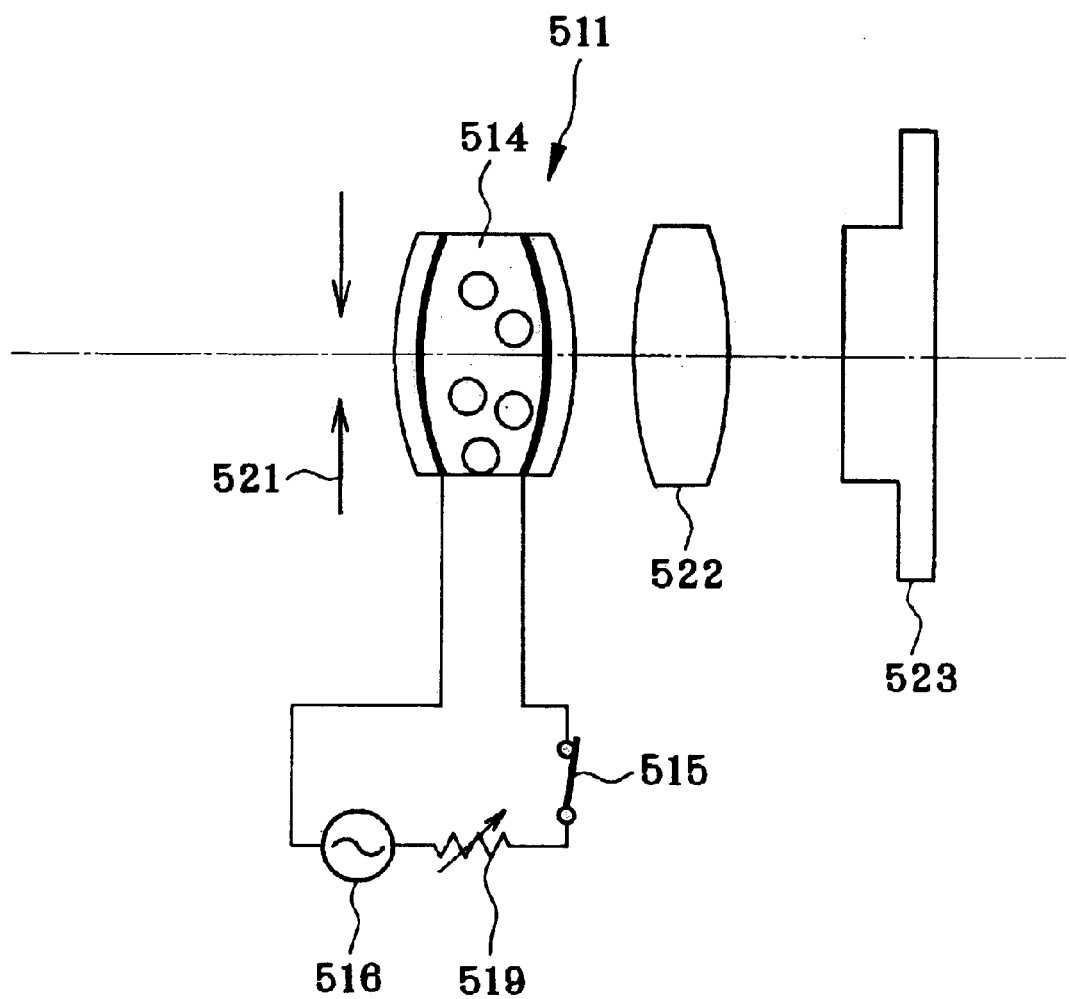
FIG. 20 is illustrative of the arrangement of one embodiment of the image pickup system for digital cameras, in which the variable-focus lens is used.

FIG. 20 is illustrative of the construction of an image pickup optical system for digital cameras, wherein the variable-focus lens 511 shown in FIG. 19 is used. In this image pickup optical system, an image of an object (not shown) is formed on a solid-state image pickup device 523 comprising a CCD as an example through a diaphragm 521 and variable-focus lenses 511 and 522. In FIG. 20, the liquid crystal molecules are not shown.

With such an image pickup optical system, an AC voltage applied on the polymer dispersed liquid crystal layer 514 of the variable-focus lens 511 is adjusted by means of the variable resistor 519 to change the focal length of the variable-focus lens 511, so that continuous focusing can be performed at an object distance from infinity up to 600 mm as an example without movement of the variable-focus lenses 511 and 512 in the optical axis direction.

EXAMPLE 1 OF THE VARIABLE-FOCUS DIFFRACTION OPTICAL ELEMENT

Figure 21:
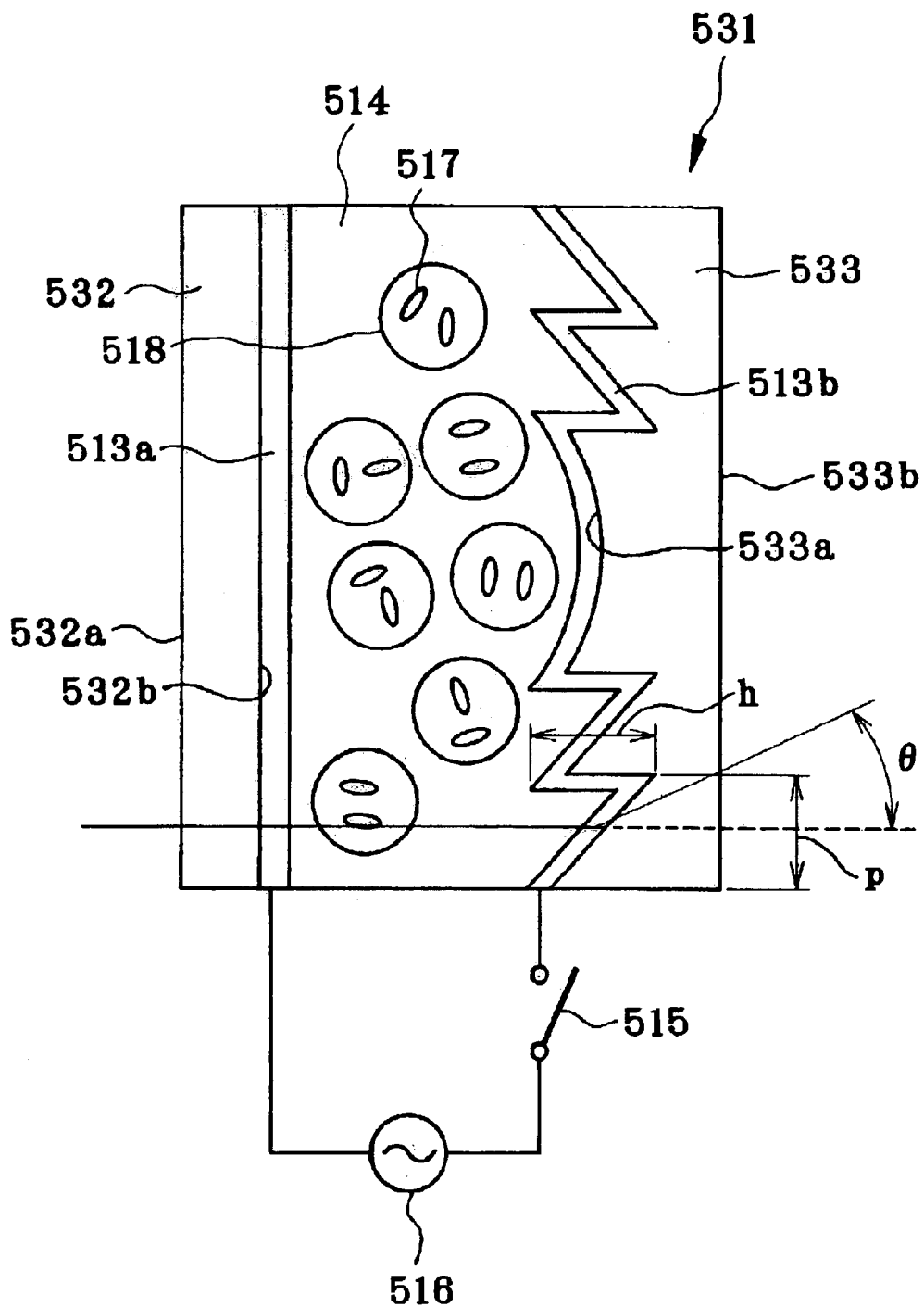
FIG. 21 is illustrative of the construction of one embodiment of the variable-focus diffraction optical system.

FIG. 21 is illustrative of one exemplary construction of the variable-focus diffraction optical element functioning as the optical element having variable optical properties.

This variable-focus diffraction optical element 531 comprises a first transparent substrate 532 having a first surface 532a and a second surface 532b which are parallel with each other and a second transparent substrate 533 having a third surface 533a provided thereon with a ring diffraction grating having a groove depth of the order of wavelength of light and having sawtooth shape in section and a fourth surface 433b that is flat, so that incident light emerges from the element through the first and second transparent substrates 532 and 533. Between the first and second transparent substrates 532 and 533, the polymer dispersed liquid crystal layer 514 is interposed while transparent electrodes 513a and 513b are located, as explained with reference to FIG. 16.

The transparent electrodes 513a and 513b are connected to an AC power source 516 via a switch 515, so that an AC voltage can be applied on the polymer dispersed liquid crystal layer 514.

In such an arrangement, a ray incident on the variable-focus diffraction optical element 531 leaves while deflected by an angle θ that satisfies $$p \sin \theta = m\lambda \tag{21}$$

Here p is the grating pitch of the third surface 533a and m is an integer. Let h be the groove depth, $n_{33}$ be the refractive index of the transparent substrate 533 and k be an integer. If the following equations (22) and (23)

$$h(n_A - n_{33}) = m\lambda \tag{22}$$

$$h(n_B - n_{33}) = k\lambda \tag{23}$$

are satisfied, the diffraction efficiency becomes 100% at the wavelength λ, thereby preventing flaring. In equation (22) $n_A$ is the refractive index of the polymer dispersed liquid crystal polymer 514 at no AC applied voltage, and in equation (23) $n_B$ is the refractive index of the polymer dispersed crystal polymer 514 at an applied AC voltage.

By finding a difference between both sides in equations (22) and (23), $$h(n_A - n_B) = (m-k)\lambda \tag{24}$$

is obtained. Therefore, if, for instance, λ=500 nm, $n_A$=1.55 and $n_B$=1.5, then $$0.05 \, h = (m-k) \cdot 500 \, nm$$

If m=1 and k=0, then $$h = 10{,}000 \, nm = 10 \, \mu m$$

In this case, the refractive index $n_{33}$ of the transparent substrate 533 may be $n_{33}$=1.5, as found from the aforesaid equation (22). If the grating pitch at the peripheral area of the variable-focus diffraction optical element 531 is p=10 μm, then θ≈2.87° at which a lens having an F-number of 10 is obtainable.

Such a variable-focus diffraction optical element 531 has an optical path length that is variable as the application of voltage on the polymer dispersed liquid crystal layer 514 is held on or off; for instance, it may be located at a portion of a lens system at which light beams are not parallel for focusing purposes or so as to vary the focal length of the lens system, etc.

It is noted that in this example, the aforesaid equations (22), (23) and (24) may practically be replaced by $$0.7 \, m\lambda \leq h(n_A - n_{33}) \leq 1.4 \, m\lambda \tag{25}$$

$$0.7 \, k\lambda \leq h(n_B - n_{33}) \leq 1.4 \, k\lambda \tag{26}$$

$$0.7 \, (m-k)\lambda \leq h(n_A - n_B) \leq 1.4(m-k)\lambda \tag{27}$$

EXAMPLE 2 OF THE VARIABLE-FOCUS LENS

Figure 22:
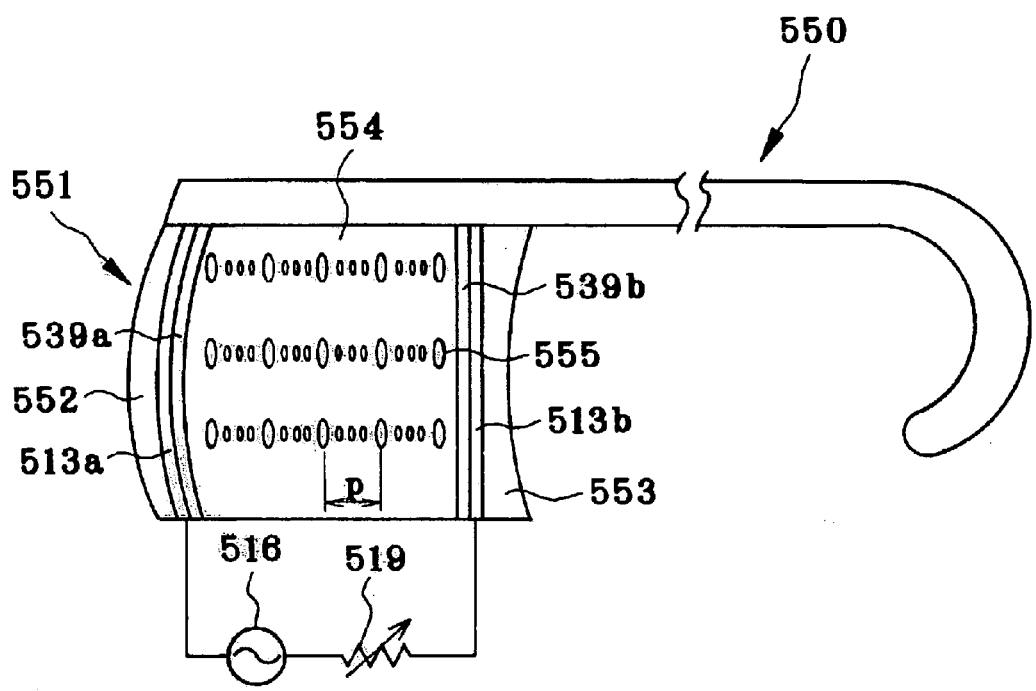
FIG. 22 is illustrative of variable-focus glasses comprising variable-focus lenses using twisted nematic liquid crystals.
Figure 23:
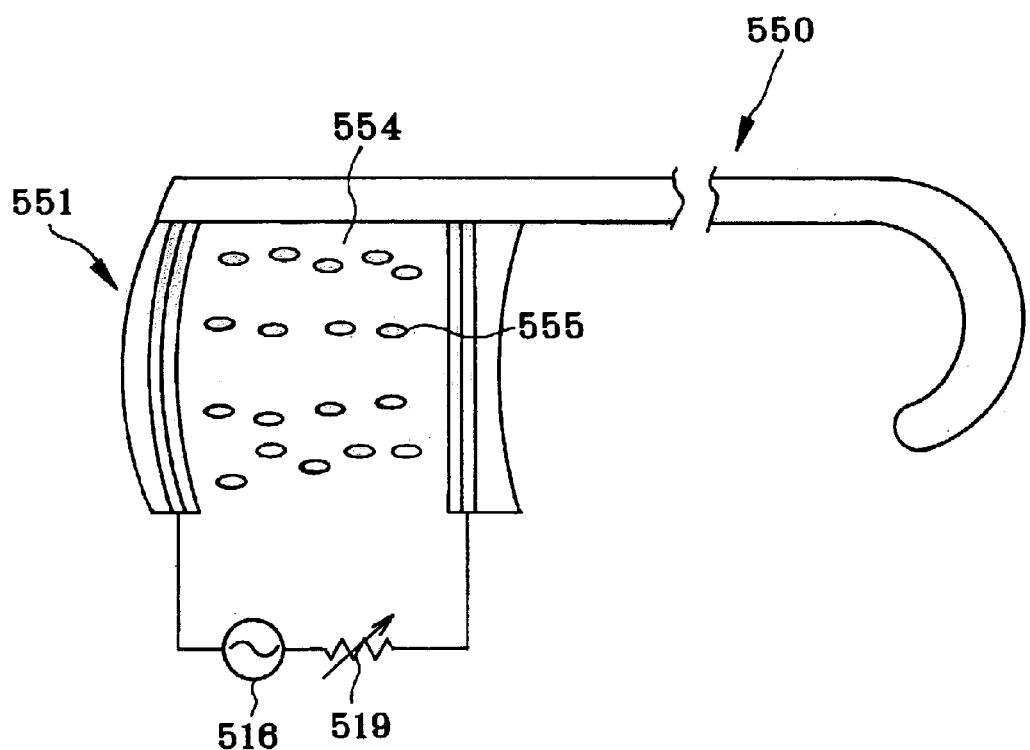
FIG. 23 is illustrative of how liquid crystal molecules line up when higher voltage is applied on the twisted nematic liquid crystal layer shown in FIG. 22.

There is also a variable-focus lens using a twisted nematic liquid crystal. FIGS. 22 and 23 are illustrative in section of one exemplary construction of variable-focus spectacles 550. The variable-focus lens 551 is constructed of lenses 552 and 553, orientation films 539a and 539b mounted on the inside surfaces of these lenses via transparent electrodes 513a and 513b, and a twisted nematic liquid crystal layer 554 interposed between these orientation films. The transparent electrodes 513a and 513b are connected to an AC power source 516 via a variable resistor 519, so that an AC voltage can be applied on the twisted nematic liquid crystal layer 554.

In such an arrangement, as the voltage applied on the twisted nematic liquid crystal layer 554 is increased, the liquid crystal molecules 555 line up in a homeotroic fashion as shown in FIG. 23 and, hence, the twisted nematic liquid crystal layer 554 is lower in refractive index and longer in focal length than the twisted nematic state at a low applied voltage as shown in FIG. 22.

It is here noted that the spiral pitch P of the liquid crystal molecules 555 in the twisted nematic state shown in FIG. 22 must be on the same level as or by far lower than the wavelength λ of light. For instance, it is thus preferred that $$2 \, nm \leq P \leq 2\lambda/3 \tag{28}$$

It is here noted that the lower limit value of this condition is determined depending on the size of the liquid crystal molecule 555, and the upper limit value is required to ensure that when incident light is natural light, the twisted nematic liquid crystal layer 554 behaves as an isotropic medium in the state of FIG. 22. Unless this upper limit value is satisfied, the variable-focus lens 551 becomes a lens having varying focal length depending on the direction of polarization, only to yield a blurred image due to the formation of a double image.

EXAMPLE 1 OF THE VARIABLE DEFLECTION ANGLE PRISM

Figure 24A:
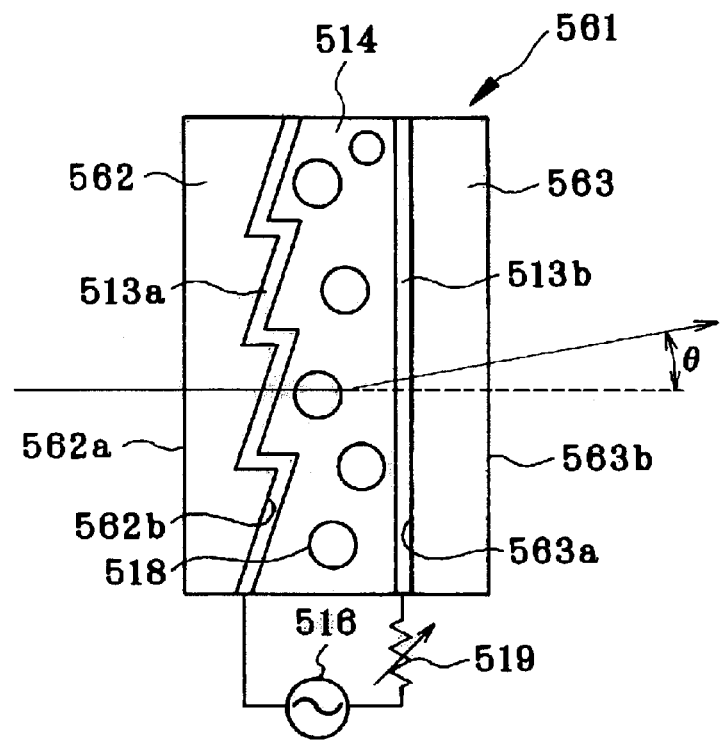
FIGS. 24(a) and 24(b) are illustrative of the constructions of two embodiments of the variable deflection angle prism.
Figure 24B:
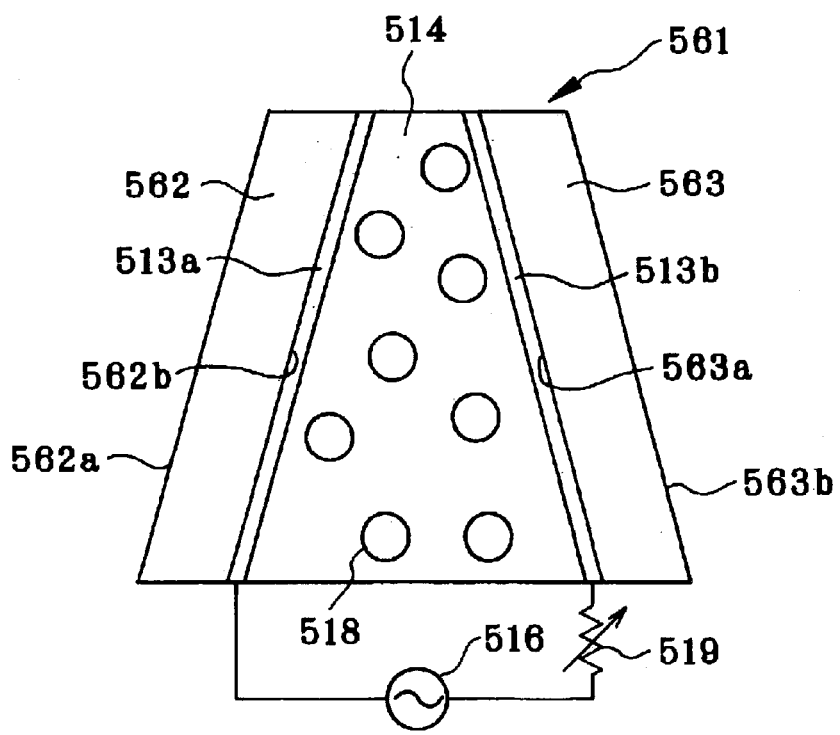

FIG. 24(a) is illustrative of one exemplary construction of the variable deflection angle prism functioning as the optical element having variable optical properties. This variable deflection angle prism 561 comprises a first transparent substrate 562 that is located on the entrance side of the prism and has a first surface 562a and a second surface 562b, and a second transparent substrate 563 in a plane-parallel plate form, which is located on the exit side of the prism and has a third surface 563a and a fourth surface 563b. The inside (second) surface 562b of the entrance-side transparent substrate 562 is configured in a Fresnel form, and between the transparent substrate 562 and the exit-side transparent substrate 563 there is provided a polymer dispersed liquid crystal layer 514 while transparent electrodes 513a and 513b are located, as explained with reference to FIG. 16. The transparent electrodes 513a and 513b are connected to an AC power source 516 via a variable resistor 519, so that an AC voltage is applied on the polymer dispersed liquid crystal layer 514 to control the angle of deflection, θ, of light transmitting through the variable deflection angle prism 561 and thereby control the direction of deflection of the transmitted light. As shown in FIG. 24(a), the inside surface 562b of the transparent substrate 562 is configured in a Fresnel form. As shown in FIG. 24(b) as an example, however, it is acceptable to relatively incline the inside surfaces of the transparent substrates 562 and 563, as is the case with an ordinary prism. Alternatively, it is acceptable to configure the prism in such a diffraction grating form as shown in FIG. 21. The aforesaid formulae (21) to (27) go true for such a diffraction grating-like prism.

Figure 25:
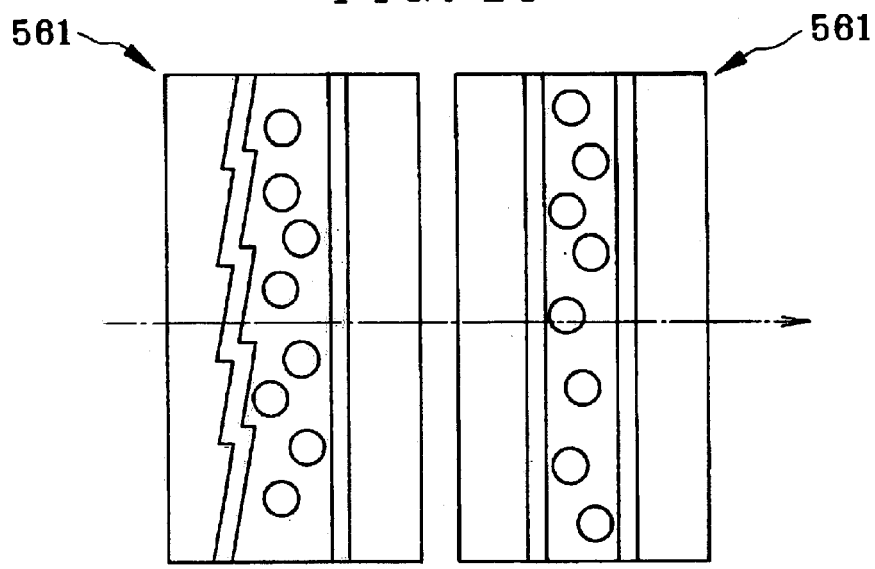
FIG. 25 is illustrative of how the variable deflection angle prism of FIGS. 24(a) and 24(b) is used.

The variable deflection angle prism 561 having such construction, for instance, may effectively be used for prevention of shaking of TV cameras, digital cameras, film cameras, binoculars, etc. Preferably in this case, the direction of diffraction (deflection) of the variable deflection angle prism 561 should be set in a vertical direction. To make further improvements in performance, it is preferable to use two variable deflection angle prisms 561, each shown in FIG. 24(a), while the direction of deflection of each prism 561 is set in a different direction in such a way that, as shown typically in FIG. 25, the angle of diffraction varies in horizontally and vertically diagonal directions. In FIGS. 24 and 25, the liquid crystal molecules are not shown.

EXAMPLE 3 OF THE VARIABLE-FOCUS LENS

Figure 26:
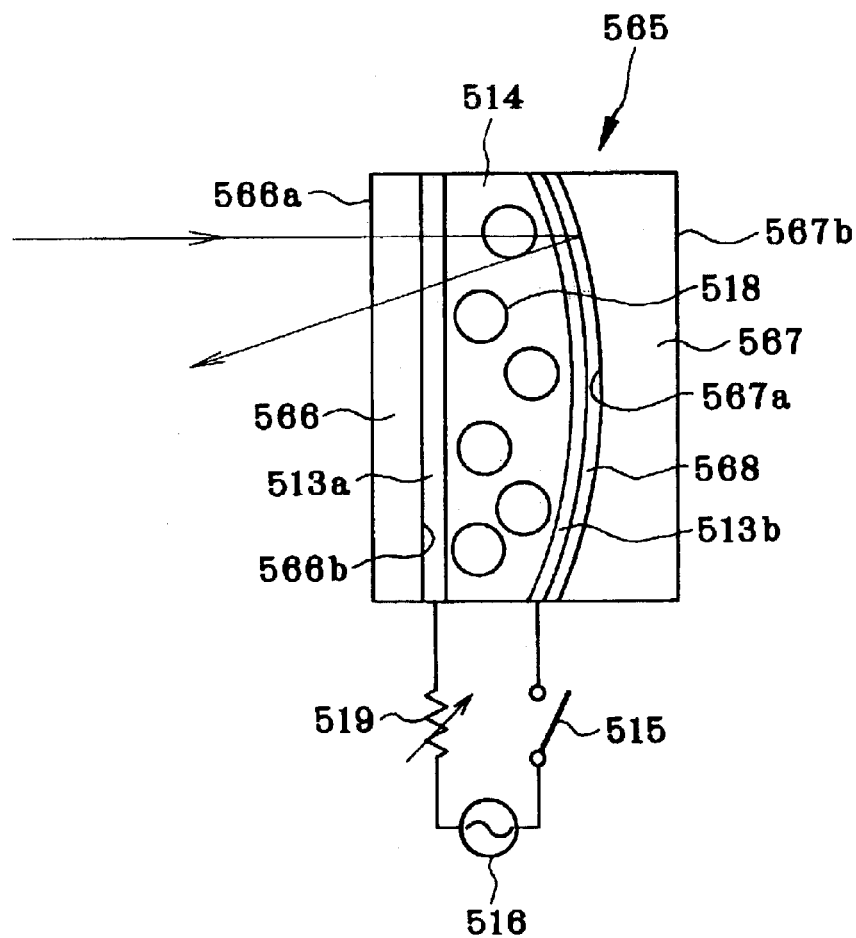
FIG. 26 is illustrative of the construction of one embodiment of the variable-focus mirror as a variable-focus lens.

FIG. 26 is illustrative of an example wherein the variable-focus lens is used as a variable-focus mirror in an optical system. This variable-focus mirror 565 comprises a first transparent substrate 566 having a first surface 566a and a second surface 566b and a second transparent substrate 567 having a third surface 567a and a fourth surface 567b. The first transparent substrate 566 is configured in a plane plate or lens form with the inside (second) surface 566b provided with a transparent electrode 513a, and the inside (third) surface 567a of the second transparent substrate 567 is configured in a concave surface form provided thereon with a reflecting film 568. In addition, the reflecting film 568 is provided thereon with a transparent electrode 513b. Between the transparent electrodes 513a and 513b, the polymer dispersed liquid crystal layer 514 is provided as explained with reference to FIG. 16. The transparent electrodes 513a and 513b are then connected to an AC power source 516 via a switch 515 and a variable resistor 519, so that an AC voltage can be applied on the polymer dispersed liquid crystal layer 514. In FIG. 26, the liquid crystal molecules are not shown.

According to such an arrangement, a light ray entered from the transparent substrate 566 side takes an optical path that is turned back by the reflecting film (reflecting surface) 568 through the polymer dispersed liquid crystal layer 514, so that the light ray can act twice on the polymer dispersed liquid crystal layer 514. In addition, by varying the voltage applied on the polymer dispersed liquid crystal layer 514, the focal position of reflected light can be varied. In this case, the light ray incident on the variable-focus mirror 565 transmits twice through the polymer dispersed liquid crystal layer 514; each of the aforesaid formulae holds true for this example on condition that t is indicative of a thickness twice as large as the polymer dispersed liquid crystal layer 514. It is noted that if the inside surface of the transparent substrate 566 or 567 is configured in such a diffraction grating form as shown in FIG. 21, it is then possible to reduce the thickness of the polymer dispersed liquid crystal layer 514 and thereby achieve further reductions in scattered light.

While the invention has been explained on the presumption that to prevent deterioration in the liquid crystals, the AC voltage is applied on the liquid crystal layer using the AC power source 516 as a power source, it is acceptable to apply DC voltage on the liquid crystal layer using a DC power source. Changes in the direction of the liquid crystal molecules are achievable not only by changing the applied voltage but also by changing the frequency of the electric field applied on the liquid crystal layer, the intensity and frequency of the magnetic filed applied on the liquid crystal layer or the temperature of the liquid crystal layer, etc. In the foregoing explanation of the invention, some polymer dispersed liquid crystal layers are in a state close to solid rather than liquid. In this case, one of the lenses 512a and 512b shown in FIG. 16, one of the transparent substrates 532 and 533 shown in FIG. 21, one of the lenses 552 and 553 shown in FIG. 22, the transparent substrate 563 shown in FIG. 24(a), one of the transparent substrates 562 and 563 shown in FIG. 24(b), and one of the transparent substrates 566 and 567 shown in FIG. 26 may be dispensed with.

The merits of the optical elements of such types as explained with reference to FIGS. 16 to 26, wherein the focal length, etc. of the optical elements vary with changes in the refractive index of the medium forming the polymer dispersed liquid crystal layer, are that mechanical designs are facilitated, mechanical structures are simplified, etc.

EXAMPLE 4 OF THE VARIABLE-FOCUS LENS

Figure 27:
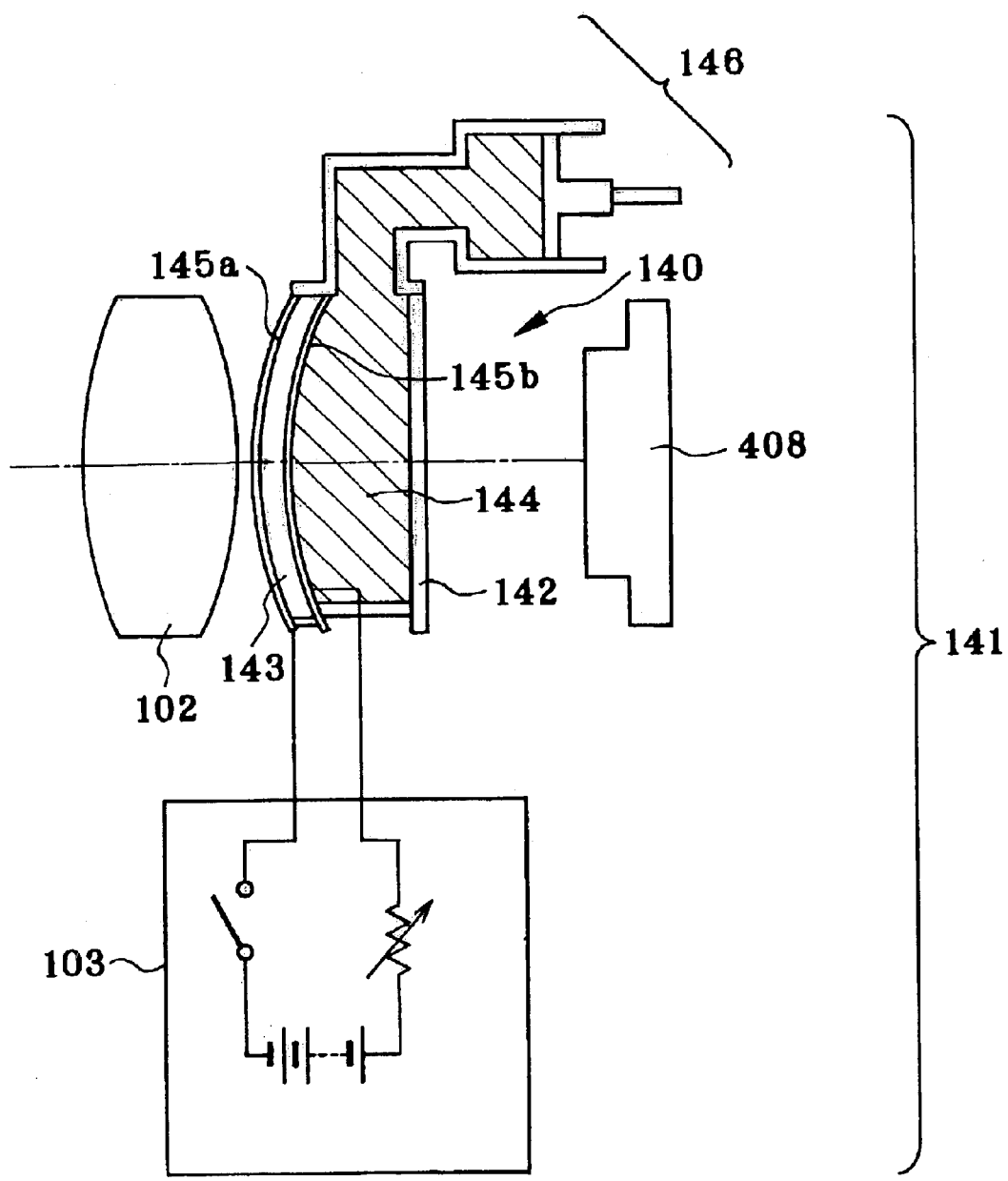
FIG. 27 is illustrative of the image pickup unit 141 used as the optical device of the invention, and the optical system for the image pickup unit 141, in which the variable-focus lens 140 is used.

FIG. 27 is illustrative in schematic of one exemplary construction of the image pickup unit 141 constructed by using a variable-focus lens 140 in the image pickup optical system of the optical apparatus of the invention. The image pickup unit 141 may be used as the image pickup optical system of the invention.

This example is directed to an image pickup lens made up of a lens 102 and a variable-focus lens 140. This image pickup lens is used together with a solid-state image pickup device 408 to set up the image pickup unit 141. The variable-focus lens 140 is composed of a plane plate form of transparent member 142, a piezoelectric synthetic resin or other soft transparent substance 143 sandwiched between a pair of transparent electrodes 145a and 145b, and a light-transmitting fluid or jelly-like substance 144 sandwiched between the transparent member 142 and the transparent electrode 145b.

For the fluid or jelly-like substance 144, silicone oil, elastic rubber, jelly, water or the like may be used. Voltage is applied via a circuit 103 on the transparent electrodes 145a and 145b with the transparent substance 143 sandwiched between them, so that the transparent substance 143 is transformed due to its piezoelectric effect to vary the focal length of the variable-focus lens 140. It is noted that the circuit 103 has therein a power source, a variable resistor, a switch, etc. As the aforesaid transparent substance 143 is transformed, pressure is applied on the fluid or jelly-like substance 144 via a cylinder 146 so that the fluid or jelly-like substance 144 is transformed following the transformation of the transparent substance 143.

Accordingly, even at a varying object distance, focusing can be performed without moving the image pickup optical system with a motor or the like. Thus, this example is much more improved in terms of size, weight and power consumptions.

In FIG. 27, reference numerals 145a and 145b represent the transparent electrodes, and 146 stands for the cylinder for storing the fluid or jelly-like substance 144. For the material for the transparent substance 143, polymer piezoelectric materials such as polyurethane, silicone rubber, acryl elastomer, PZT, PLZT and poly-(vinylidene fluoride) (PVDF), copolymers such as vinylidene cyanide copolymers and vinylidene fluoride-trifluoroethylene copolymers, etc. may be used.

Use of organic materials having piezoelectricity, synthetic resins having piezoelectricity, elastomer materials having piezoelectricity, etc. is preferable because large transformation of the lens surface of the variable-focus lens 140 is achievable. Transparent piezoelectric materials are preferably used for the transparent substance 143 of the variable-focus lens 140.

It is noted that the cylinder 146 may be removed from the variable-focus lens 140 of FIG. 27. Instead, as shown in FIG. 28, there are provided a support member 147 and a transformable member 148 for closing up the fluid or jelly-like substance 144 on their peripheral side.

The support member 147 comprises a zonal member fixed to the transparent member 142 at a given space therefrom.

Between the support member 147 and the transparent member 142 there is provided the aforesaid substance 144 closed up with the transparent member 142, the electrode 145b and the aforesaid member 148. This substance 144 is transformed following the transformation of the transparent substance 143 between the pair of transparent electrodes 145a and 145b. The transparent substance 143 is closed up at its peripheral portion. According to this example, voltage is applied on the transparent substance 143 via the transparent electrodes 145a and 145b to transform the same. Even so, the transformable member 148 is transformed in such a way that the whole volume of the fluid or jelly-like substance 144 remains invariable, as shown in FIG. 29. This is the reason why that cylinder can be dispensed with. In FIGS. 28 and 29, reference numeral 148 stands for the transformable member formed of an elastic member, an accordion form of synthetic resin or metal, or the like.

Figure 28:
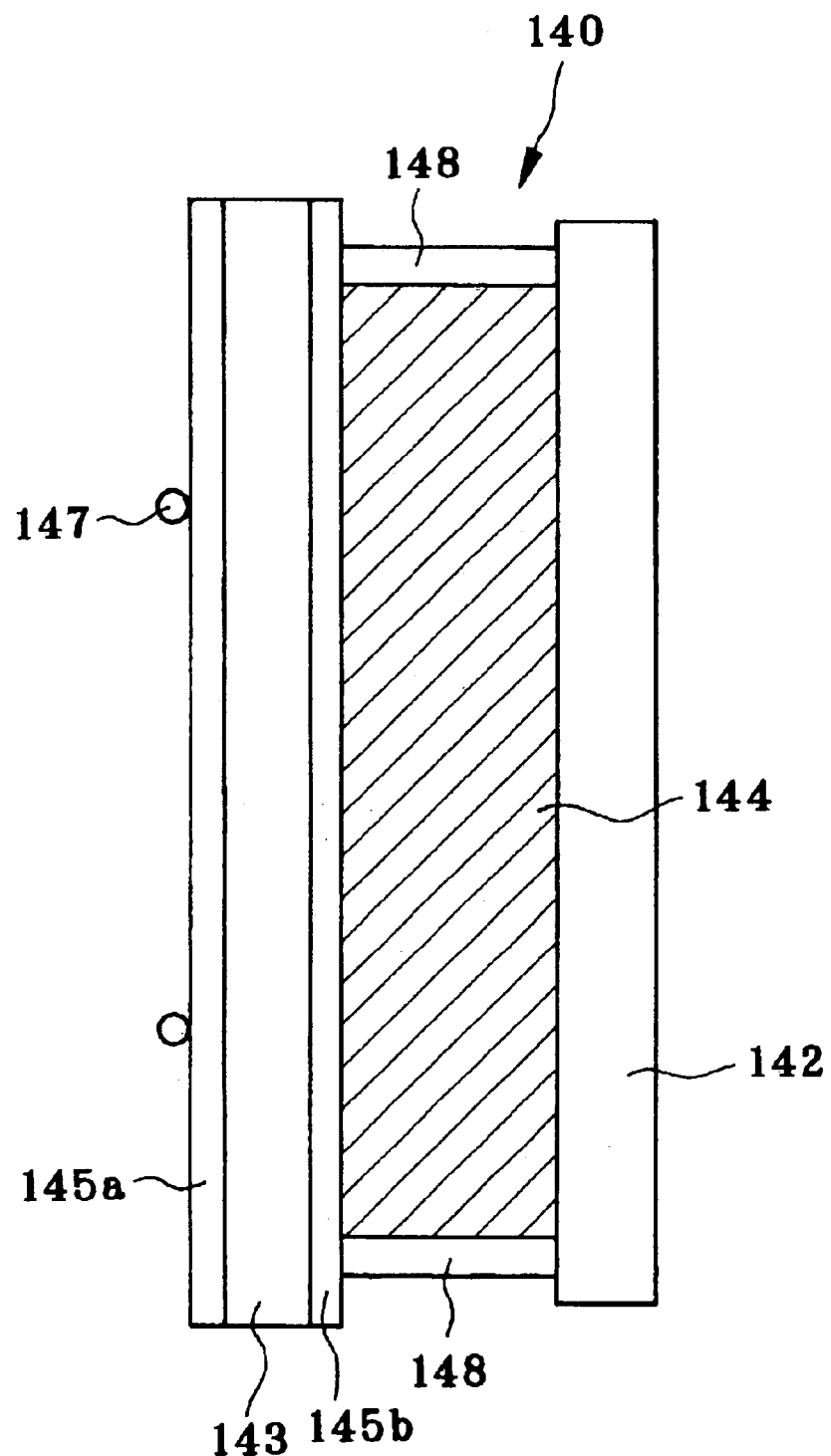
FIG. 28 is illustrative of a modification to the variable-focus lens of FIG. 27.
Figure 29:
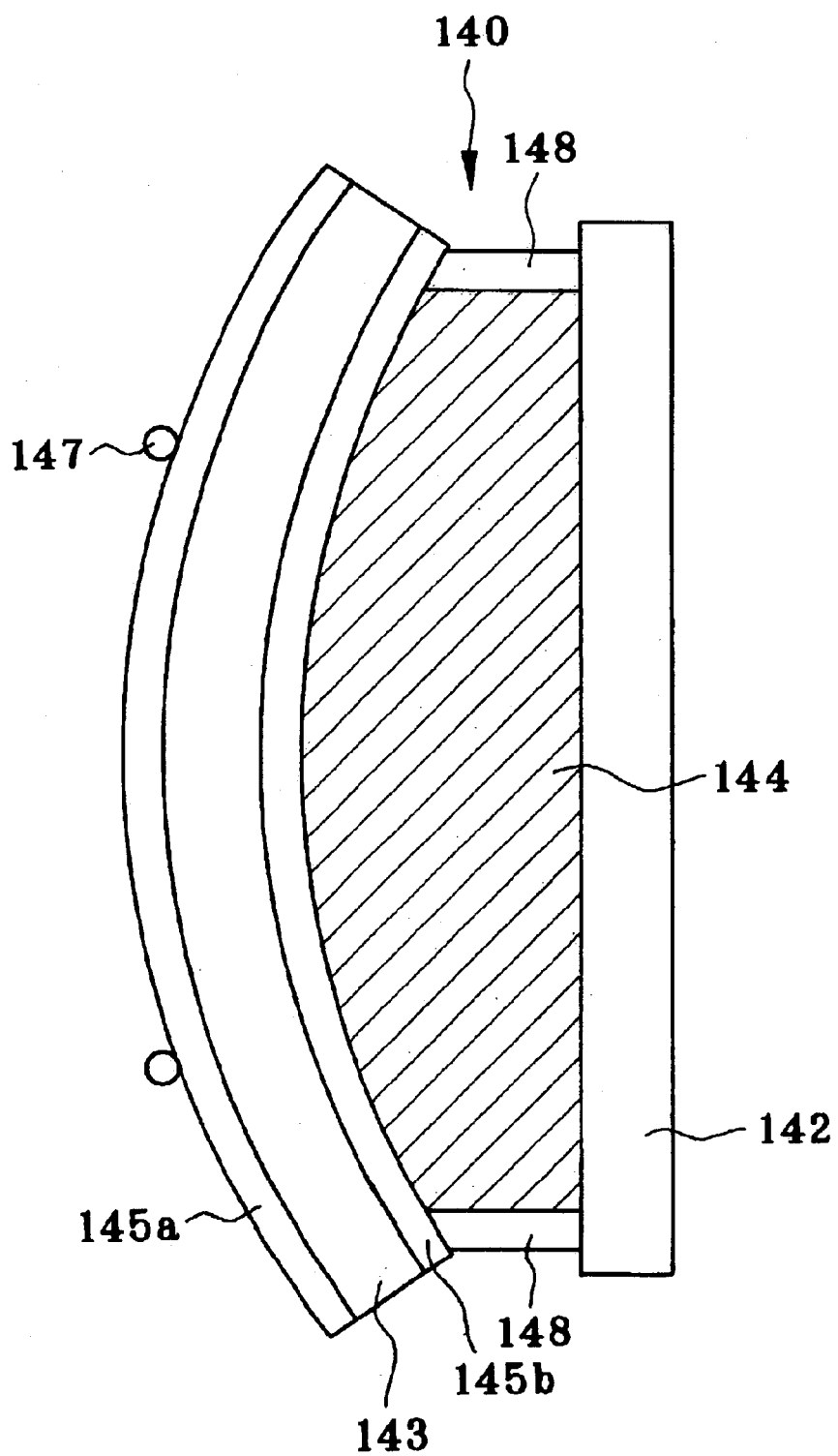

In the examples of FIGS. 27 and 28, the opposite application of voltage causes the transparent substance 143 to be transformed in the opposite direction, resulting in the formation of a concave lens.

It is noted that when an electrostrictive material such as acryl elastomer or silicone rubber is used for the transparent substance 143, it is preferable to laminate the transparent substance 143 onto the transparent substrate and electrostrictive material.

EXAMPLE 5 OF THE VARIABLE-FOCUS LENS

Figure 30:
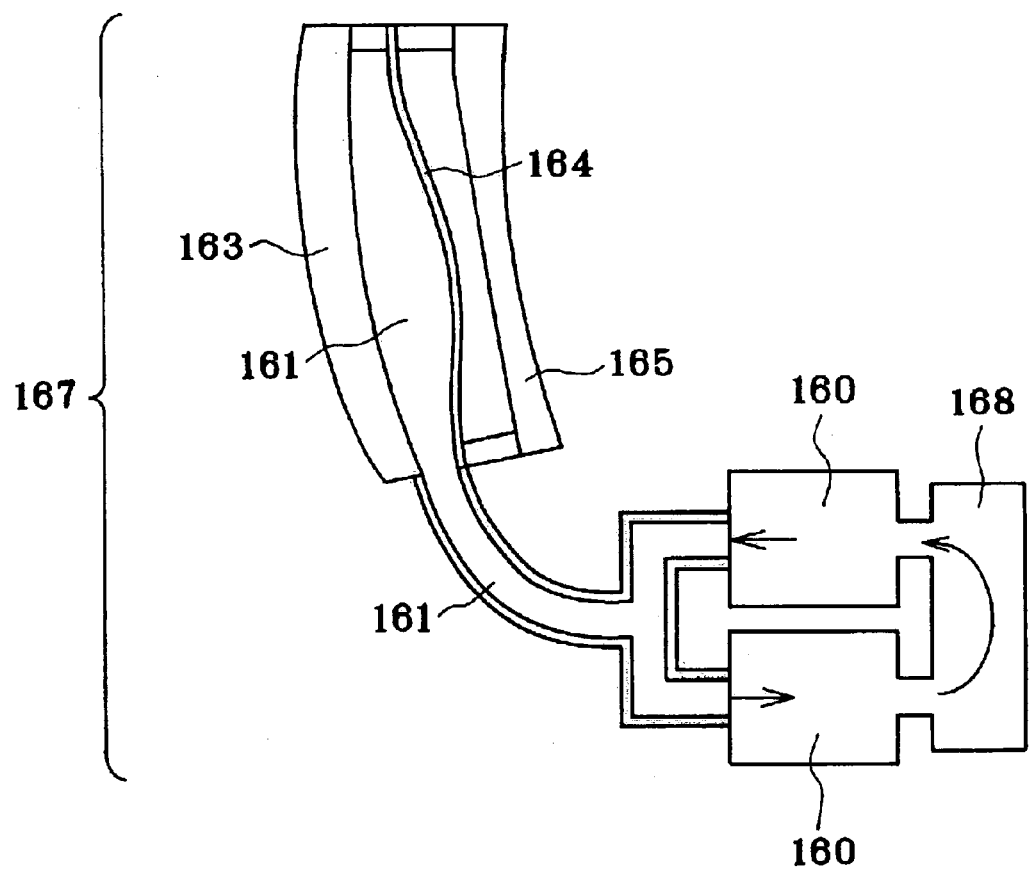
FIG. 30 is illustrative in schematic of yet another embodiment of the variable-focus lens, that is, the variable-focus lens 167 to and from which the fluid 161 is fed or removed for transformation of the lens surface.

FIG. 30 is illustrative in schematic of a further example of the variable-focus lens, that is, a variable-focus lens 167 wherein a micropump 160 is used to feed or remove fluid 161 to or from the same, thereby transforming the lens surface of the variable-focus lens 167.

The micropump 160, for instance, is a power-driven, miniature pump fabricated by micromachining. The fluid 161 is sandwiched between a transparent substrate 163 and a transparent elastic member 164. The elastic member 164 provides a lens surface that is transformed by the fluid 161. In FIG. 30, reference numeral 165 stands for a transparent substrate for protection of the elastic member 164; however, this transparent substrate 165 is not necessarily required.

Exemplary pumps fabricated by micromachining include those harnessing thermal transformation, piezoelectric materials, and electrostatic force.

For instance, two micropumps, each shown in FIG. 15, may be used as is the case with the micropump 160 used for the variable-focus lens 160 shown typically in FIG. 30.

In this arrangement, as the fluid 161 is fed by driving the miropump 160 to transform the elastic member 164, the shape of the lens surface changes in response to light transmitting through the transparent substrate 163, fluid 161 and elastic member 164, so that the focal position of the lens varies.

Some variable-focus lenses making use of electrostatic force, piezoelectric effect, etc. often require high driving voltage. In this case, it is preferable to set up a control system using a boosting transformer, a piezoelectric transformer, etc. Particular preference is given to a multilayer piezoelectric transformer because size reductions are achievable.

EXAMPLE 6 OF THE VARIABLE-FOCUS LENS

Figure 31:
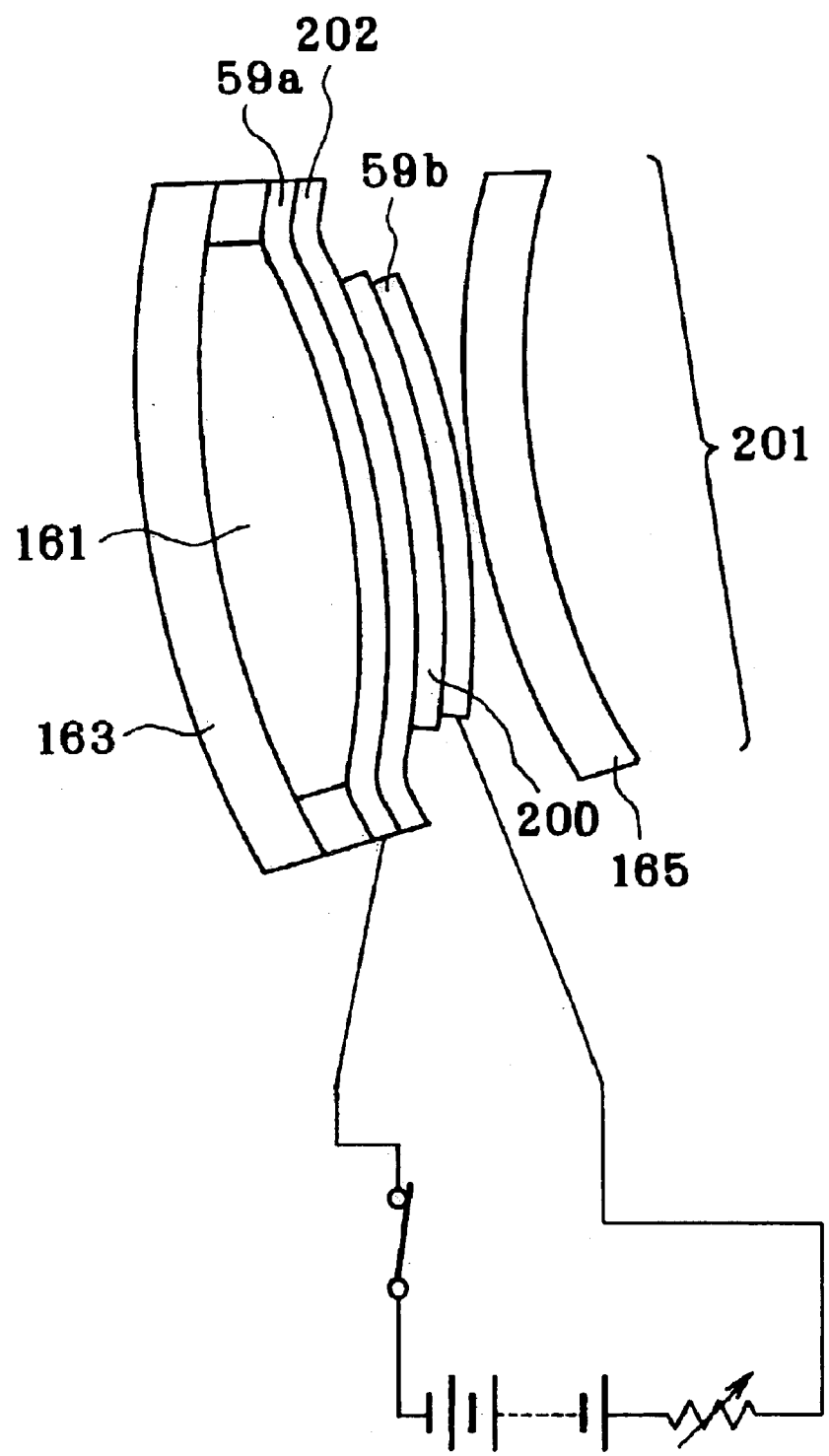
FIG. 31 is illustrative in schematic of another embodiment of the optical element having variable optical properties, that is, the variable-focus lens 201 using the piezoelectric material 200.

FIG. 31 is illustrative of a further example of the variable-focus lens having variable optical properties, that is, a variable-focus lens 201 wherein a piezoelectric material 200 is used instead of the elastic member 164 of FIG. 30. In this example, the fluid 161 is closed up between a transparent substrate 163 and a transparent electrode 59a.

A material similar to the transparent substance 143 is used for the piezoelectric material 200, which is provided on a transparent, soft substrate 202. Preferably in this case, synthetic resins or organic materials should be used for the substrate 202.

In this example, voltage is applied on the piezoelectric material 200 via two transparent electrodes 59a and 59b, so that the piezoelectric material 200 is transformed, acting as a convex lens in FIG. 31.

Figure 32:
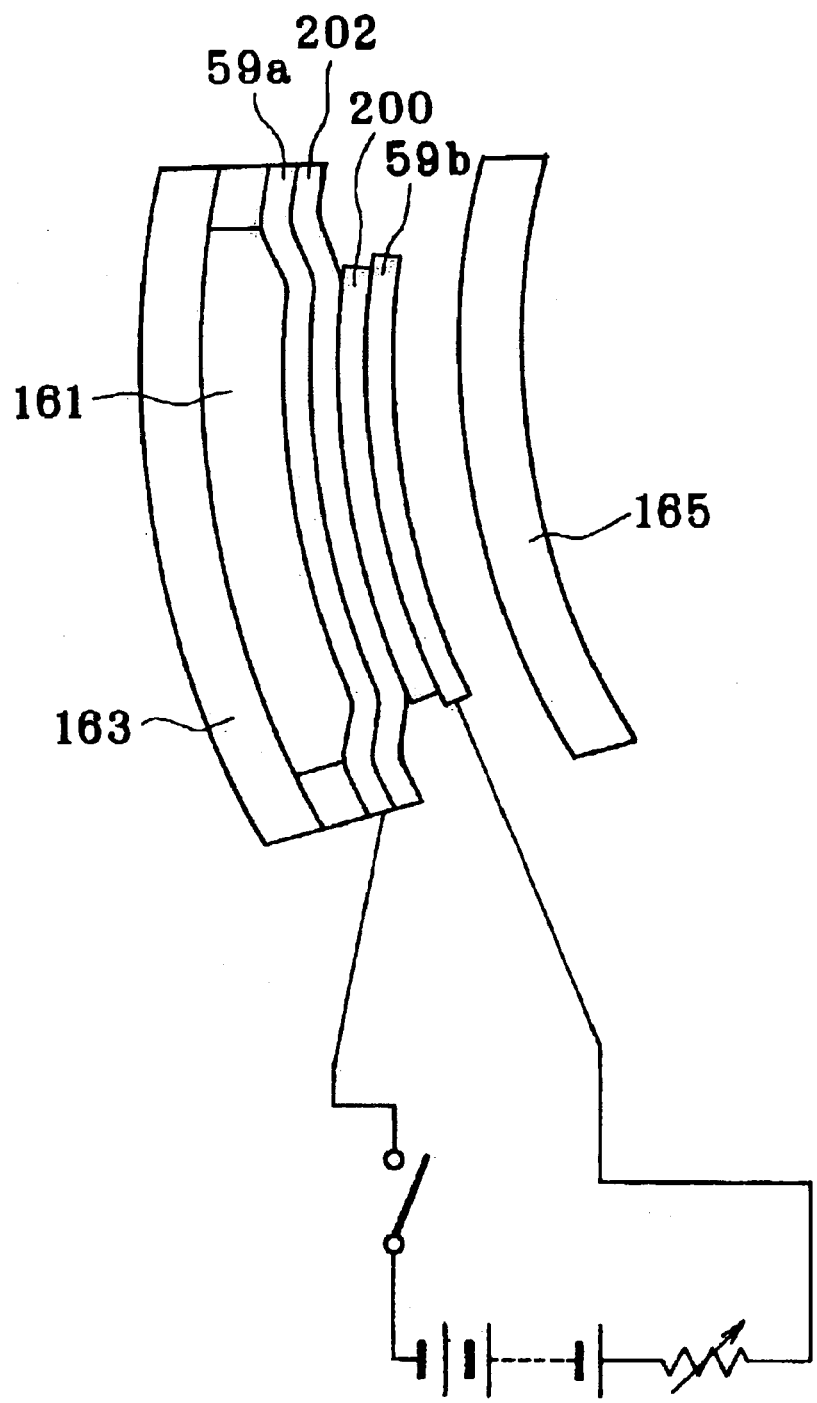
FIG. 32 is illustrative of the state of a modified variable-focus lens to FIG. 31.

Alternatively, it is acceptable that the substrate 202 is previously configured in a convex form while the size of at least one of the two transparent electrodes 59a and 59b differs from that of the substrate 202. For instance, one transparent electrode 59b is made smaller than the substrate 202. When voltage is put off in this state, only opposite portions of the two electrodes 59a and 59b are transformed in a concave form, as shown in FIG. 32, acting as a concave lens and so a variable-focus lens.

At this time, the substrate 202 is transformed in such a way that the volume of the fluid 161 remains invariable, offering a merit that any reservoir can be dispensed with.

A major merit of this example is that a portion of the substrate 202 that retains the fluid 161 can be transformed by means of the piezoelectric material, so that any reservoir can be dispensed with.

It is noted that although common to the example of FIG. 30, the transparent substrates 163 and 165 may each be configured as a lens or a plane.

EXAMPLE 7 OF THE VARIABLE-FOCUS LENS

Figure 33:
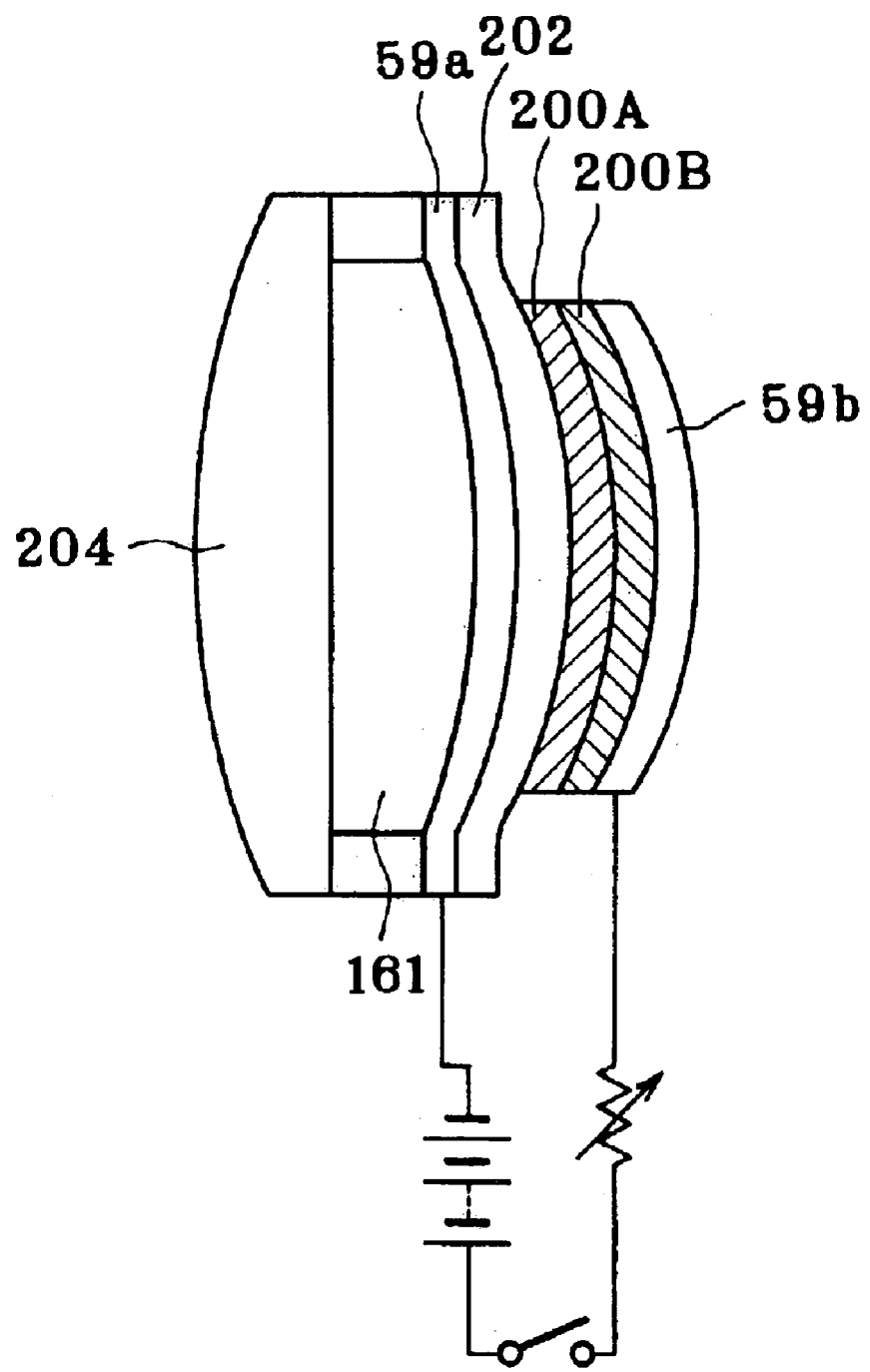
FIG. 33 is illustrative of yet another embodiment of the optical element having variable optical properties, that is, a variable-focus lens using two thin sheets 200A and 200B each formed of a piezoelectric material.

FIG. 33 is illustrative in schematic of a further example of the variable-focus lens having variable optical properties, that is, a variable-focus lens wherein two thin sheets 200A and 200B formed of a piezoelectric material are used instead of the piezoelectric material 200 of FIG. 32.

This variable-focus lens has a merit of using the thin sheets 200A and 200B while the directivity of the piezoelectric material is reversed, thereby increasing the amount of transformation and achieving a wide variable-focus range.

In FIG. 33, reference numeral 204 stands for a lens form of transparent substrate, and 161 represents fluid.

In this example, too, the right-hand transparent electrode 59b in FIG. 33 is made smaller than the substrate 202.

It is noted that if, in the examples of FIGS. 31, 32 and 33, the substrate 202, piezoelectric material 200 and thin sheets 200A and 200B are configured to have uneven thickness, it is then possible to control the manner of transformation at an applied voltage.

This is convenient for correction of lens aberrations, etc.

EXAMPLE 8 OF THE VARIABLE-FOCUS LENS

Figure 34:
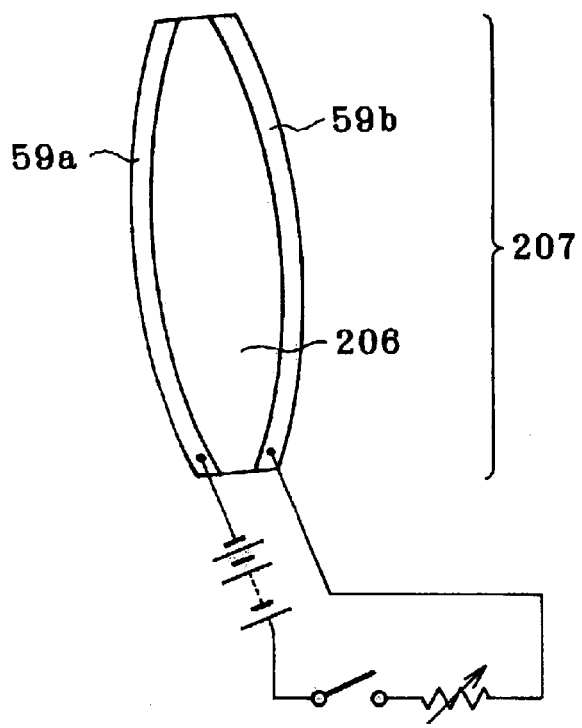
FIG. 34 is illustrative in schematic of yet another embodiment of the variable-focus lens.

FIG. 34 is illustrative in schematic of a further example of the variable-focus lens.

Figure 35:
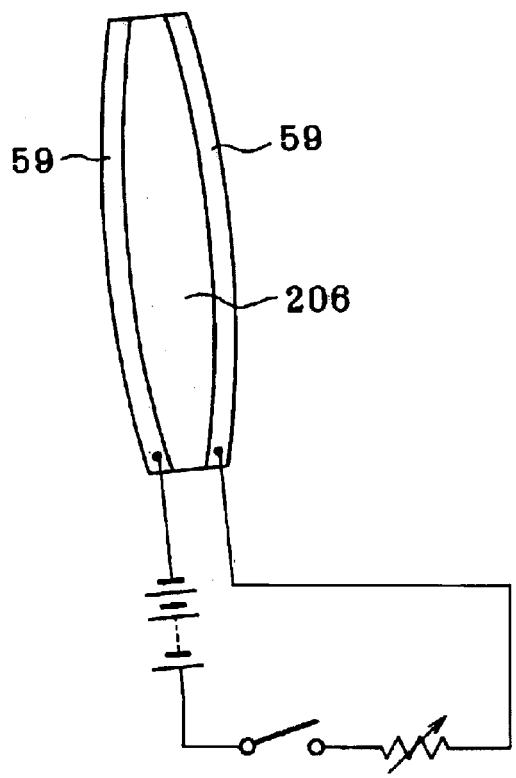
FIG. 35 is illustrative of the state of the variable-focus lens of FIG. 34.

This variable-focus lens 207 is made up of a pair of transparent electrodes 59a and 59b and an electrostrictive material 206 such silicone rubber or acryl elastomer, which is sandwiched between them According to the arrangement of this example, the lens 207 inflates at its middle portions at a low applied voltage as shown in FIG. 34, acting as a convex lens. At a high applied voltage, the electrostrictive material 206 elongates vertically but contracts horizontally as shown in FIG. 35, increasing in focal length and acting as a variable-focus lens.

A merit of this variable-focus lens is that power consumptions can be reduced because of no need of a large power source.

Commonly to the variable-focus lenses of FIGS. 27 to 35, variable focus is achievable through changes in the shape of the medium acting as a lens. Merits of such lenses over variable-focus lenses having varying refractive indices are that the range of focal length changes, their sizes, etc. can be selected without restraint.

EXAMPLE 9 OF THE VARIABLE-FOCUS LENS

Figure 36:
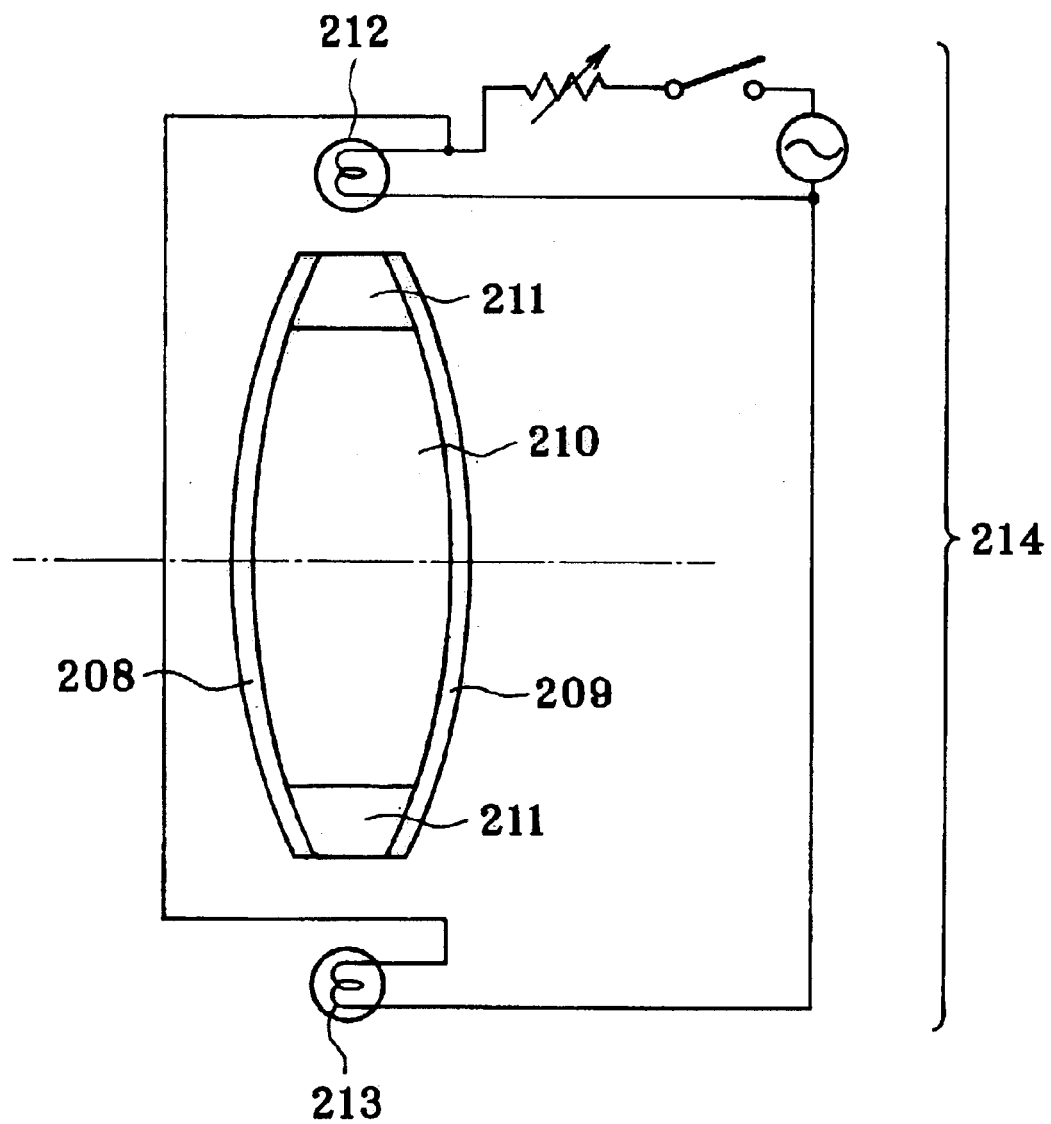
FIG. 36 is illustrative in schematic of a further embodiment of the optical element having variable optical properties, that is, the variable-focus lens that harnessing photonic effect.

FIG. 36 is illustrative in schematic of a further example of the variable-focus lens having variable optical properties, that is, a variable-focus lens making use of photomechanical effect.

This variable-focus lens 214 is built up of azobenzene 210 sandwiched between transparent elastic members 208 and 209. The azobenzene 210 is irradiated with light by way of transparent spacers 211.

In FIG. 36, reference numerals 212 and 213 stand for light sources having wavelengths $\lambda 1$ and $\lambda 2$, respectively, such as LEDs or semiconductor lasers.

Figure 37A:
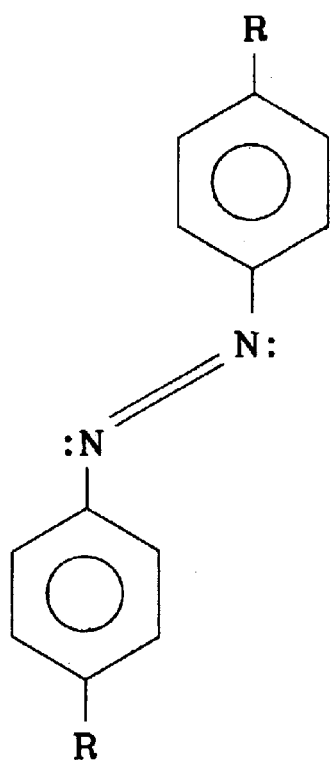
FIGS. 37(a) and 37(b) are illustrative of the structures of trans-form azobenzene and cis-form azobenzene, respectively, both used for the variable-focus lens of FIG. 36.
Figure 37A:
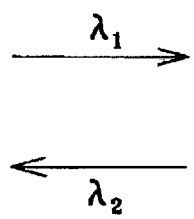
Figure 37B:
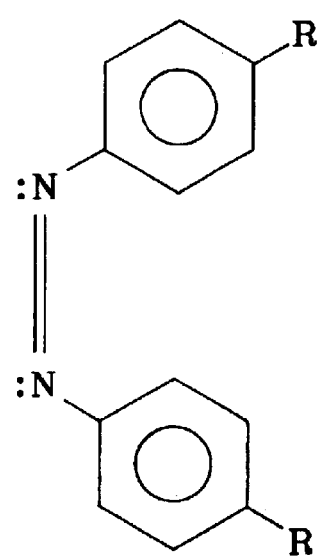

In the instant example, as the trans-form azobenzene shown in FIG. 37(*a*) is irradiated with light having the center wavelength $\lambda 1$, the azobenzene 210 changes to cis-form azobenzene shown in FIG. 37(*b*), resulting in volume decreases. Consequently, the variable-focus lens 214 becomes thin and so the convex lens action becomes slender.

As the cis-form azobenzene 210 is irradiated with light having the center wavelength $\lambda 2$, on the other hand, the azobenzene 210 changes from cis to trans-form, resulting in volume increases. Consequently, the variable-focus lens 241 becomes thick and so the convex lens action increases.

In this way, this optical element 214 acts as a variable-focus lens.

From variable-focus lens 214, there is no light leakage that ensures high efficiency, because light is totally reflected at the boundaries between the transparent elastic members 208, 209 and air. It is here noted that light used for the lens may have wavelengths from visible to infrared wavelength, and that mixtures of azobenzene with other liquids may be used as the azobenzene 210.

EXAMPLE 9 OF THE VARIABLE-SHAPE MIRROR

Figure 38:
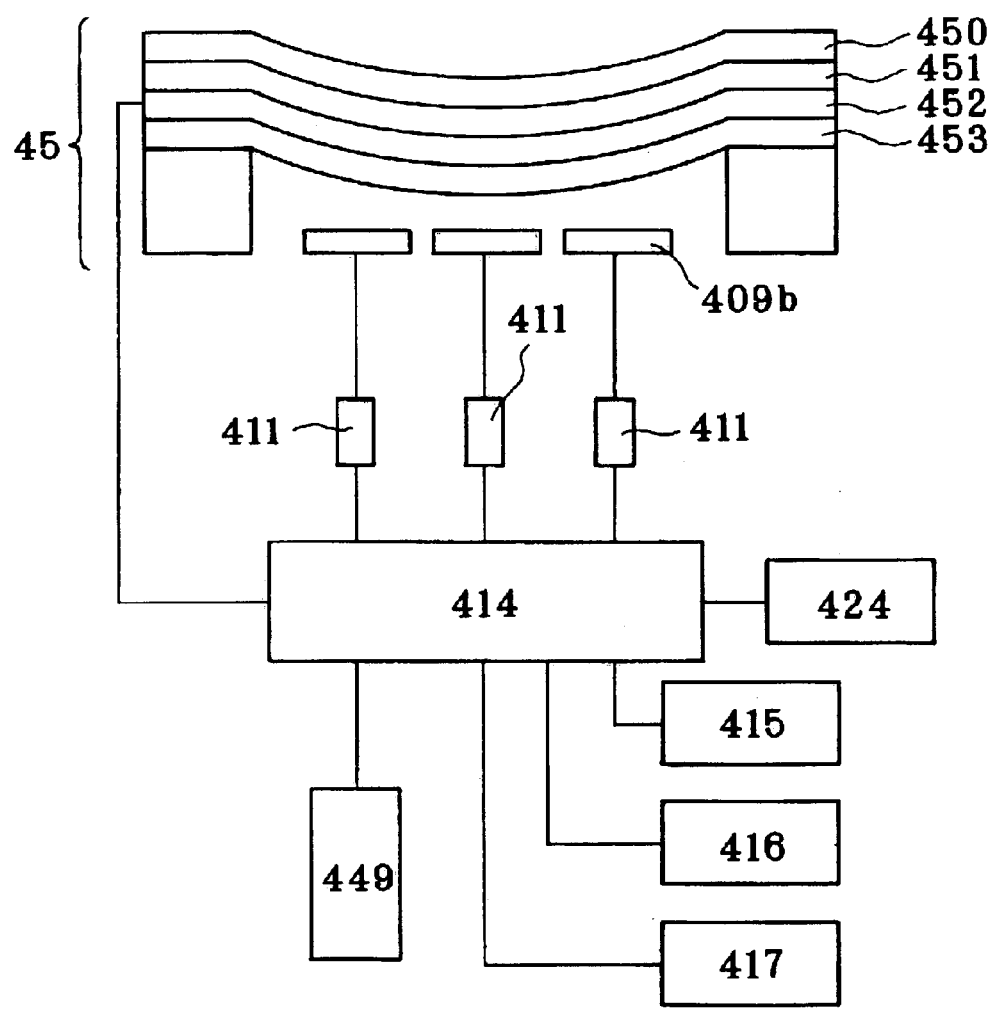
FIG. 38 is illustrative in schematic of a further embodiment of the variable-shape mirror.

FIG. 38 is illustrative in schematic of a further example of the variable-shape mirror. This example is now explained with reference to a digital camera. In FIG. 38, reference numeral 411 is a variable resistor, 414 a computing unit, 415 a temperature sensor, 416 a humidity sensor, 417 a distance sensor, and 424 a shake sensor.

This variable-shape mirror 45 comprises a plurality of divided electrodes 409*b* spaced away from an electrostrictive material 453 comprising an organic material such as acryl elastomer. On the electrostrictive material 453 there are provided an electrode 452 and a transformable substrate 451 in this order. On the substrate 451 there is an aluminum or other metallic reflecting film 450 that reflects incident light. Thus, the transformable layer of the variable-shape mirror 45 has a four-layer structure.

A merit of this arrangement over an arrangement wherein the divided electrodes 409*b* are integral with the electrostrictive material 453 is that the surface shape of the reflecting film (reflecting surface) 450 is so smooth that aberrations are unlikely to occur optically.

It is here noted that the locations of the transformable substrate 451 and electrode 452 may be reversed.

In FIG. 38, reference numeral 449 stands for a scaling or zooming button for an associated optical system. The variable-shape mirror 45 is controlled via the computing unit 414 in such a way that the reflecting film 450 can be transformed by pressing down the button 449 for scaling or zooming purposes.

It is acceptable to use the already mentioned piezoelectric materials such as barium titanate instead of the electrostrictive materials comprising organic material such as acryl elastomer.

Commonly to each of the variable-shape mirrors as explained so far, it is preferable that as viewed from the vertical direction to the reflecting surface, the deforming portion of the reflecting surface is configured such that it is longer in the direction of the entrance surface for axial rays, for instance, an elliptic shape, an oval shape and a polygonal shape. This is because the variable-shape mirror is often used while light rays are obliquely incident thereon, as in the case of FIG. 13. To reduce aberrations that occur in such cases, the shape of the reflecting surface should preferably be approximate to the ellipsoidal surface of revolution, the paraboloid of revolution, and the hyperboloid of revolution. To transform the reflecting surface of the variable-shape mirror according to that shape, it is preferable that as viewed from the vertical direction to the reflecting surface, the transforming portion of the reflecting surface is configured such that it is longer in the direction of the entrance surface for axial rays.

EMBODIMENTS OF THE INVENTION

Given below are the embodiments of the invention. Constituting parameters of each embodiment will be enumerated later.

In each embodiment, the Z-axis of a coordinate system with respect to an object plane is defined by a direction coming out of the center of an object and vertical to the object plane. A direction orthogonal with respect to the Z-axis is defined as the Y-axis, and an axis that forms a right-handed orthogonal coordinate system with the Y-axis and Z-axis is defined as the X-axis.

In the following embodiments, each optical surface is decentered in the Y-Z plane, and only one symmetric plane for each rotationally asymmetric free-form surface is defined as the Y-Z plane.

Upon decentration, the origin of the coordinate system is defined as a point that is moved from the apex position of a k−1 surface by a surface spacing in the Z-axis direction, where k is the surface to be decentered.

The decentration surface is given by a shift of the apex position thereof from the origin of the coordinate system (X, Y and Z represent the X-axis, Y-axis and Z-axis directions, respectively) and tilts of the center axis thereof (the Z-axis of the aforesaid formula (a) for a free-form surface) with respect to the X-axis, Y-axis and Z-axis, respectively, ($\alpha$, $\beta$, $\gamma$ (°)). In that case, the positive sign for $\alpha$ and $\beta$ means counterclockwise rotation with respect to the positive direction of the respective axes and the positive sign for $\gamma$ means clockwise rotation with respect to the positive direction of the Z-axis.

Decentration is represented in the order of X shift, Y shift, Z shift, $\alpha$ tilt, $\beta$ tilt and $\gamma$ tilt.

In the following embodiments, decentration takes place by way of detentering-and-returning. That is, when the k surface is already in a decentered state, the apex position of the k+1 surface is defined as a point that is moved from the apex position of the k surface before decentration by the surface spacing in the Z-axis direction.

The coordinate system of the optical system after reflection of light rays at the reflecting surface is defined as the coordinate system before reflection, which is rotated by $2\alpha+180°$, where $\alpha$ is the angle of rotation of the reflecting surface. By this definition, light rays propagate along the Z-axis positive direction of the optical system.

Embodiment 1

Figure 39:
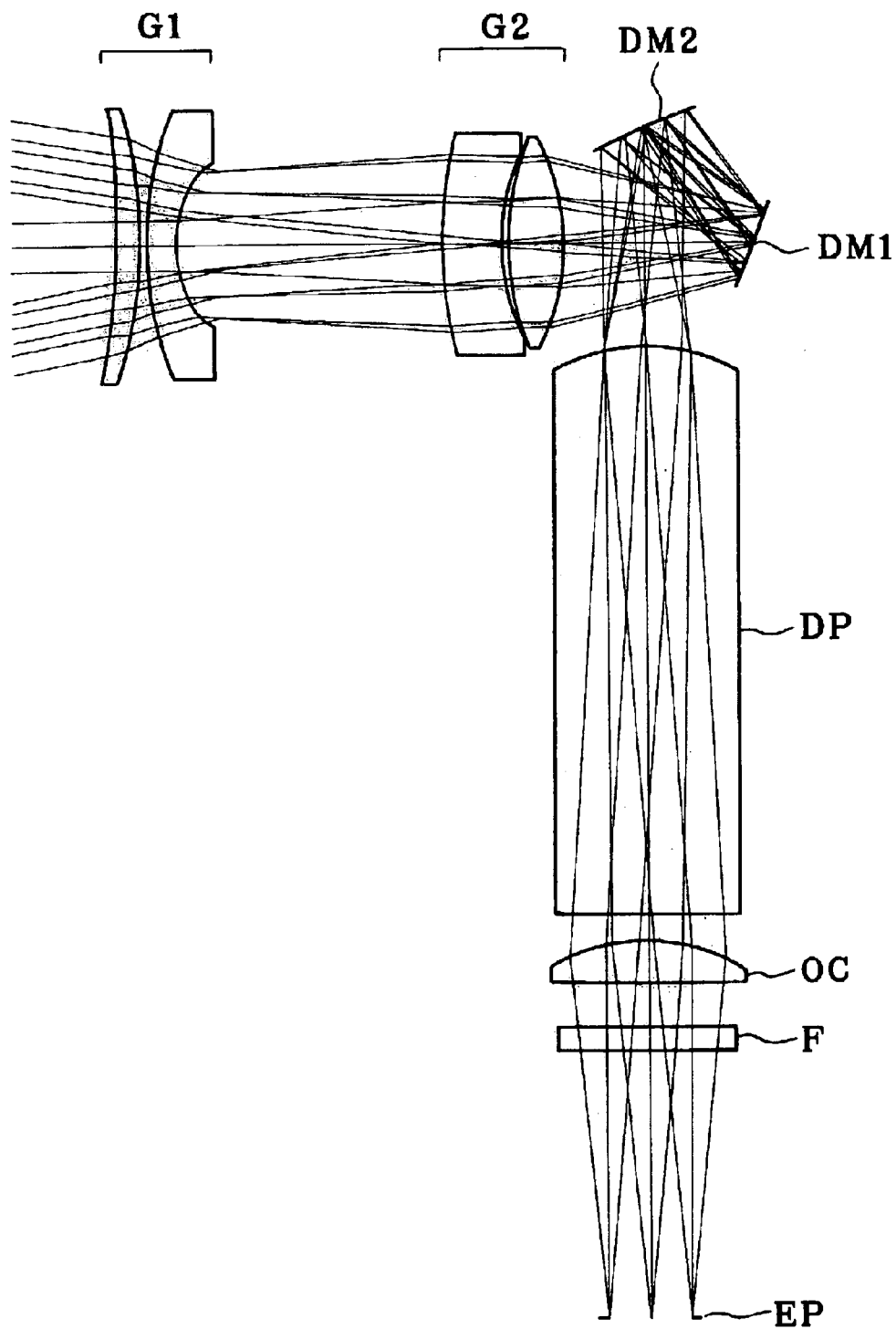
FIG. 39 is an optical path diagram at the wide-angl end inclusive of an axial chief ray for a Keplerian zoom finder using the optical system according to Example 1 of the invention.

As shown in FIG. 39 that is an optical path diagram inclusive of an axial chief ray at the wide-angle end, this embodiment is directed to a Keplerian zoom finder in which variable-shape mirrors are used as the optical elements having variable optical properties.

Upon coming from an object and passing through a first lens group G1 having negative refracting power and composed of a positive meniscus lens concave on its object side and a negative meniscus lens convex on its object side and a lens group G2 having positive refracting power and composed of a negative meniscus lens convex on its object side and a double-convex positive lens, incident light is reflected at variable-shape mirrors DM1 and DM2 so that an optical path is bent about 90° to form an intermediate image just before a roof prism DP. Thereafter, the intermediate image is bilaterally inverted through the roof prism DP having a convex entrance surface and a planar exit surface, and then magnified through an eyepiece lens OC composed of one positive meniscus lens convex on its object side and having an aspheric surface on its object side, and the emergent light arrives at an exit pupil EP upon passing through a filter F. By bringing the human eye to the position of the exit pupil EP, it is possible to view the magnified intermediate image.

Thus, this embodiment provides an optical system capable of achieving zooming at a zoom ratio of 1.7 by varying only the shapes of the variable-shape mirrors DM1 and DM2 without recourse to movement of the lens groups.

In this optical system, the intermediate image has an image height of 3.63 mm, and the focal length of the objective system is 12.33 mm at the wide-angle end, 16.08 mm in the standard state and 20.96 mm at the telephoto end. The angle of view is 32.46° at the wide-angle end, 25.1° in the standard state and 19.44° at the telephoto end. The diopter is −0.5.

The merit of Embodiment 1 wherein two variable-shape mirrors are used in the optical system is that any movement of focus on the image plane during zooming can be reduced. As a matter of course it is acceptable to locate three or more variable-shape mirrors in the optical system.

In this embodiment, the lens groups G1 and G2 between the object and the variable-shape mirror DM1 form together a retrofocus system ensuring that the back focus as far as the intermediate image just before the roof prism DP is long enough for reception of the variable-shape mirrors DM1 and DM2.

In this embodiment, both variable-shape mirrors DM1 and DM2 are located at the position equivalent to the reflecting surface of a penta prism, so that the angles of incident light and emergent light can be bent 90°, and the angle of the optical axis of incidence of each of incident light and emergent light on the variable-shape mirrors DM1 and DM2 is kept as small as 22.5°. Thus, the merit of this embodiment is that the effective reflecting surface area and aberrations of the variable-shape mirror DM1, and DM2 is reduced.

Embodiment 2

As shown in FIG. 39 that is an optical path diagram including an axial chief ray at the wide-angle end, this embodiment is directed to a Keplerian zoom finder using variable-shape mirrors as in Embodiment 1.

In this embodiment, the shapes of variable-shape mirrors DM1 and DM2 having the same lens data as in Embodiment 1 are changed and the diopter is changed from −0.5 to −4. Thus, the diopter of the finder can be regulated by simple transformation of the variable mirrors DM1 and DM2.

In this optical system, the intermediate image has an image height of 3.63 mm, and the focal length of the objective system is 13.24 mm at the wide-angle end, 17.31 mm in the standard state and 22.50 mm at the telephoto end. The angle of view is 32.46° at the wide-angle end, 25.1° in the standard state and 19.44° at the telephoto end. The diopter is −4.

Thus, this embodiment provides an optical system capable of achieving zooming at a zoom ratio of 1.7 by varying only the shapes of the variable-shape mirrors DM1 and DM2 without recourse to movement of the lens groups.

Embodiment 3

Figure 40:
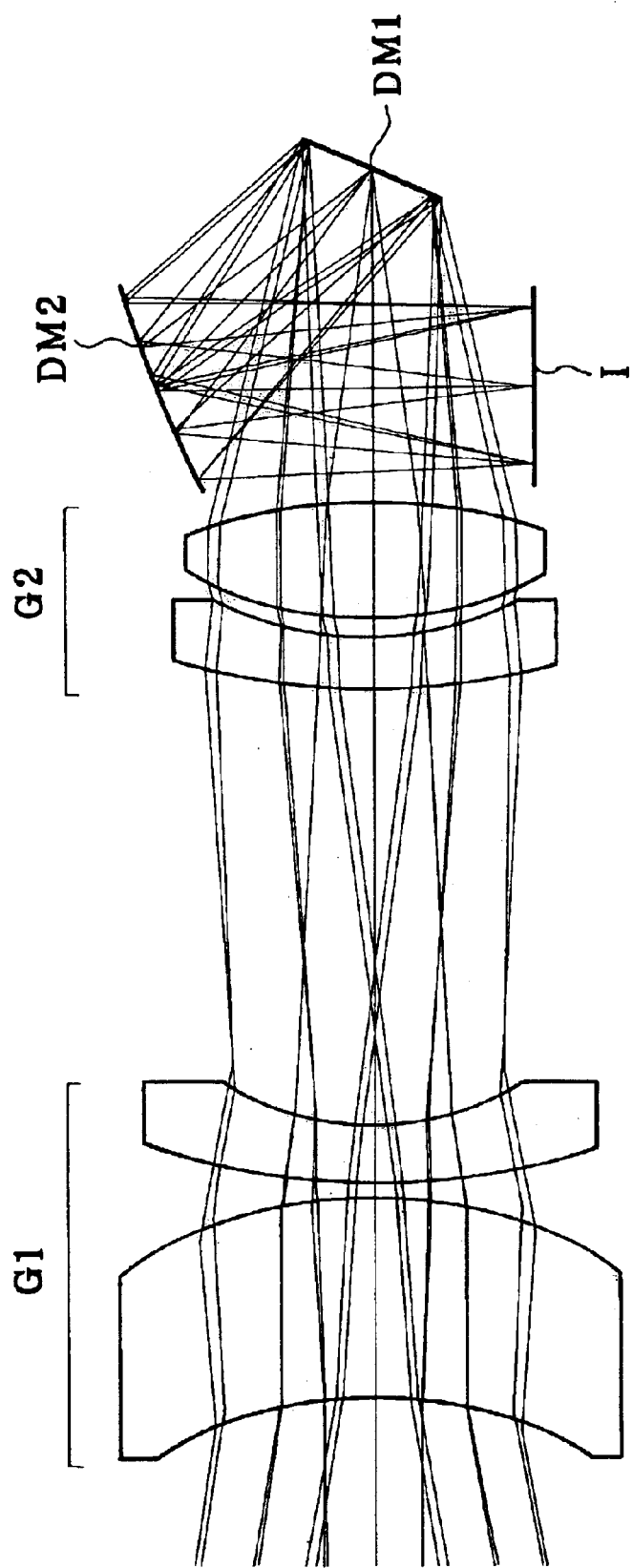
FIG. 40 is an optical path diagram inclusive of an axial chief ray for an optical system that can be used as the image pickup optical system according to Example 3 of the invention.

As shown in FIG. 40 that is an optical path diagram including an axis chief ray at the wide-angle end, this embodiment is directed to an optical system corresponding to a part of the finder optical system of FIG. 39 from the first lens group G1 to the intermediate image plane. This optical system can be used as an image pickup system.

Upon coming out of an object and passing through a first lens group G1 having negative refracting power and composed of a positive meniscus lens concave on its object side and a negative meniscus lens convex on its object side and a lens group G2 having positive refracting power and composed of a negative meniscus lens convex on its object side and a double-convex positive lens, incident light is reflected at variable-shape mirrors DM1 and DM2 so that an optical path is bent about 90°, forming an image on an image plane I.

In this optical system, the image height is 3.63 mm, and the focal length is 11.92 mm at the wide-angle end, 15.54 mm in the standard state and 22.26 mm at the telephoto end. The angle of view is 32.46° at the wide-angle end, 25.1° in the standard state and 19.44° at the telephoto end.

Thus, this embodiment provides an optical system capable of achieving zooming at a zoom ratio of 1.7 by varying only the shapes of the variable-shape mirrors DM1 and DM2 without recourse to movement of the lens groups.

To increase the degree of freedom in the transformation of the variable-shape mirrors DM1 and DM2, the variable-shape mirrors DM1 and DM2 are herein moved in the vertical direction to the mirror surfaces. By having the translation of the mirror surfaces as a variable in this way, it is possible to design the optical system while aberrations are reduced within a suitable range yet high zoom ratios are kept.

In what follows, the constituting parameters of Embodiments 1–3 are given. It is noted that the free-form surface used in the invention is defined by the aforesaid formula (a). Then, the Z-axis of that defining formula provides the axis of the free-form surface.

The aspheric surface is a rotationally symmetric aspheric surface given by the following defining formula:

$$Z=(Y^2/R)/[1+\{1-(1+K)Y^2/R^2\}^{1/2}]+AY^4+BY^6+CY^8+DY^{10}+ \quad (d)$$

Here Z is a straight light passing through the center of the object in the vertical direction to the object plane, and Y lies in the vertical direction to Z. Here, R is a paraxial radius of curvature, K is a conical coefficient, and A, B, C, D, ... are the 4th, 6th, 8th and 10th aspheric coefficients, respectively. The Z-axis of this defining formula provides the axis of the rotationally symmetric aspheric surface.

Enumerated below are the constituting parameters of Embodiments 1–3. In what follows, "FFS", "ASS", "DM" and "EP" stand for a free-form surface, an aspheric surface, a variable mirror and an exit pupil plane, respectively. Regarding the surface shape and decentration, "WE", "ST" and "TE" stand for the wide-angle end, standard state and telephoto end, respectively.

The term regarding the free-form surface, aspheric surface, etc. on which no data are given is zero. The refractive index is given on a d-line (587.65 nm wavelength) basis, and the length is given in mm.

EXAMPLE 1

| Surface No. | Radius of curvature | Surface separation | Displacement and tilt | Refractive index | Abbe's No. |
|---|---|---|---|---|---|
| Object plane | ∞ | 3000.00 | | | |
| 1 | −51.03 | 1.50 | | 1.7552 | 27.6 |
| 2 | −20.97 | 0.10 | | | |
| 3 | 20.22 | 1.00 | | 1.5322 | 66.0 |
| 4 | 5.46 | 13.84 | | | |
| 5 | 21.43 | 3.09 | | 1.7276 | 28.8 |
| 6 | 9.97 | 0.43 | | | |
| 7 | 13.02 | 2.89 | | 1.5947 | 55.3 |
| 8 | −10.70 | 9.66 | | | |
| 9 | FFS ① (DM 1) | 8.00 | (1) | | |
| 10 | FFS ② (DM 2) | 10.86 | (2) | | |
| 11 | 10.81 | 29.10 | | 1.5254 | 55.8 |
| 12 | ∞ | 1.36 | | | |
| 13 | ASS ① | 2.10 | | 1.4923 | 57.6 |
| 14 | 125.27 | 2.29 | | | |
| 15 | ∞ | 1.20 | | 1.4924 | 57.6 |
| 16 | ∞ | 13.41 | | | |
| 17 | ∞ (EP) | 31.62 | | | |

ASS ①

| | |
|---|---|
| R | 9.68 |
| K | 1.3810 |
| A | −4.7970 × 10$^{-4}$ |
| B | 6.4148 × 10$^{-6}$ |
| C | −4.8204 × 10$^{-7}$ |
| D | 4.6512 × 10$^{-9}$ |

FFS ①

WE:

| | | | | | |
|---|---|---|---|---|---|
| $C_4$ | 8.5936 × 10$^{-3}$ | $C_6$ | 7.0932 × 10$^{-3}$ | $C_8$ | 5.5321 × 10$^{-4}$ |
| $C_{10}$ | 1.6050 × 10$^{-4}$ | $C_{11}$ | −9.6210 × 10$^{-4}$ | $C_{13}$ | −1.0592 × 10$^{-3}$ |
| $C_{15}$ | −3.6665 × 10$^{-4}$ | | | | |

ST: 平面
TE:

| | | | | | |
|---|---|---|---|---|---|
| $C_4$ | −1.7279 × 10$^{-3}$ | $C_6$ | −3.0676 × 10$^{-3}$ | $C_8$ | −9.5712 × 10$^{-4}$ |
| $C_{10}$ | −2.3725 × 10$^{-4}$ | $C_{11}$ | −1.8009 × 10$^{-4}$ | $C_{13}$ | −5.1934 × 10$^{-4}$ |
| $C_{15}$ | 1.1968 × 10$^{-5}$ | | | | |

FFS ②

WE:

| | | | | | |
|---|---|---|---|---|---|
| $C_4$ | −1.2208 × 10$^{-2}$ | $C_6$ | −1.2585 × 10$^{-2}$ | $C_8$ | −1.2730 × 10$^{-3}$ |
| $C_{10}$ | −4.7421 × 10$^{-4}$ | $C_{11}$ | −6.2704 × 10$^{-4}$ | $C_{13}$ | −7.0316 × 10$^{-4}$ |
| $C_{15}$ | −1.7834 × 10$^{-4}$ | | | | |

ST: 平面
TE:

| | | | | | |
|---|---|---|---|---|---|
| $C_4$ | 1.1477 × 10$^{-2}$ | $C_6$ | 1.3645 × 10$^{-2}$ | $C_8$ | 2.0338 × 10$^{-3}$ |
| $C_{10}$ | 8.5954 × 10$^{-4}$ | $C_{11}$ | 3.0051 × 10$^{-4}$ | $C_{13}$ | 1.7679 × 10$^{-3}$ |
| $C_{15}$ | −1.5926 × 10$^{-4}$ | | | | |

Displacement and tilt(1)

| | | | | | |
|---|---|---|---|---|---|
| X | 0.00 | Y | 0.00 | Z | 0.00 |
| α | −22.50 | β | 0.00 | γ | 0.00 |

Displacement and tilt(2)

| | | | | | |
|---|---|---|---|---|---|
| X | 0.00 | Y | 0.00 | Z | 0.00 |
| α | −22.50 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | 3000.00 | | | |
| 1 | −51.03 | 1.50 | | 1.7552 | 27.6 |
| 2 | −20.97 | 0.10 | | | |
| 3 | 20.22 | 1.00 | | 1.5322 | 66.0 |
| 4 | 5.46 | 13.84 | | | |
| 5 | 21.43 | 3.09 | | 1.7276 | 28.8 |
| 6 | 9.97 | 0.43 | | | |
| 7 | 13.02 | 2.89 | | 1.5947 | 55.3 |
| 8 | −10.70 | 9.66 | | | |
| 9 | FFS ① (DM 1) | 8.00 | (1) | | |
| 10 | FFS ② (DM 2) | 10.86 | (2) | | |
| 11 | 10.81 | 29.10 | | 1.5254 | 55.8 |
| 12 | ∞ | 1.36 | | | |
| 13 | ASS ① | 2.10 | | 1.4923 | 57.6 |
| 14 | 125.27 | 2.29 | | | |
| 15 | ∞ | 1.20 | | 1.4924 | 57.6 |
| 16 | ∞ | 13.41 | | | |
| 17 | ∞ (EP) | 31.62 | | | |

ASS ①

| R | 9.68 |
|---|---|
| K | 1.3810 |
| A | −4.7970 × 10⁻⁴ |
| B | 6.4148 × 10⁻⁶ |
| C | −4.8204 × 10⁻⁷ |
| D | 4.6512 × 10⁻⁹ |

FFS ①

WE:

| $C_4$ | 8.9058 × 10⁻³ | $C_6$ | 7.4976 × 10⁻³ | $C_8$ | 6.2420 × 10⁻⁴ |
|---|---|---|---|---|---|
| $C_{10}$ | 2.5429 × 10⁻⁴ | $C_{11}$ | −8.0571 × 10⁻⁴ | $C_{13}$ | −9.2481 × 10⁻⁴ |
| $C_{15}$ | −2.9993 × 10⁻⁴ | | | | |

ST:

| $C_4$ | 6.3620 × 10⁻⁴ | $C_6$ | 7.3554 × 10⁻⁴ | $C_8$ | 2.6463 × 10⁻⁵ |
|---|---|---|---|---|---|
| $C_{10}$ | 2.0535 × 10⁻⁵ | $C_{11}$ | 5.5902 × 10⁻⁵ | $C_{13}$ | 9.2505 × 10⁻⁵ |
| $C_{15}$ | 2.3196 × 10⁻⁵ | | | | |

TE:

| $C_4$ | −1.1120 × 10⁻³ | $C_6$ | −2.8274 × 10⁻³ | $C_8$ | −9.6709 × 10⁻⁴ |
|---|---|---|---|---|---|
| $C_{10}$ | −2.7664 × 10⁻⁴ | $C_{11}$ | −1.6108 × 10⁻⁴ | $C_{13}$ | −4.6921 × 10⁻⁴ |
| $C_{15}$ | 1.4609 × 10⁻⁵ | | | | |

FFS ②

WE:

| $C_4$ | −1.0327 × 10⁻² | $C_6$ | −1.0889 × 10⁻² | $C_8$ | −1.0795 × 10⁻³ |
|---|---|---|---|---|---|
| $C_{10}$ | −4.4715 × 10⁻⁴ | $C_{11}$ | −5.6857 × 10⁻⁴ | $C_{13}$ | −1.0490 × 10⁻³ |
| $C_{15}$ | −1.1450 × 10⁻⁴ | $C_{18}$ | 2.0289 × 10⁻⁴ | | |

ST:

| $C_4$ | 2.5727 × 10⁻³ | $C_6$ | 1.4406 × 10⁻³ | $C_8$ | −6.5130 × 10⁻⁵ |
|---|---|---|---|---|---|
| $C_{10}$ | −5.7879 × 10⁻⁵ | $C_{11}$ | −1.5142 × 10⁻⁴ | $C_{13}$ | −5.8866 × 10⁻⁴ |
| $C_{15}$ | −4.7791 × 10⁻⁵ | $C_{18}$ | 2.0289 × 10⁻⁴ | | |

TE:

| $C_4$ | 1.2609 × 10⁻² | $C_6$ | 1.5324 × 10⁻² | $C_8$ | 2.2295 × 10⁻³ |
|---|---|---|---|---|---|
| $C_{10}$ | 9.9575 × 10⁻⁴ | $C_{11}$ | 2.3993 × 10⁻⁴ | $C_{13}$ | 1.1999 × 10⁻³ |
| $C_{15}$ | −1.5372 × 10⁻⁴ | $C_{18}$ | 2.0289 × 10⁻⁴ | | |

Displacement and tilt(1)

| X | 0.00 | Y | 0.00 | Z | 0.00 |
|---|---|---|---|---|---|
| α | −22.50 | β | 0.00 | γ | 0.00 |

Displacement and tilt(2)

| X | 0.00 | Y | 0.00 | Z | 0.00 |
|---|---|---|---|---|---|
| α | −22.50 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | 3000.00 | | | |
| 1 | −11.64 | 5.38 | | 1.7072 | 44.0 |
| 2 | −12.73 | 0.10 | | | |
| 3 | 20.66 | 1.50 | | 1.5512 | 64.6 |
| 4 | 7.43 | 12.64 | | | |
| 5 | 16.96 | 1.50 | | 1.7282 | 28.7 |
| 6 | 8.99 | 0.49 | | | |
| 7 | 9.88 | 3.39 | | 1.6000 | 61.4 |
| 8 | −15.76 | 9.20 | | | |
| 9 | FFS ① (DM 1) | 8.50 | (1) | | |
| 10 | FFS ② (DM 1) | 10.40 | (2) | | |
| Image plane | ∞ | | | | |

FFS ①

WE:

| | | | | | |
|---|---|---|---|---|---|
| $C_4$ | $2.4704 \times 10^{-3}$ | $C_6$ | $3.4494 \times 10^{-3}$ | $C_8$ | $2.4088 \times 10^{-4}$ |
| $C_{10}$ | $1.6255 \times 10^{-4}$ | $C_{11}$ | $-1.1023 \times 10^{-5}$ | $C_{13}$ | $-2.3911 \times 10^{-5}$ |
| $C_{15}$ | $6.1045 \times 10^{-6}$ | | | | |

ST: 平面

TE:

| | | | | | |
|---|---|---|---|---|---|
| $C_4$ | $-3.4553 \times 10^{-3}$ | $C_6$ | $-2.8034 \times 10^{-3}$ | $C_8$ | $-2.6148 \times 10^{-4}$ |
| $C_{10}$ | $-1.1841 \times 10^{-4}$ | $C_{11}$ | $1.0637 \times 10^{-5}$ | $C_{13}$ | $-4.1306 \times 10^{-6}$ |
| $C_{15}$ | $3.2107 \times 10^{-6}$ | | | | |

FFS ②

WE:

| | | | | | |
|---|---|---|---|---|---|
| $C_4$ | $-7.4056 \times 10^{-3}$ | $C_6$ | $-9.5270 \times 10^{-3}$ | $C_8$ | $-4.1745 \times 10^{-4}$ |
| $C_{10}$ | $-4.6763 \times 10^{-5}$ | $C_{11}$ | $-5.1226 \times 10^{-6}$ | $C_{13}$ | $-4.0217 \times 10^{-4}$ |
| $C_{15}$ | $1.2427 \times 10^{-5}$ | | | | |

ST: 平面

TE:

| | | | | | |
|---|---|---|---|---|---|
| $C_4$ | $1.6165 \times 10^{-2}$ | $C_6$ | $1.3129 \times 10^{-2}$ | $C_8$ | $1.6242 \times 10^{-3}$ |
| $C_{10}$ | $8.6352 \times 10^{-5}$ | $C_{11}$ | $1.3285 \times 10^{-4}$ | $C_{13}$ | $1.9178 \times 10^{-4}$ |
| $C_{15}$ | $9.1059 \times 10^{-5}$ | | | | |

Displacement and tilt(1)

WE:

| | | | | | |
|---|---|---|---|---|---|
| X | 0.00 | Y | −0.07 | Z | 0.18 |
| α | −22.50 | β | 0.00 | γ | 0.00 |

ST:

| | | | | | |
|---|---|---|---|---|---|
| X | 0.00 | Y | 0.06 | Z | −0.15 |
| α | −22.50 | β | 0.00 | γ | 0.00 |

TE:

| | | | | | |
|---|---|---|---|---|---|
| X | 0.00 | Y | 0.07 | Z | −0.18 |
| α | −22.50 | β | 0.00 | γ | 0.00 |

Displacement and tilt(2)

WE:

| | | | | | |
|---|---|---|---|---|---|
| X | 0.00 | Y | −0.07 | Z | 0.18 |
| α | −22.50 | β | 0.00 | γ | 0.00 |

ST:

| | | | | | |
|---|---|---|---|---|---|
| X | 0.00 | Y | −0.07 | Z | 0.18 |
| α | −22.50 | β | 0.00 | γ | 0.00 |

TE:

| | | | | | |
|---|---|---|---|---|---|
| X | 0.00 | Y | −0.07 | Z | −0.18 |
| α | −22.50 | β | 0.00 | γ | 0.00 |

More preferably, the viewing optical system of the invention should satisfy at least one of the following conditions, because much higher zooming performance is achievable.

In a certain state, it is preferable to satisfy the following condition (101):

$$0 \leq |P_{DFM} \times F_{TOT}| < 10 \tag{101}$$

where $P_{DFM}$ is the power of a variable-shape mirror, and $F_{TOT}$ is the focal length of a lens group between the first lens surface and just before the variable mirror in the optical system (hereinafter called the image pickup system lens group).

By complying with the condition (101), the amount of transformation of the variable-shape mirror is reduced within a proper range, so that decentration aberrations of light rays reflected at the variable-shape mirror can be reduced.

Here the power $P_{DFM}$ of the variable-shape mirror is defined as the quadruple of $C_4$ or $C_6$ that is the second-order term of the XY polynomial for the free-form surface of the variable-shape mirror.

In the optical system including the variable-shape mirror used under condition (101) and the following conditions, there are two powers and two focal lengths found from $C_4$ and $C_6$, respectively. For the invention, however, it is required to satisfy condition (101) and the following conditions in conjunction with at least one of two such powers and at least one of two such focal lengths.

More preferably, the following condition (102) should be satisfied in a certain state because decentration aberrations are further reduced.

$$0 \leq |P_{DFM} \times F_{TOT}| < 5 \tag{102}$$

It is also preferable to satisfy the following condition (103) in a certain state:

$$0.05 < |F_{TELE}/F_{WIDE}| < 20 \tag{103}$$

Here $F_{WIDE}$ is the focal length of the variable-shape mirror upon zooming to the wide-angle side of the optical system, and $F_{TELE}$ is the focal length of the variable-shape mirror upon zooming to the telephoto side of the optical system. By complying with condition (103), it is then possible to reduce the amount of transformation of the variable-shape mirror within a proper range.

It is here noted that the focal lengths $F_{WIDE}$ and $F_{TELE}$ of the variable-shape mirror are defined by the reciprocal of the power $P_{DFM}$ of the variable-shape mirror. In this case, there are two focal lengths, one found from $C_4$ and another from $C_6$. For the invention, however, it is required to satisfy condition (103) regarding at least one of two such focal lengths, as mentioned above.

More preferably for correction of aberrations, the following condition (104) should be met.

$$0.1 < |F_{TELE}/F_{WIDE}| < 10 \tag{104}$$

It is preferable to comply with the following condition (105) in a certain state:

$$0.1 < D1/F_{TOT} < 5 \tag{105}$$

where D1 is the length between two variable-shape mirrors as calculated on an air basis, and $F_{TOT}$ is the focal length of an image pickup system lens group.

By ensuring the spacing between two variable-shape mirrors in such a way as to comply with the condition (105), it is possible to obtain a high zoom ratio.

More preferably for ease of compactness, the following condition (106) should be met in a certain state.

$$0.2 < D1/F_{TOT} < 1 \tag{106}$$

It is preferable to satisfy the following condition (107) in a certain state:

$$0.1 < D2/F_{TOT} < 5 \tag{107}$$

where D2 is the length from the second variable-shape mirror to an intermediate image plane as calculated on an air basis, and $F_{TOT}$ is the focal length of an image pickup system lens group.

By locating the variable-shape mirrors in such a way as to comply with condition (107), the optical system can easily be made compact without detrimental to an optical path through a refracting optical system.

More preferably for correction of aberrations, the following condition (108) should be met because an appropriate back focus length is obtainable.

$$0.2 < D2/F_{TOT} < 1 \tag{108}$$

It is preferable to satisfy the following condition (109) in a certain state:

$$0.5 < CJ/F_{TOT} < 10 \tag{109}$$

where CJ is the distance from the first lens surface of the image pickup system lens group to the intermediate image plane, and $F_{TOT}$ is the focal length of the image pickup system lens group.

By complying with condition (109), it is possible to set up a compact optical system.

More preferably for further compactness, the following condition (110) should be met in a certain state.

$$1 < CJ/F_{TOT} < 6 \tag{110}$$

It is preferable to satisfy the following condition (111) in a certain state:

$$10° < 2\omega < 67° \tag{111}$$

where $2\omega$ is the maximum angle of view of a light ray incident on the optical system.

By ensuring the angle of view of the incident light ray in such a way as to comply with condition (111), it is possible to achieve an optical system well fit for cameras' finders.

More preferably for correction of aberrations, the following condition (112) should be met in a certain state:

$$15° < 2\omega < 63° \tag{112}$$

It is preferable to satisfy the following condition (113) in a certain state:

$$0.1 < |F_N|/F_{TOT} < 10 \tag{113}$$

where $F_N$ is the focal length of a lens group included in the image pickup system lens group and having negative power, and $F_{TOT}$ is the focal length of the image pickup system lens group.

By a choice of the focal length of the lens group having negative refracting power in such a way as to comply with condition (113), it is easy to obtain a retrofocus type optical system so that enough space to receive the variable-shape mirror can be ensured. As the lower limit of 0.1 to $|F_N|/F_{TOT}$ is not reached, the Petzval sum becomes negatively too large, making it very difficult to correct the optical system for field curvature. As the upper limit of 10 to $|F_N|/F_{TOT}$ is exceeded, it is difficult to locate the variable-shape mirror in the optical system because it is impossible to ensure a sufficient distance from the final lens surface to a solid-state image pickup device. Otherwise, it is difficult to set up any wide-angle arrangement.

More preferably for ease of correction of aberrations, the following condition (114) should be met in a certain state.

$$0.2 < |F_N|/F_{TOT} < 5 \quad (114)$$

It is preferable to satisfy the following condition (115) in a certain state:

$$0.1 < |F_P|/F_{TOT} < 10 \quad (115)$$

where $F_P$ is the focal length of a lens group included in the image pickup system lens group and having positive refracting power.

By a choice of the focal length of the lens group having positive refracting power in such a way as to comply with condition (115), the overall length of the lens system can be shortened while enough space to receive the variable-shape mirror is secured.

More preferably for ease of correction of aberrations, the following condition (116) should be met in a certain state.

$$0.2 < |F_P|/F_{TOT} < 5 \quad (116)$$

Referring here to the free-from surface coefficient $C_4$ in formula (a) indicative of the surface shape of a variable-shape mirror, it is acceptable for $C_4$ to have opposite signs in two states where the object distance differs. By allowing $C_4$ to have such opposite signs, the amount of transformation of the mirror surface upon object distance changes can be more reduced than in the case where $C_4$ has the same sign.

For the same reason, it is acceptable for the free-form surface coefficient $C_6$ to have opposite signs in two states where the object distance differs.

Preferably, any one of the variable mirrors in the optical system should have an increased converging action at a far point of object distance and a decreased converging action at a near point of object distance.

With respect to the free-form surface coefficients $C_4$ and $C_6$ in formula (a) indicative of the shape of a variable mirror, it is preferable to satisfy the following condition (117) in a certain state:

$$0.01 < C_6/C_4 < 10 \quad (117)$$

By complying with condition (117), the amount of transformation of the mirror can be reduced within a proper range, making quick, easy transformation possible.

More preferably in consideration of a balance against other aberrations, the following condition (118) should be met in a certain state.

$$0.05 < C_6/C_4 < 5 \quad (118)$$

When two variable mirrors are used, their respective free-form surface coefficients $C_4$ may have opposite signs in a certain state. With two such variable mirrors, it is possible to design an optical system of from the retrofocus type to the telephoto type, so that the optical system can have an increased zoom ratio.

Likewise, their respective free-form surface coefficients $C_6$ may have opposite signs in a certain state.

With respect to the free-form surface coefficients $C_8$ and $C_{10}$ in formula (a) indicative of the shape of a variable mirror, it is preferable to satisfy the following condition (119) in a certain state:

$$0.01 < C_{10}/C_8 < 10 \quad (119)$$

By complying with condition (119), an image plane difference due to the position of an image position in the optical system can be reduced within a proper range without too much transformation of the mirror.

More preferably in consideration of a balance against other aberrations, the following condition (120) should be met in a certain state.

$$0.05 < C_{10}/C_8 < 5 \quad (120)$$

With respect to the free-form surface coefficients $C_{11}$ and $C_{13}$ in formula (a), it is preferable to satisfy the following condition (121) in a certain state:

$$0.01 < |C_{13}/C_{11}| < 100 \quad (121)$$

By complying with condition (121), aberrations of image formation at an object position outside of the meridional plane of the optical system can be reduced within a proper range without too much transformation of the mirror.

More preferably, the following condition (122) should be met in a certain state.

$$0.1 < |C_{13}/C_{11}| < 80 \quad (122)$$

This is because the mirror surface can reasonably be transformed.

With respect to the free-form surface coefficients $C_{11}$ and $C_{15}$, it is preferable to satisfy the following condition (123) in a certain state:

$$0.01 < |C_{15}/C_{11}| < 10 \quad (123)$$

By complying with condition (123), it is possible to make higher-order correction for field curvature at the periphery of a field of view without causing too much transformation of the mirror.

More preferably, the following condition (124) should be met in a certain state.

$$0.05 < |C_{15}/C_{11}| < 5 \quad (124)$$

This is because aberrations between the periphery and the center of the field of view are placed in a well-balanced state.

In a certain state, the position where a chief ray at a certain height of the optical system intersects an optical axis should preferably be located between both variable mirrors, so that an increased zoom ratio is obtainable without causing too much transformation of the mirrors. It is also possible to reduce aberrations at the wide-angle end and the telephoto end within a proper range. The optical axis used herein is understood to refer to an axial chief ray.

Diopter control of the finder may be performed by transforming one variable mirror or transforming both variable mirrors at the same time. The transformation of one variable mirror makes quick diopter control possible whereas the transformation of both variable mirrors contributes to diopter control with well-reduced aberrations.

In the aforesaid embodiments, the periphery of the variable mirror remains fixed; however, it is not always necessary to fix the periphery of the variable mirror, that is, it is acceptable to transform the periphery of the variable mirror.

It is noted that the variable mirror may be driven in any of the modes referred to herein, including electrostatic, electromagnetic and piezoelectric modes. It is preferable to rely on the electrostatic mode because the power consumption for driving the mirror can be minimized. It is also preferable to rely on the electromagnetic mode because of ease of mirror drive control.

Tabulated below are the values of the parameters regarding conditions (101)–(110) and (113)–(116) in Embodiments 1, 2 and 3.

| Example | 1 | | | 2 | | |
|---|---|---|---|---|---|---|
|  | WE | ST | TE | WE | ST | TE |
| $P_{DFM} \times F_{TOT}$ | | | | | | |
| DM1X-direction | −0.5527 | 0.0000 | 0.1111 | −0.5728 | −0.0409 | 0.0715 |
| DM1Y-direction | −0.4562 | 0.0000 | 0.1973 | −0.4823 | −0.0473 | 0.1818 |
| DM2X-direction | 0.7853 | 0.0000 | −0.7384 | 0.6644 | −0.1655 | 0.8110 |
| DM2Y-direction | 0.8098 | 0.0000 | −0.8779 | 0.7004 | −0.0927 | −0.9853 |
| $F_{TELE}/F_{WIDE}$ | | | | | | |
| DM1X-direction | −4.973 | | | −8.009 | | |
| DM1Y-direction | −2.312 | | | −2.652 | | |
| DM2X-direction | −1.064 | | | −0.819 | | |
| DM2Y-direction | −0.922 | | | −0.711 | | |
| $D\ 1/F_{TOT}$ | 0.4975 | 0.4975 | 0.4975 | 0.4975 | 0.4975 | 0.4975 |
| $D\ 2/F_{TOT}$ | 0.663 | 0.663 | 0.663 | 0.663 | 0.663 | 0.663 |
| $C\ J/F_{TOT}$ | 2.187 | 2.187 | 2.187 | 2.187 | 2.187 | 2.187 |
| $F_N/F_{TOT}$ | −1.321 | −1.321 | −1.321 | −1.321 | −1.321 | −1.321 |
| $F_P/F_{TOT}$ | 1.017 | 1.017 | 1.017 | 1.017 | 1.017 | 1.017 |

| Example | 3 | | |
|---|---|---|---|
|  | WE | ST | TE |
| $P_{DFM} \times F_{TOT}$ | | | |
| DM1X-direction | −0.1535 | 0.0000 | 0.2148 |
| DM1Y-direction | −0.2144 | 0.0000 | 0.1742 |
| DM2X-direction | 0.4603 | 0.0000 | −1.0051 |
| DM2Y-direction | 0.5922 | 0.0000 | −0.8161 |
| $F_{TELE}/F_{WIDE}$ | | | |
| DM1X-direction | −0.715 | | |
| DM1Y-direction | −1.230 | | |
| DM2X-direction | −0.458 | | |
| DM2Y-direction | −0.726 | | |
| $D\ 1/F_{TOT}$ | 0.5470 | 0.5470 | 0.5470 |
| $D\ 2/F_{TOT}$ | 0.669 | 0.669 | 0.669 |
| $C\ J/F_{TOT}$ | 2.340 | 2.340 | 2.340 |
| $F_N/F_{TOT}$ | −1.327 | −1.327 | −1.327 |
| $F_P/F_{TOT}$ | 1.076 | 1.076 | 1.076 |

Finally, the definitions of the terms used herein are collectively explained.

By the term "optical apparatus" is intended an apparatus including either an optical system or an optical element. This apparatus is not always required to function by itself, that is, it may form a part of the apparatus assembly.

The optical apparatus, for instance, includes image pickup apparatus, viewing apparatus, display apparatus, illumination apparatus, and signal processors.

Specific examples of the image pickup apparatus are film cameras, digital cameras, robots' eyes, lens inter-changeable digital single-lens reflex cameras, TV cameras, moving-image recorders, electronic moving-image recorders, camcorders, VTR cameras and electronic endoscopes. Digital cameras, card type digital cameras, TV cameras, VTR cameras, moving-image recording cameras, etc. are all examples of the electronic image pickup apparatus.

Specific examples of the viewing apparatus are microscope, telescopes, spectacles, binoculars, loupes, fiber scopes, finders and view finders.

Specific examples of the display apparatus are liquid crystal displays, view finders, game machines (the Play Station series manufactured by SONY), video projectors, liquid crystal projectors, head mounted displays (HMDs), PDAs (personal digital assistants) and cellular phones.

Specific examples of the illumination apparatus are cameras' flashes, cars' headlights, endoscopes light sources, and microscope light sources.

Specific examples of the signal processor are cellar phones, personal computers, game machines, read/write devices for optical discs, and computing units for optical computers.

The image pickup device, for instance, refers to CCDs, pickup tubes, solid-state image pickup devices, and photographic films.

A plane-parallel plate is included in one of prisms, and a diopter change is included in changes in an observer. Subject changes include a change in the distance of an object that is the subject, movement of the object, motion, vibration and shaking of the object, etc.

The extended curved surface, by definition, includes every surface such as a spherical surface; a plane; a rotationally symmetric aspheric surface; a spherical surface, a plane and a rotationally symmetric aspheric surface decentered with respect to an optical axis; an aspheric surface having planes of symmetry; an aspheric surface having only one plane of symmetry; an aspheric surface having no plane of symmetry; a free-form surface; and a surface including an undifferentiable line or point. That is, the extended curved surface includes every surface that has some influences on light whether it is a reflecting surface or a refracting surface.

These surfaces are generally called the extended curves surface.

The optical element having variable optical properties includes a variable-focus lens, a variable-shape mirror, a polarizing prism having a variable surface shape, a prism having a variable apex angle and a variable diffraction optical element having a variable light deflection action, i.e., a variable HOE and a variable DOE.

The variable-focus lens includes a variable lens having a variable amount of aberrations but having an invariable focal length, and so does the variable-shape mirror.

In short, an optical element having variable light defection actions such as reflection, refraction and diffraction of light is referred to as the optical element having variable optical properties.

The information transmission apparatus refers to an apparatus that can enter and transmit some information such as cellular phones; remote controllers for fixed telephone sets, game machines, televisions and radio-cassette players; personal computers; keyboards, mouses and touch panels for personal computers.

TV monitors, personal computer monitors and displays provided with an image pickup apparatus are also included in that term.

The information transmission apparatus is included in the signal processor.

According to the present invention as explained above, there can be provided a viewing optical apparatus that uses an optical element having variable optical properties, wherein zooming or focusing takes place by simple transformation of, for instance, the surface shape of a mirror without driving a lens group to and fro.

The present invention provides an optical system that can be applied to finders of cameras, digital cameras, TV cameras and cellular phones having an image pickup function, viewing optical systems such as telescopes, binoculars and microscopes, and image pickup optical systems such as endoscopes, monitor cameras and compact digital cameras, thereby ensuring reduced power consumptions, noiseless operations, fast responses, simplified mechanical structures and cost reductions. This optical system, albeit having a reduced outer diameter and being of compact size, is capable of focusing and zooming.

It is understood that the optical system of the invention is not only usable as mentioned above, but also is applicable to robots' eyes, cellular phones having an image pickup function, door scope cameras, car-mounted cameras, etc.

I claim:

1. An optical system, comprising:
at least one optical element having variable optical properties, wherein said optical element having variable optical properties turns to a free-form surface shape in a given state upon zooming.

2. An optical system, comprising:
an optical element having variable optical properties, wherein said optical system is constructed such that the angle of incidence of an axial chief ray on said optical element having variable optical properties is in the range of 15° to 30° inclusive.

3. An optical system, comprising:
a lens group having negative power and a lens group having positive power, and
a reflective-type optical element having variable optical properties, wherein said optical system is constructed such that an axial incident light ray from an object on said optical system and an axial emergent light ray from an exit pupil are substantially parallel with each other in a given state.

4. An optical system, comprising:
a lens group having negative power and a lens group having positive power, and
an optical element having variable optical properties, wherein said lens group having negative power and said lens group having positive power form together a retrofocus type lens system, and said optical element having variable optical properties is located in the rear of said lens group having negative power and said lens group having positive power and has a zooming or focusing function.

5. An optical system, comprising:
an optical element having variable optical properties, wherein said optical element having variable optical properties has two states where a free-form surface coefficient $C_4$ has opposite signs in a given state.

6. An optical system, comprising:
an optical element having variable optical properties, wherein said optical element having variable optical properties has two states where a free-form surface coefficient $C_6$ has opposite signs in a given state.

7. An optical system, comprising:
an optical element having variable optical properties, wherein said optical element having variable optical properties satisfies the following condition (103) in a given state:

$$0.05 < |F_{TELE}/F_{WIDE}| < 20 \tag{103}$$

where $F_{WIDE}$ is a focal length of said optical element having variable optical properties upon zooming to the wide-angle side of said optical system, and $F_{TELE}$ is a focal length of said optical element having variable optical properties upon zooming to the telephoto side of said optical system.

8. An optical system, comprising:
an optical element having variable optical properties, wherein said optical system satisfies the following condition (101) in a given state:

$$0 \le |P_{DFM} \times F_{TOT}| < 10 \tag{101}$$

where $P_{DFM}$ is a power of said optical element having variable optical properties, and $F_{TOT}$ is a focal length of a lens group between the first lens surface and just before said optical element having variable optical properties in said optical system.

9. An optical system, comprising:
two optical elements having variable optical properties, wherein said optical system satisfies the following condition (105) in a given state:

$$0.1 < D1/F_{TOT} < 5 \tag{105}$$

where D1 is a length as calculated on an air basis between said two optical elements having variable optical properties, and $F_{TOT}$ is a focal length of a lens group between the first lens surface and just before said optical element having variable optical properties in said optical system.

10. An optical system, comprising:
two optical elements having variable optical properties, wherein said optical system satisfies the following condition (107) in a given state:

$$0.1 < D2/F_{TOT} < 5 \tag{107}$$

where D2 is a length as calculated on an air basis from the second optical element having variable optical properties to an intermediate image plane, and $F_{TOT}$ is a focal length of a lens group between the first lens surface and just before said optical element having variable optical properties in said optical system.

11. An optical system, comprising:
an optical element having variable optical properties, wherein said optical system satisfies the following condition (109) in a given state:

$$0.5 < CJ/F_{TOT} < 10 \tag{109}$$

where CJ is a distance from the first lens surface in an image pickup system lens group to an intermediate image plane, and $F_{TOT}$ is a focal length of a lens group between the first lens surface and just before said optical element having variable optical properties in said optical system.

12. An optical system, comprising:
an optical element having variable optical properties, wherein said optical system satisfies the following condition (111) in a given state:

$$10° < 2\omega < 67° \tag{111}$$

wherein $2\omega$ is a maximum angle of view of a light ray incident on said optical system.

13. An optical system, comprising:
an optical element having variable optical properties, wherein said optical element having variable optical properties satisfies the following condition (117) in a given state:

$$0.01 < C_6/C_4 < 10 \tag{117}$$

where $C_4$ and $C_6$ are each a free-form surface coefficient.

14. An optical system, comprising: an optical element having variable optical properties, wherein said optical element having variable optical properties satisfies the following condition (119) in a given state:

$$0.01 < C_{10}/C_8 < 10 \tag{119}$$

where $C_8$ and $C_{10}$ are each a free-form surface coefficient.

15. An optical system, comprising:
an optical element having variable optical properties, wherein said optical element having variable optical properties satisfies the following condition (121) in a given state:

$$0.01 < C_{13}/C_{11} < 100 \tag{121}$$

where $C_{11}$ and $C_{13}$ are each a free-form surface coefficient.

16. An optical system, comprising: an optical element having variable optical properties, wherein said optical element having variable optical properties satisfies the following condition (123) in a given state:

$$0.01 < C_{11}/C_{15} < 10 \tag{123}$$

where $C_{11}$ and $C_{15}$ are each a free-form surface coefficient.

17. An optical system, comprising:
an optical element having variable optical properties, and an image pickup system lens group, wherein said optical system satisfies the following condition (113) in a given state:

$$0.1 < |F_N|/F_{TOT} < 10 \tag{113}$$

wherein $F_N$ is a focal length of a lens group having negative power and included in said image pickup system lens group, and $F_{TOT}$ is a focal length of a lens group between the first lens surface and just before said optical element having variable optical properties in said optical system.

18. An optical system, comprising:
an optical element having variable optical properties, and an image pickup system lens group, wherein said optical system satisfies the following condition (115) in a given state:

$$0.1 < |F_P|/F_{TOT} < 10 \tag{115}$$

wherein $F_P$ is a focal length of a lens group having positive power and included in said image pickup system lens group, and $F_{TOT}$ is a focal length of a lens group between the first lens surface and just before said optical element having variable optical properties in said optical system.

19. An optical system, comprising:
two optical elements having variable optical properties, wherein said optical system is constructed such that a position where a chief ray at a given image height for said optical system intersects an optical axis of said optical system is located between said two optical elements having variable optical properties.

20. The optical system according to claim 5, wherein said given state is a state where an object distance differs.

21. The optical system according to claim 6, wherein said given state is a state where an object distance differs.

22. An optical system, comprising:
an optical element having variable optical properties, wherein said optical element having variable optical properties has such a property as to have an increased converging action at a near point of object distance and a decreased converging action at a far point object distance.

23. An optical system, comprising: two optical elements having variable optical properties, wherein said two optical elements having variable optical properties have free-form surface coefficients $C_4$ with opposite signs in a given state.

24. An optical system, comprising: two optical elements having variable optical properties, wherein said two optical elements having variable optical properties have free-form surface coefficients $C_6$ with opposite signs in a given state.

25. An image pickup optical system, comprising: an optical system as recited in any one of claims 1 to 19 and 20 to 24, and an image pickup device.

26. An optical apparatus, comprising: an optical system as recited in any one of claims 1 to 19 and 20 to 24.

27. An optical system, comprising:
a lens group having negative power and a lens group having positive power, and
an optical element having variable optical properties, wherein said optical system is constructed such that an axial incident light ray from an object on said optical system and an axial emergent light ray from an exit pupil are substantially perpendicular to each other in a given state
wherein a shift of an axial incident light ray from said object on said optical system from an axial emergent light ray from an exit pupil is within ±5°.

* * * * *